(12) United States Patent
Thibedeau et al.

(10) Patent No.: US 8,386,309 B2
(45) Date of Patent: *Feb. 26, 2013

(54) INTELLIGENT CLEARING NETWORK

(75) Inventors: Richard B. Thibedeau, Plainville, CT (US); Brian Schulte, West Haven, CT (US); Michael Skelton, Milford, CT (US); Gary Oakley, New Canaan, CT (US); Jon Robertson, East Dennis, MA (US)

(73) Assignee: Intelligent Clearing Network, Inc., New Canaan, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/587,193

(22) Filed: Oct. 2, 2009

(65) Prior Publication Data

US 2010/0131342 A1    May 27, 2010

Related U.S. Application Data

(63) Continuation-in-part of application No. 12/283,206, filed on Sep. 9, 2008.

(51) Int. Cl.
*G06Q 30/00* (2012.01)
(52) U.S. Cl. ............... 705/14.38; 705/14.1; 705/14.11; 705/14.39; 705/14.66
(58) Field of Classification Search ............... 705/14.38, 705/14.1, 14.11, 14.39, 14.66
See application file for complete search history.

(56) References Cited

U.S. PATENT DOCUMENTS

| | | | |
|---|---|---|---|
| 4,601,490 A | 7/1986 | Brandon | 283/56 |
| 5,612,527 A | 3/1997 | Ovadia | 235/383 |
| 6,067,526 A | 5/2000 | Powell | 705/14 |
| 6,109,526 A | 8/2000 | Ohanian et al. | 235/462.45 |
| 6,199,044 B1 | 3/2001 | Ackley et al. | 704/275 |
| 6,230,143 B1 | 5/2001 | Simons et al. | 705/14 |
| 6,520,542 B2 * | 2/2003 | Thompson et al. | 283/51 |
| 6,938,821 B2 | 9/2005 | Gangi | 235/380 |
| 7,016,860 B2 | 3/2006 | Modani et al. | 705/14 |
| 7,076,444 B1 | 7/2006 | Baron et al. | 705/14 |
| 7,240,843 B2 * | 7/2007 | Paul et al. | 235/472.01 |
| 7,578,435 B2 * | 8/2009 | Suk | 235/379 |
| 2002/0143612 A1 | 10/2002 | Barik et al. | 705/14 |

(Continued)

FOREIGN PATENT DOCUMENTS

| | | |
|---|---|---|
| JP | 02-308654 | 12/1990 |
| JP | 03-254996 | 11/1991 |

(Continued)

OTHER PUBLICATIONS

"Polytronics: Rolling Out the Chips", Fraunhofer Magazine Jan. 2002, pp. 8-11.

(Continued)

*Primary Examiner* — John Van Bramer
(74) *Attorney, Agent, or Firm* — Harrington & Smith

(57) ABSTRACT

In an embodiment, a system for validating, redeeming, and financially settling paper coupons coded with a GS1 barcode and 8110 Application Identifier comprises a real time network through which a Point-of-Sale (POS) terminal communicates directly to, or through a POS controller, with an Intelligent Clearing Network (ICN) server. One or both of the POS terminal and POS controller are installed with a ICN POS data bridge which stores computer code. The ICN server is configured to run a real time application while in communication with the POS terminal, wherein the POS terminal transmits paper coupon data elements read from the GS1 barcode and other consumer transaction information including universal product codes purchased, and transaction details to the ICN server via the network.

39 Claims, 31 Drawing Sheets

U.S. PATENT DOCUMENTS

| | | | |
|---|---|---|---|
| 2002/0161625 | A1 | 10/2002 | Brito-Valladares et al. ..... 705/10 |
| 2004/0019564 | A1* | 1/2004 | Goldthwaite et al. .......... 705/44 |
| 2004/0054575 | A1 | 3/2004 | Marshall ..................... 705/14 |
| 2004/0056101 | A1 | 3/2004 | Barkan et al. ............ 235/472.03 |
| 2004/0107135 | A1 | 6/2004 | Deatherage et al. ............ 705/14 |
| 2005/0015300 | A1 | 1/2005 | Smith et al. .................... 705/14 |
| 2005/0033643 | A1 | 2/2005 | Smith et al. .................... 705/14 |
| 2005/0171845 | A1 | 8/2005 | Halfman et al. ................ 705/14 |
| 2005/0182695 | A1 | 8/2005 | Lubow et al. .................. 705/28 |
| 2005/0192906 | A1 | 9/2005 | Berstis ........................... 705/59 |
| 2005/0230473 | A1* | 10/2005 | Fajkowski ..................... 235/383 |
| 2006/0038396 | A1 | 2/2006 | Thompson et al. ............. 283/67 |
| 2006/0247972 | A1 | 11/2006 | Baron et al. .................... 705/14 |

FOREIGN PATENT DOCUMENTS

| | | |
|---|---|---|
| JP | 10-287074 | 10/1998 |
| JP | 2000-020823 | 1/2000 |
| JP | 2002-041932 | 2/2002 |

OTHER PUBLICATIONS

Internet article, "UCC/EAN-128 Coupon Extended Codes", Mar. 1, 2006, www.morovia.com, 3 pgs.

Internet information, © Copyright 2006, Valassis Communications, Inc., www.valassis.com, 3 pgs.

"Who's Searching for You", http://www.zoominfo.com/people/Gray Gary 758777677.aspx, 3 pgs.

"couponchief", http://www.couponchief.com/pages/about, 4 pgs.

"lifehacker", http://www.lifehacker.com/software/coupons/find-discounts-online-with-coupon-chief-233654.php.

* cited by examiner

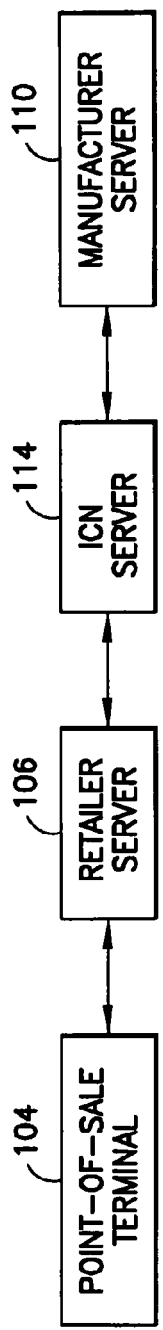
FIG.2A
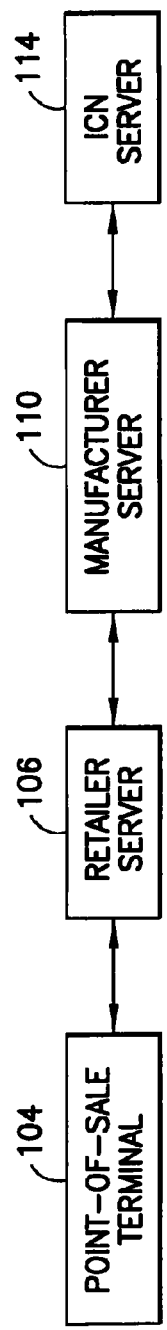
FIG.2B
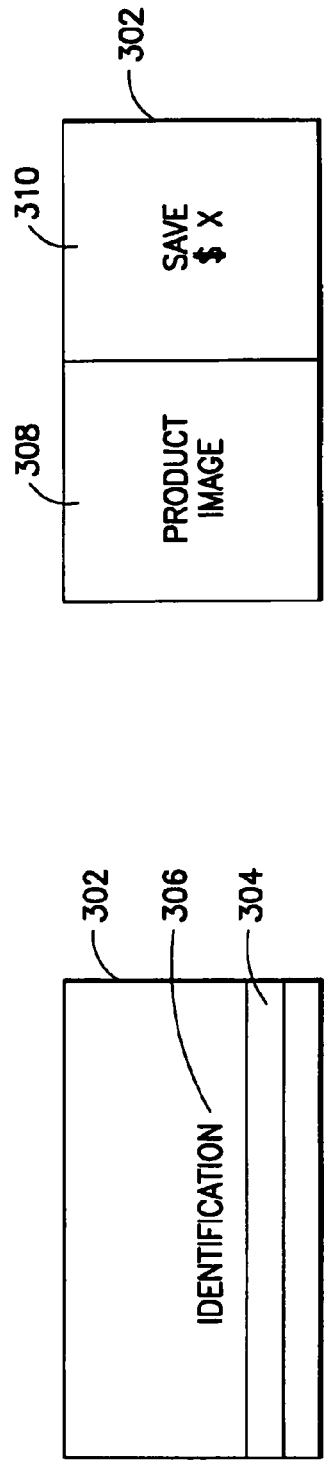
FIG.3B
FIG.3A

UNIFORM CODE COUNCIL SYSTEM 5 COUPON 5 12843 41076 7   (8101)3 72565 0506   (21) 12345678

| | | |
|---|---|---|
| NUMBER SYSTEM CODE | 5 | TRANSMITTED TO POS FOR VALIDATION |
| MANUFACTURE NUMBER | 12843 | TRANSMITTED TO POS FOR VALIDATION |
| FAMILY CODE | 410 | TRANSMITTED TO POS FOR VALIDATION |
| VALUE CODE | 76 | TRANSMITTED TO POS FOR VALIDATION |
| CHECK DIGIT | 7 | TRANSMITTED TO POS FOR VALIDATION |
| APPLICATION IDENTIFIER | (8101) | STORED IN ICN DATABASE |
| PRODUCT NSC | 3 | STORED IN ICN DATABASE |
| MOC CODE | 72565 | STORED IN ICN DATABASE |
| EXPIRATION DATE | 0506 (MMYY) | STORED IN ICN DATABASE |
| APPLICATION IDENTIFIER | (21) | STORED IN ICN DATABASE |
| HOUSEHOLD IDENTIFIER | 12345678 | STORED IN ICN DATABASE |

FIG.7

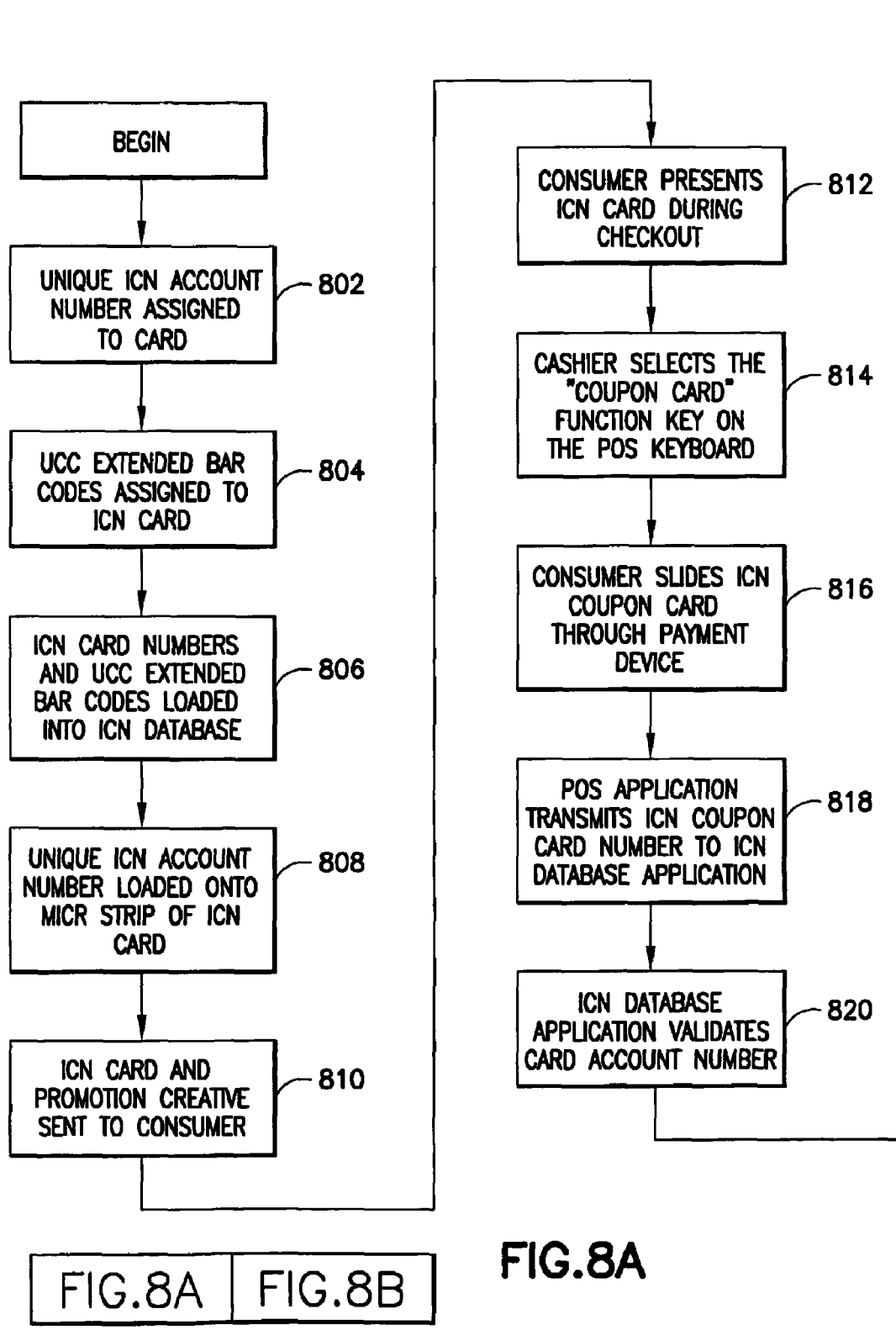

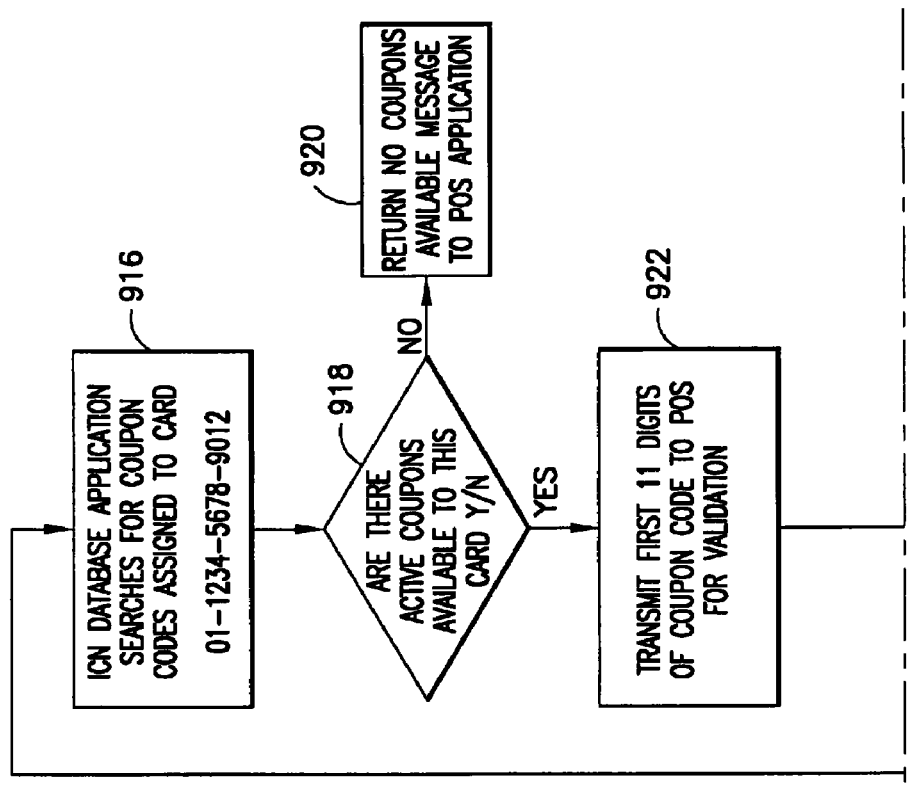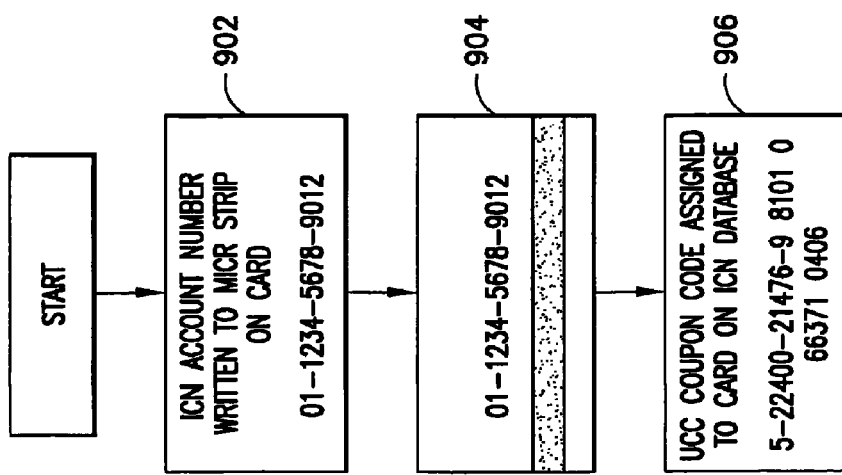

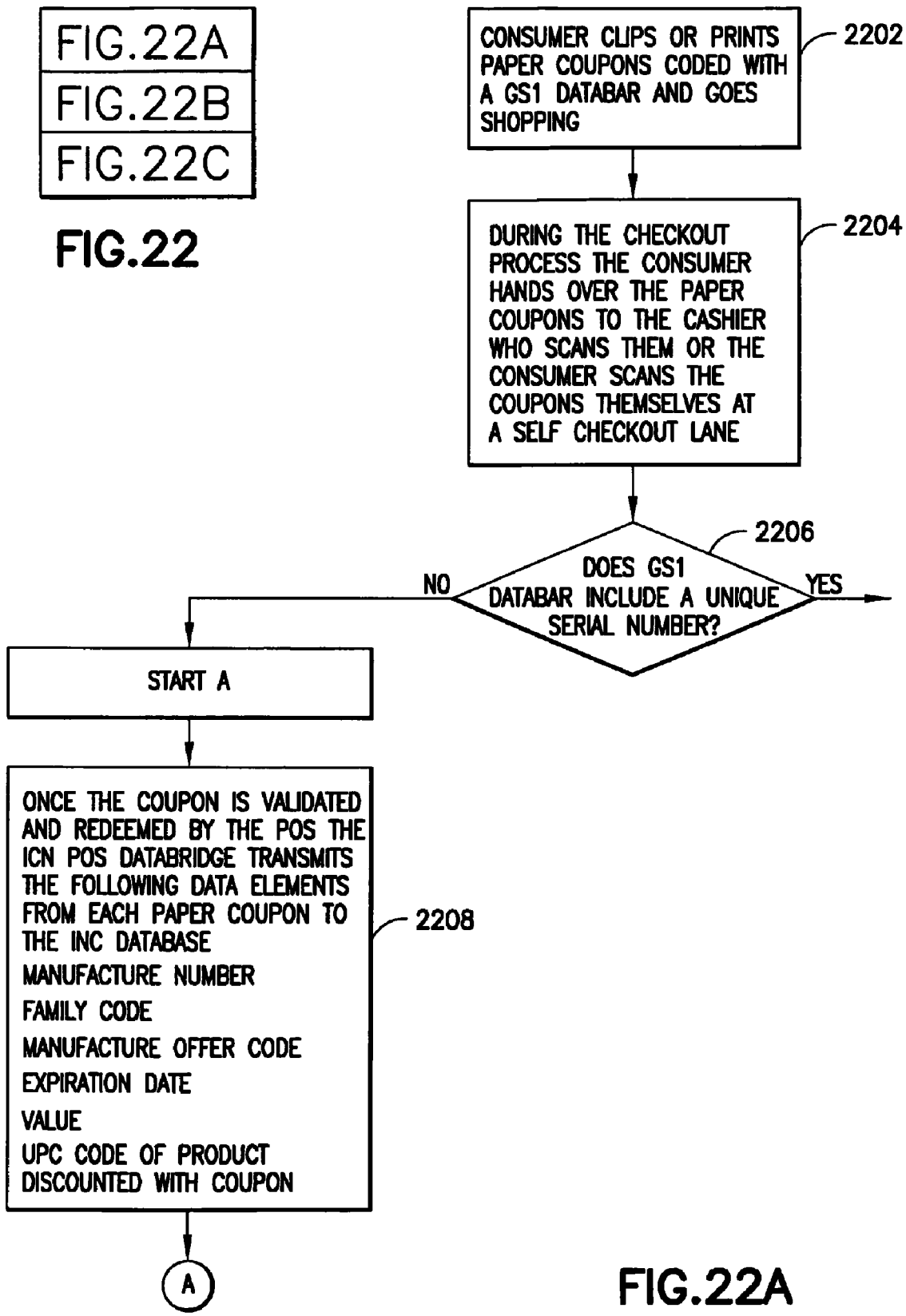

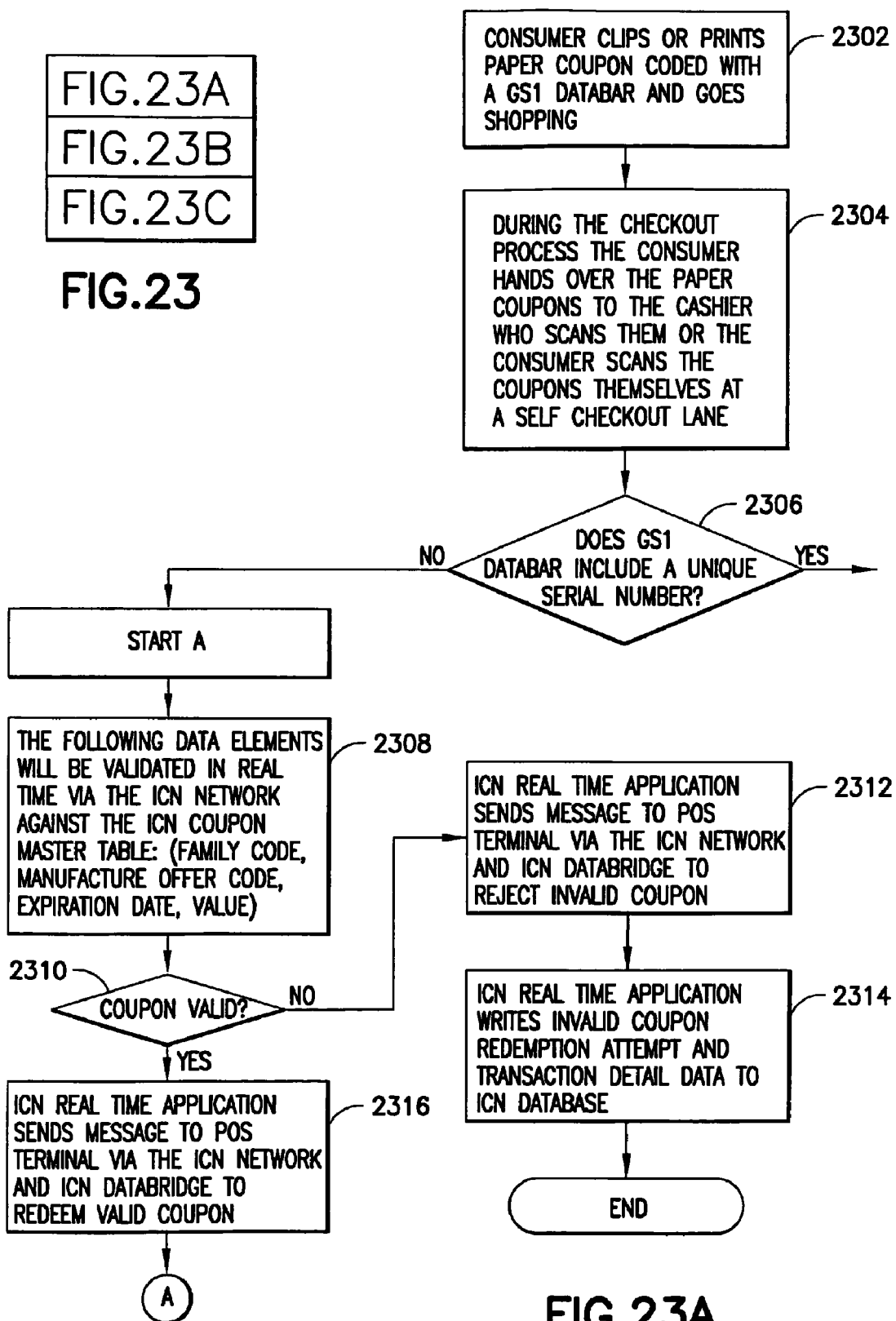

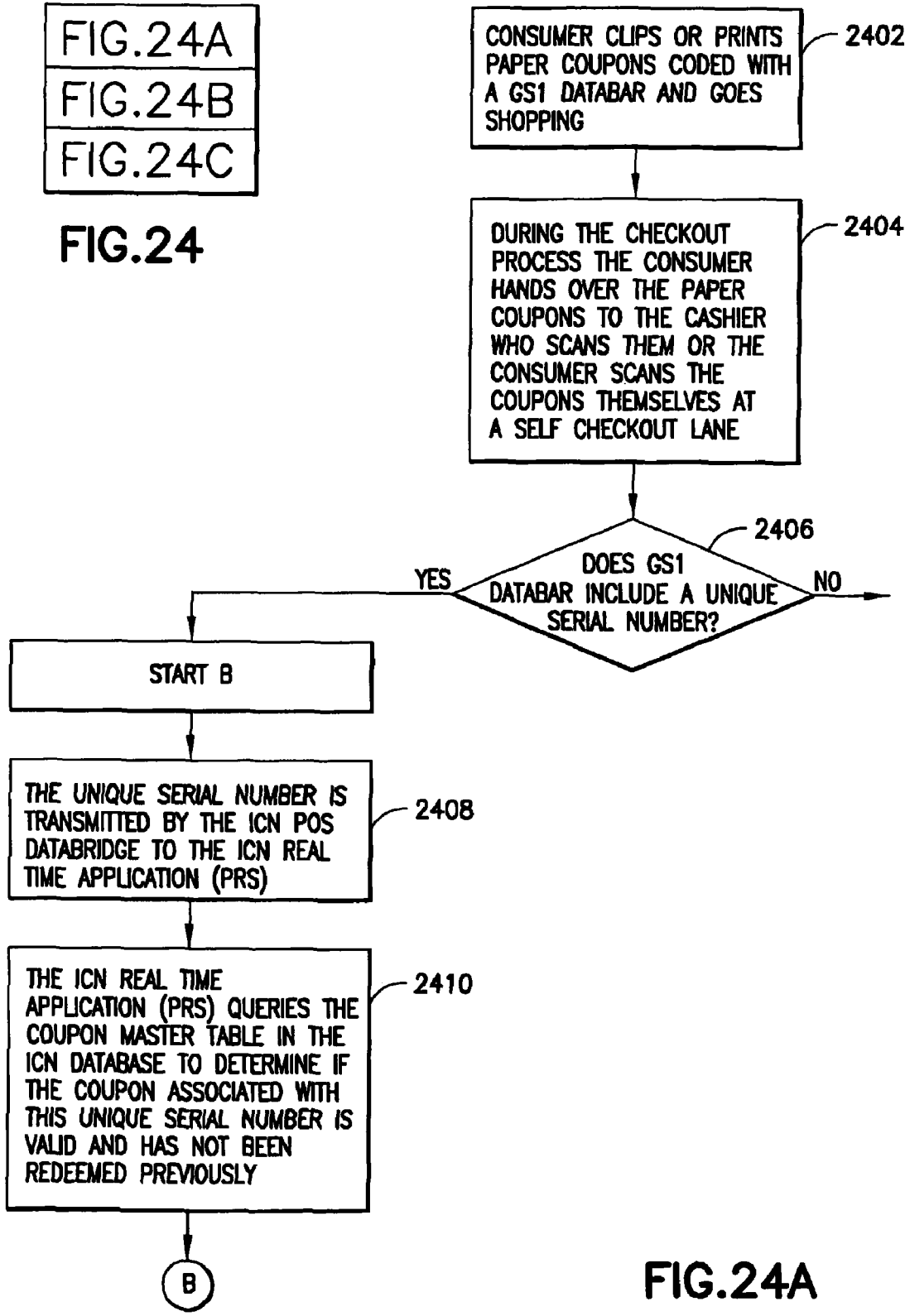

US 8,386,309 B2

INTELLIGENT CLEARING NETWORK

CROSS REFERENCE TO RELATED APPLICATIONS

This application is a continuation-in-part patent application, which claims priority under 35 U.S.C. §120 from continuation-in-part U.S. patent application Ser. No. 12/283,206, filed Sep. 9, 2008, which claims priority under 35 U.S.C. §120 from U.S. patent application Ser. No. 11/439,725, filed May 23, 2006, the entire contents of which are hereby incorporated by reference in their entirety.

TECHNICAL FIELD

The invention relates to the electronic clearing, and financial settlement of coupons coded with a barcode application identifier and, in particular, to a real time network based system and method for validating and redeeming paper coupons coded with, for example, a barcode identifier, such as a GS1 barcode 8110 application identifier.

BACKGROUND

Coupons provide benefits to manufacturers and consumers. For example, coupons are a beneficial way for manufacturers to test consumer interest in specific products, determine optimal pricing, and move out older inventory. Mail by the postal system, newspapers, and stores usually serve as outlets for providing coupons to consumers. Consumers benefit because coupons are universally accepted, follow GS1 (including Uniform Commercial Code) guidelines, are easily understood by consumers, and require no prior notification to a retailer. The coupons may be clipped out from the source document.

However, the process of validating, clearing and financial settlement associated with paper coupons can be a slow, labor intensive process potentially prone to fraud and misuse. An extraordinary number of paper coupons are printed, distributed and redeemed each year. Once a coupon is redeemed by the consumer, the paper coupon is monetized and it must flow through the current manual clearing and settlement process before the retailer is reimbursed for the value of the paper coupon and the cost of handling the paper coupon. This physical paper coupon clearing process can be slow and manual and sometimes requires a second independent count of each paper coupon before a retailer is reimbursed. Also, within the current paper clearing and settlement process there can be the issue of disputes and charge backs by the manufacture for the value of the redeemed paper coupon to the retailer for paper coupons which the retailer redeemed, but should not have because they were invalid in some way, whether it was because the paper coupon was a copied, or was redeemed after the expiration date on the paper coupon.

Accordingly, there is need for a real time, convenient way for validating and processing paper coupons quickly, eliminating potential fraud, and providing an auditable and comprehensive financial settlement process, which would eliminate the need for manually counting and validating each paper coupon redeemed.

SUMMARY

In accordance with a first aspect of the invention, a system comprises an Intelligent Clearing Network (ICN) network; a point-of-sale (POS) terminal; a POS controller; an intelligent clearing network (ICN) server, an ICN database, and an ICN master coupon table. The POS terminal is configured to transmit at least one of 1) first coupon data elements read from a GS1 barcode by the POS terminal, 2) universal product codes of an item purchased, 3) transaction detail information, 4) other related information at the POS terminal to the POS controller, and 5) directly, via the ICN network, to the ICN server for coupon redemption, validation, and financial settlement via the ICN network at the ICN server.

In accordance with a second aspect of the invention, a master coupon storage medium is configured to store an ICN database. Details defining all coupons printed and distributed with a GS1 barcode are stored centrally in the ICN database on an ICN server configured to be used to validate, redeem, and financially settle all coupons printed with a GS1 barcode. The master coupon storage medium comprises at least one storage device and an interface configured to communicate with the ICN server. The ICN server is configured to communicate over an ICN network with one or more point of sale terminals of a retailer.

In accordance with a third aspect of the invention, a method for processing coupons comprises reading GS1 data elements from a scanned coupon at a point-of-sale (POS) terminal, the GS1 data elements including universal product code information; transmitting the GS1 data elements through a network to an ICN server for validation and redemption; if the ICN server validates the GS1 data elements, and transmitting first coupon related information through the network to the POS terminal. The POS terminal is configured to transmit second coupon related information to a POS controller through an ICN POS bridge upon successful redemption of the scanned coupon. Second coupon related information comprises identification information from the product purchased, an application identifier, and retailer identification information.

In accordance with a fourth aspect of the invention, a method for processing coupons comprises reading first GS1 databar coupon related information from a terminal, the first GS1 databar coupon related information including universal product code information; transmitting the first GS1 databar coupon related information through a network to an ICN server for validation and redemption; if the ICN server validates the first GS1 databar coupon related information, transmitting second coupon related information through the network to the terminal. The ICN server transmits second GS1 databar coupon related information to a POS controller via an ICN network, wherein the POS terminal transmits third GS1 databar coupon related information to the POS controller through an ICN POS bridge upon successful redemption of a coupon. The third GS1 databar coupon related information comprises identification information from the product purchased, GS1 databar coupon code of the second coupon related information, an application identifier, and retailer identification information.

In accordance with a fifth aspect of the invention, a computer readable medium storing computer code for processing GS1 databar coupons across a network, comprises computer code configured to transfer first GS1 databar coupon related information including universal product code information from a terminal across the network; computer code for receiving, interpreting, and comparing the first GS1 databar coupon related information at an ICN server; if a GS1 databar coupon code is validated, computer code for retrieving GS1 databar coupon codes and any corresponding target universal product codes triggered by the validation of the GS1 databar coupon codes from a centralized database; computer code configured to transmit the retrieved GS1 databar coupon codes to the terminal via the network; and computer code configured to redeem the GS1 databar coupon codes. The ICN server is configured to transmit second GS1 databar coupon related information to the POS controller via the ICN network. The POS terminal is configured to transmit third GS1 databar coupon related information to the POS controller through an ICN POS data bridge upon successful redemption of a GS1 databar coupon. The third GS1 databar coupon related information comprises identification information from the product purchased, GS1 databar coupon code of the second GS1 databar coupon related information, an application identifier, and retailer identification information.

In a sixth aspect of the invention, a computer readable storage medium is embodied with computer code for processing coupons across an intelligent clearing network (ICN) network. First computer code may permit a user to download and print out a GS1 databar paper coupon accessed via the world wide web where the coupon having first GS1 databar paper coupon related information. Second computer code may transfer the first GS1 databar paper coupon related information including universal product code information from a terminal across the ICN network. Third computer code is configured to receive, interpret, and compare the first GS1 databar paper coupon related information at an ICN server. If a GS1 databar paper coupon code is validated, fourth computer code may retrieve GS1 databar paper coupon codes and any corresponding target universal product codes triggered by the validation of the GS1 databar paper coupon codes from a centralized database. Fifth computer code is configured to transmit the retrieved GS1 databar paper coupon codes to the terminal via the network. Sixth computer code may redeem the GS1 databar paper coupon codes. The ICN server transmits second GS1 databar paper coupon related information to a point-of-sale (POS) controller via the ICN network. A POS terminal transmits third GS1 databar paper coupon related information to the POS controller through an ICN POS bridge upon successful redemption of a GS1 databar paper coupon. The third GS1 databar paper coupon related information comprises identification information from the product purchased, GS1 databar paper coupon code of the second coupon related information, an application identifier, and retailer identification information. Seventh computer code may be executed to notify the ICN server of successful coupon redemptions.

In a seventh aspect of the invention, a point of sale (POS) terminal comprises a first interface configured to receive information regarding a transaction to purchase at least one product; a second interface configured to receive information from and transmit information to a retailer server; a processor; and a memory configured to store point of sale bridge computer code for redeeming a manufacturer first GS1 databar paper coupon contained in a promotion request message received through the second interface. The processor is configured to receive information from the first interface and to receive and transmit information through the second interface and configured to execute the point of sale bridge computer code. The second GS1 databar paper coupon related information is received via the ICN network. The POS terminal transmits third GS1 databar paper coupon related information to the POS controller through ICN POS bridge upon successful redemption of a GS1 databar paper coupon, the third GS1 databar paper coupon related information comprises identification information from the product purchased, GS1 coupon code of the second GS1 databar paper coupon related information, an application identifier, and retailer identification information. The first interface is configured to communicate with a universal product code reading device.

In a eighth aspect of the invention, a point of sale (POS) retailer server comprises a first interface configured to receive information from and transmitting information to a point of sale terminal; a second interface configured to receive information from and transmit information to an intelligent clearing network server via a network; a processor; and a memory configured to store computer code for a point of sale bridge configured to format a promotion request message and send the promotion request message in real time to an intelligent clearing network server promotion redemption real time service. The processor is configured to receive and transmit first GS1 databar paper coupon related information through the first and second interfaces and configured to execute the point of sale bridge computer code. The POS retailer server is configured to receive second GS1 databar paper coupon related information via the intelligent clearing network (ICN) network. The POS retailer server is configured to transmit third GS1 databar paper coupon related information through ICN POS bridge computer code upon successful redemption of a GS1 databar paper coupon. The first GS1 databar paper coupon related information comprises identification information from the product purchased, an application identifier, and retailer identification information.

In a ninth aspect of the invention, an Intelligent Clearing Network (ICN) server comprises a processor; an interface configured to permit communications over a network; and an ICN database. The processor of the ICN server is configured to control the execution of an ICN promotion manager application, an ICN database application, and an ICN promotion redemption service and is configured to receive and transmit data and commands through the interface. The ICN server is configured to receive first coupon related information from a point of sale (POS) controller, wherein the ICN server is configured to transmit second coupon related information to the point of sale (POS) controller via an ICN network. The POS controller is configured to transmit the third coupon related information to the POS controller upon successful redemption of a GS1 databar paper coupon. The third GS1 databar paper coupon related information comprises identification information from the product purchased, an application identifier, and retailer identification information.

BRIEF DESCRIPTION OF THE DRAWINGS

The foregoing and other aspects of these teachings are made more evident in the following Detailed Description, when read in conjunction with the attached drawings, wherein:

FIG. 2A illustrates a block diagram of a first embodiment of information flow;

FIG. 2B illustrates a block diagram of a second embodiment of information flow;

FIG. 3A illustrates an embodiment of the back side of a coupon card;

FIG. 3B illustrates an embodiment of the front side of a coupon card;

FIG. 7 illustrates an embodiment of a coupon code format;

DETAILED DESCRIPTION

Non-limiting embodiments of the invention are further described below. However, it should be appreciated that some of the features of the embodiments of the invention may be used to advantage without the corresponding use of other features. As such, the foregoing description should be considered as merely illustrative of the principles of the invention, and not in limitation thereof. Further, one skilled in the art may appreciate that the invention can be practiced by other than the described embodiments; that these described embodiments are presented for the purposes of illustration and not of limitation.

Embodiments of the invention relate to a coupon processing system and method that allows for automatic processing of coupons and provides linkage between a coupon card and coupon information stored in a centralized database. The coupon processing may entail validation (and invalidation) and, when validated, redemption of the appropriate coupon(s) or other appropriate action. The embodiments present novel ways of bundling technologies, including existing technologies such as real time communications and large volume data processing facilities, into a functioning operational platform and also present novel ways for doing business. Consumers may use the coupon card for a variety of products offered by a manufacturer and/or retailer.

Thus, according to some embodiments, a real time system is connected to the point-of-sale (POS) terminal and or POS controller wherein the real time system delivers manufacture paper coupon codes or GS1 paper coupon codes directly into a live transaction bypassing the POS scanner and the need for a paper coupon to be presented and subsequently cleared and settled manually. In another aspect of the invention, a real time system is connected to the POS terminal and or POS controller wherein the real time system can execute a coupon discount at the POS without any prior coupon definition or coupon data elements of the coupon related information being loaded onto the POS system. In yet another aspect of the invention, a real time system is connected to the POS terminal or POS controller wherein the real time system can determine in real time the association between the manufacture paper coupon code or the GS1 paper coupon code delivered by the real time system electronically bypassing the scanner and the product or products the coupon discount was applied to by the POS system.

Figure 1:
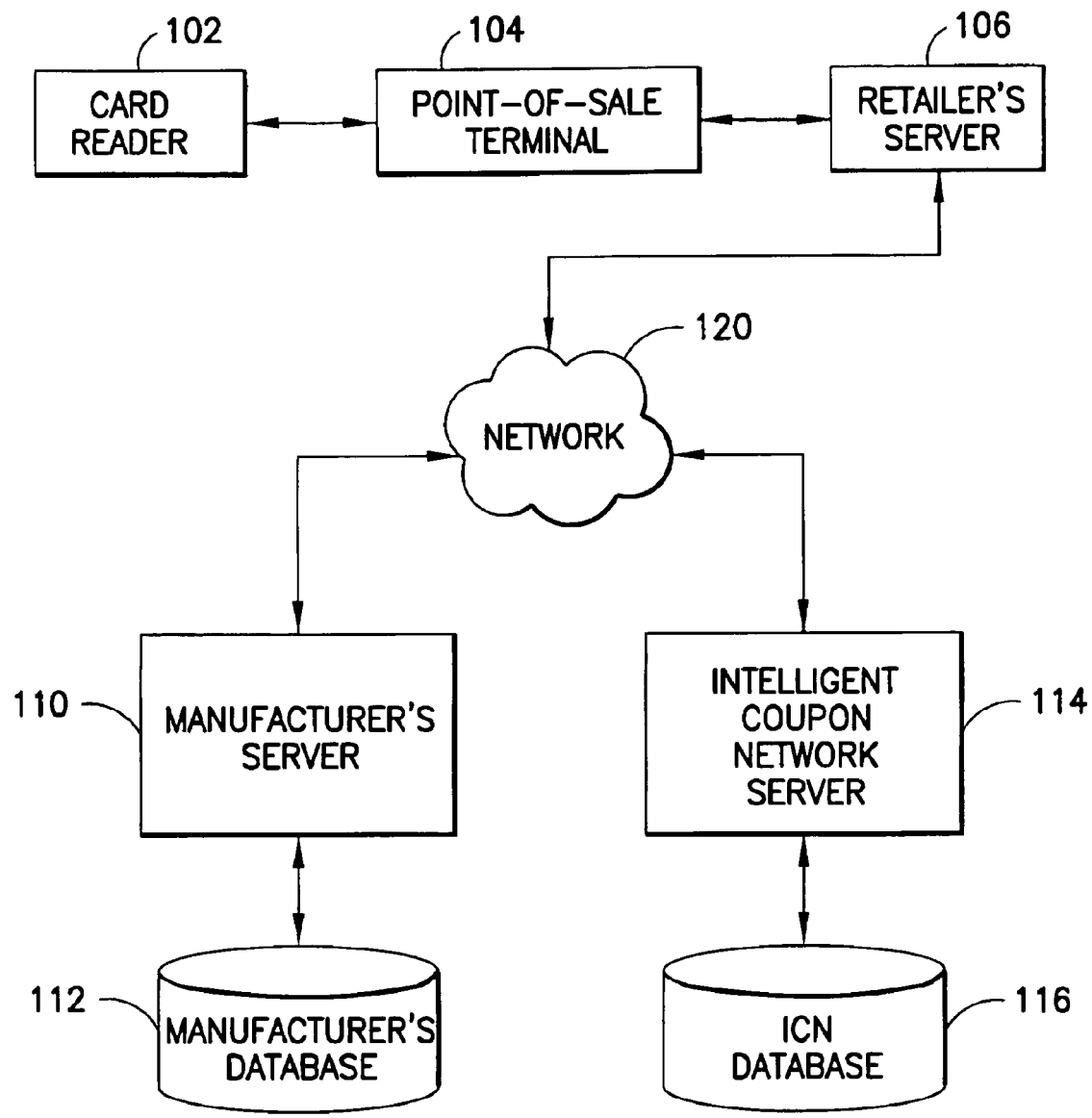
FIG. 1 illustrates an embodiment of a system for redeeming coupons.

FIG. 1 shows an embodiment of a system for redeeming coupons associated with a coupon card via a centralized database. The system may be an Intelligent Clearing Network (ICN) having an ICN server 114. The ICN may be an Intelligent Coupon Network, an Intelligent Incentive Network, an Intelligent Coupon and Incentive Network, or the like.

An ICN is a system that can provide for the electronic validation and redemption of coupons and/or incentives through real time communications and a centralized database, such as ICN database 116, which is coupled to the ICN server 114. The ICN server 114 executes software applications that process coupons for one or more manufacturers who have transacted with the owner of the ICN server 114 to provide such processing. The ICN server is accessible via a retailer's wide area or other network (WAN or other network) and has an ICN promotion redemption service (PRS) installed and running in real time to accept connections over a configured listening transfer control protocol port. In embodiments, a plurality of manufacturer servers 110 may be configured to communicate with the ICN server 114. The ICN server 114 may tabulate the raw data of the coupon processing transactions for a specific manufacturer and provide the tabulated data to the specific manufacturer in the form of reports.

Coupon and/or incentive processing typically include validation and redemption and the supplying of the raw data to the appropriate manufacturer. In the embodiment shown in FIG. 1, a coupon card may be read by a card reader 102 at a retail store or other establishment. The coupon information from the coupon card may then be sent to the Point-of-Sale (POS) terminal which then may transmit the information to the retail store server 106. The central component of a POS terminal is the processor that executes software application(s). The POS terminal may include a processor, memory, input/output interface circuitry, and the software application(s) to reformat coupon information in an appropriate digital form. The retail store server may record the coupon information and may transmit it to server 114, such as an ICN server, via a network 120. The retail store server, which may be a retail POS controller, includes a processor and input/output interfaces, as needed, and may be implemented as a microprocessor based device, a main frame, a stand alone computer, or a network of computing devices. An ICN server may be a server dedicated solely to the processing of manufacturers' coupons and includes a processor. Associated with the server may be a centralized database 116 that is incorporated within the server or may be a stand alone device or storage system, such as a Redundant Array of Independent Disks (RAID). The network 120 may be an internet, such as the World Wide Web, an intranet, an extranet, a virtual private network (VPN), a high speed dedicated communication line, or another network, and may use wired or wireless technology or a mixture of wired and wireless technology. The ICN server 114 then may notify the manufacturer of a completed transaction or completed set of transactions by sending status information to the manufacturer's server 110. As in the case of the ICN server 114, the manufacturer's server 110 may also include a processor, input/output interfaces, and memory to perform the function of processing coupons. The manufacturer's database 112 may be stored within a memory of the manufacturer's server 110 or as a stand alone device or system. Instead of transmitting coupon information from the retail server 106 to the ICN server 114, the coupon information may be transmitted from the retail server 106 to the appropriate manufacturer's server 110 for redemption. In this alternative embodiment, the manufacturer's server 110 notifies the ICN server 114 of the coupon redemption, as shown in FIG. 2B.

The coupon and/or incentive processing system (e.g., ICN system) distributes coupon codes, such as standard Uniform Code Council System 5 coupon codes or GS1 coupon codes, associated with a coupon card. In an embodiment, the coupon card may be a one-use card. In another embodiment, the coupon card may be useable as long as at least one coupon offer has not expired for a product that has yet to be purchased or a product limit that has not been attained. In yet another embodiment, the coupon card may be updated so as to provide additional coupon offers to a consumer. In still a further embodiment, the coupon card may be a permanent coupon card in which coupon information is updateable via a manufacturer's server or a coupon processing server.

Embodiments of the invention relate to information associated with a coupon card. A unique account number may be assigned to the consumer coupon card on a magnetic ink character recognition strip (i.e., magstripe) on the back of the consumer coupon card. A magstripe card has a strip of binding material containing ferromagnetic particles which is capable of storing data and is read by a reader head such as may be found in magnetic card readers. The system may include a centralized database containing the unique account numbers assigned to each card and a list of available manufacturer coupon codes assigned to the account numbers on each coupon card. The coupon card may link the consumer at the Point of Sale (POS) to a centralized database where the coupons, promotions, or incentives reside. The linkage of one or more coupons, promotions, or incentives to a coupon card may be set at the time the coupon card is provided with a unique account number or shortly thereafter. In embodiments, where the coupons, promotions, or incentives may be updated, the coupon card account number may be linked to various coupons, promotions, or incentives at various times. In distribution methods contemplated by the invention, the consumer may receive a coupon card through a variety of ways, including, but not limited to, on a product's package, newspapers, magazines, postal system mail, or in-store promotions. In one embodiment, during checkout, the cashier presses a coupon card function key on the POS terminal and the consumer may slide his or her coupon card through the card reader, whereupon the POS terminal software may establish a communications link with a server, such as the retailer's server 106 or other computing device, and transmit the account number on the coupon card over the store's real time communication line to the centralized database of a coupon processing computer, such as an Intelligent Clearing Network server 114. The centralized database application may validate the account number, query the centralized database for any active coupon codes found, and transmit the first set of digits/alphanumeric characters consisting of information, such as the NSC (Number System Code), Manufacturer Number, Family Code, and Value Code of each active coupon code back to the POS terminal. Then, the POS terminal may begin a validation process to validate each coupon code against products purchased by the consumer for any coupon code redeemed, and the POS application, upon validation of a coupon code, may transmit back to the centralized database the second set of digits/alphanumeric characters, corresponding to the redeemed coupon code, such as the NSC (Number System Code), Manufacturer Number, Family Code, and Value Code. In an example of an implementation, the first set and second set of digits are eleven digits each in the case of a system 5 coupon and or twelve digits each in the case of a system 99 coupon. The first and second set of digits may have an equal number of digits/alphanumeric characters or a different number of digits or alphanumeric characters. For example, the first set of digits may include 13 alphanumeric characters and the second set 11 alphanumeric characters.

The coupon card 302 may be formed on a substrate, such as plastic or paper or other medium that is typically flexible, sufficiently durable, and cost effective to produce. For example, a 10 mil thick plastic sheet may be sized to the length and width of a credit card or key ring card. Thus, the coupon card may advantageously be of various sizes including the form of a credit card, grocery store shopper's card or key ring for ease of carrying in a wallet or purse or on a key ring.

As shown in FIG. 3B, the front of the coupon card 302 may display an image 308 of one or more products for which the coupon card offers a discount, including an image 310 of the amount and conditions of the savings. The displayed image may be formed through printing directly on the substrate or through application of a preprinted label. Other image forming techniques may be used including polytronic labeling. To better protect the information on a coupon card, non-optically readable technology may be used. The non-optically readable technology may include electromagnetics, magnetics, or smart card technology. As shown in FIG. 3A, in an embodiment, the back of the coupon card 302 has a swipe strip 304, preferably a Magnetic Ink Character Recognition (MICR) strip. Alternatively, Radio Frequency Identification (RFID) technology or other electromagnetics technology, such as Radio Frequency Data Communication (RFDC), may be employed. Where an RFID coupon card is implemented, the corresponding electronic circuitry on the coupon card may be formed on or adhered to the substrate of the coupon card. Yet, alternatively, optically readable technology, such as optically scannable bar codes, may be used. In an optically readable embodiment, coupon identification information 306 may be provided in a user viewable form on the back of the coupon card 302. In certain embodiments, biometric identification techniques may be employed. For example, in a biometric identification embodiment, a fingerprint scanning pad may be attached or placed proximate to the card reader in which a communications link is established between the fingerprint scanning pad and the POS terminal.

Figure 5:
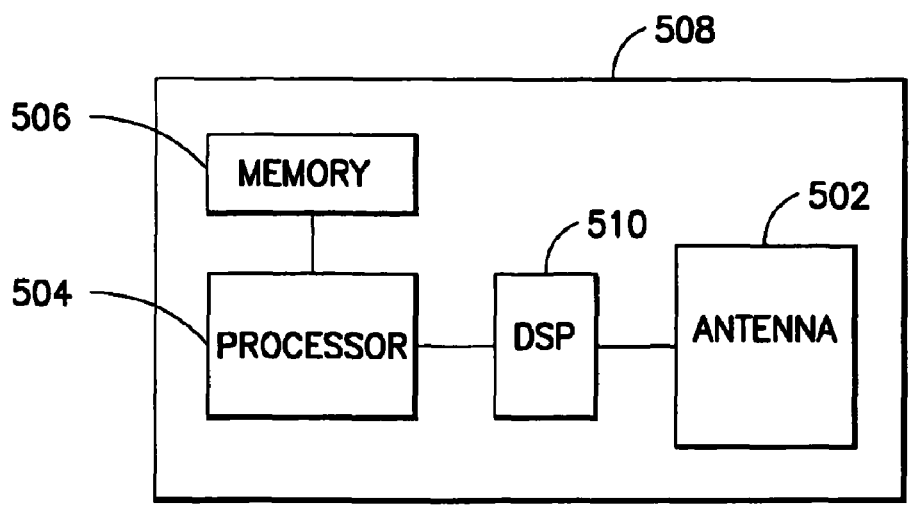
FIG. 5 illustrates a second embodiment of the coupon card utilizing RFID technology.

FIG. 5 illustrates an embodiment of a coupon card using RFID technology. An antenna 502 on the coupon card 508 may transmit and receive information from an RFID reader. The received information may be filtered, amplified, and digitized by processing signal circuitry 510 which may then be further processed for information content by processor 504. Coupled to the processor may be a memory 506. The coupon card memory 506 may be of one or more types of memory, including volatile memory, such as random access memory, and/or non-volatile memory, such as battery backed random access memory and/or read only memory.

Figure 4:
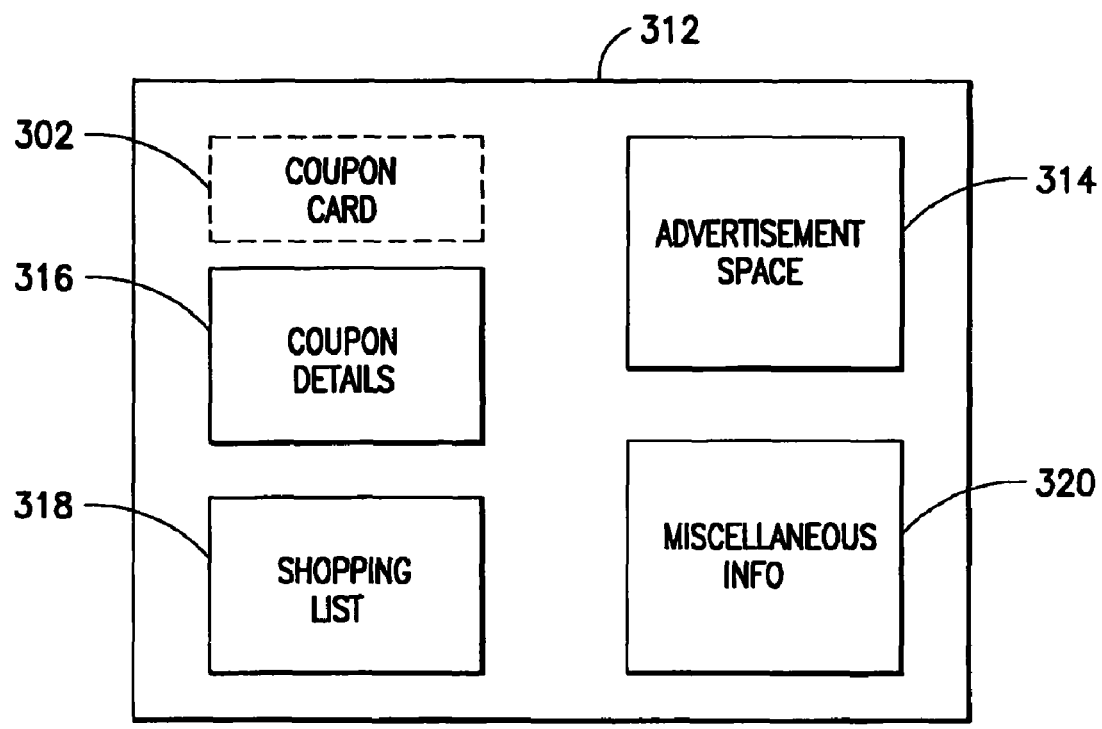
FIG. 4 illustrates a first embodiment of an insert with a card attached.

Embodiments of the invention offer a way for Consumer Package Good's (CPG) manufacturers (i.e., manufacturers of consumables such as cleaning products, food, beverages, clothing, and the like) to distribute GS1, Uniform Code Council guideline or other coupons without the need of an optically readable barcode. Through a Direct Mail promotion, In-Store promotion, or a Free-Standing Insert (FSI) in the Sunday newspaper, the consumer may receive an insert, sheet, or flyer with a coupon card having a Magnetic Ink Character. Recognition strip on its back. To aid a consumer, a shopping list 318, as shown in FIG. 4, may be provided along with a removable coupon card 302 detachable or removable from the insert, sheet, or flyer 312. To further aid a consumer, coupon information 316 may be printed or labeled on the insert, sheet, or flyer 312. The coupon information, in an embodiment, may provide a list of one or more brands with the amount of savings on a purchase; for example, Brand A's coupon may be a 50 cent off coupon, Brand B may require a purchase of two Brand B products for a savings of $2, Brand C may offer a 60 cent savings when purchased with Brand D, etc. Additionally, a space 314 may be dedicated to advertising, such as by displaying an image of one or more of the products, and another space 320 dedicated to miscellaneous information, such as a recipe. The revenue source for the coupons may be the manufacturer of Consumer Package Goods (CPG). The CPG manufacturer may pay for printing and distributing coupons on the coupon processing network, including FSI pages, Direct Mail, and In-Store, on package printing or labeling, coupon clearing fees, and real time data feeds for up to date promotion analysis and accounting.

Figure 6:
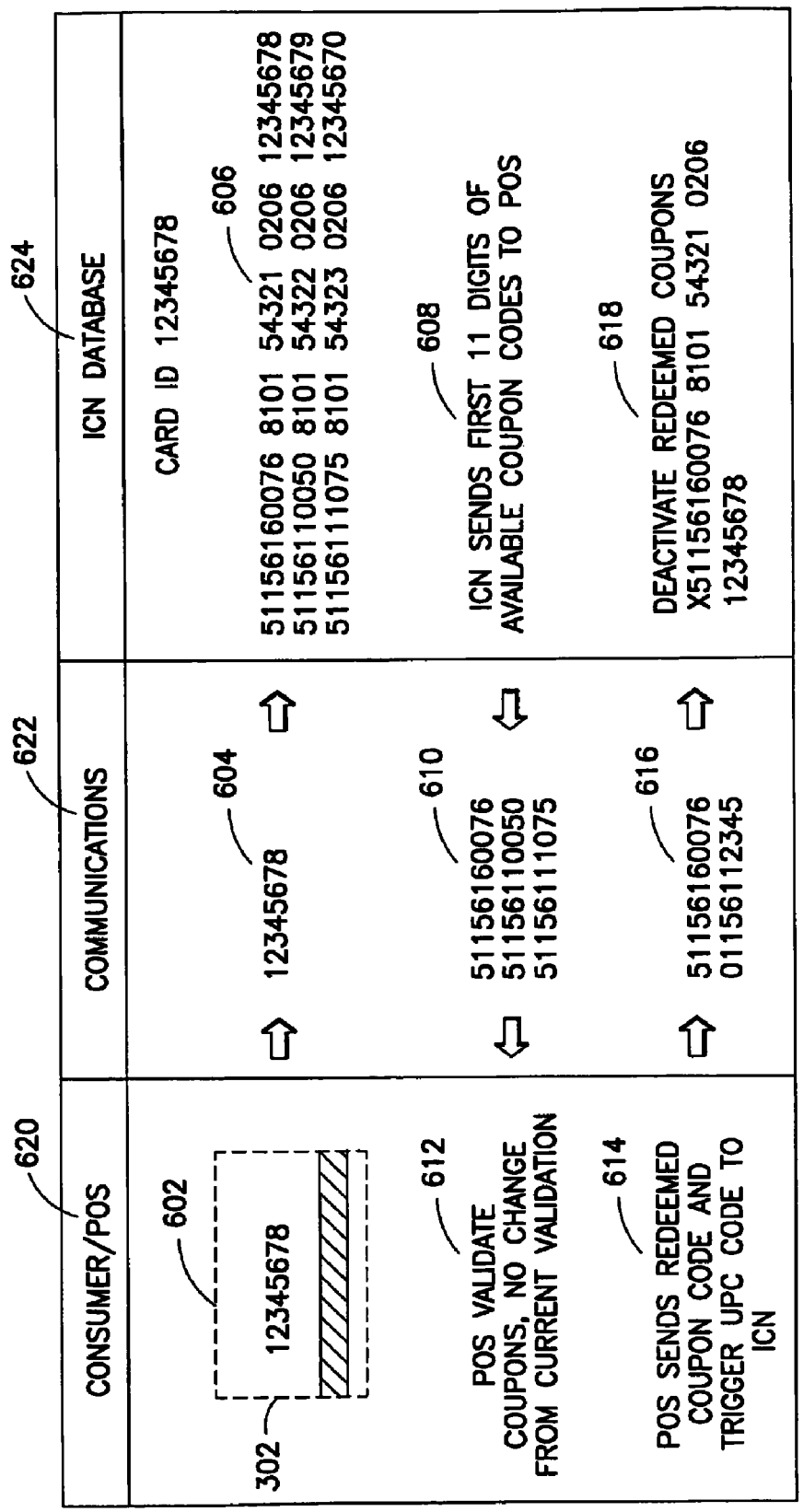
FIG. 6 illustrates an embodiment of a coupon redemption process between a Point of Sale terminal and an Intelligent Clearing Network server.

FIG. 6 illustrates an embodiment of a method for processing one or more coupons from a coupon card. In an embodiment, contained in the MICR strip of a coupon card is a unique number assigned to the coupon card. At the POS 602, the consumer may swipe his/her coupon card through a card reader as would be done in a debit or credit card transaction. Using the real time communication network in the store, a network message may be sent 604 to the centralized database containing the unique coupon card account number along with the retailer's identification and location. The coupon processing server coupled to the centralized database may validate the unique ID number 606 and search for available coupons assigned to the card in the coupon processing server centralized database. Any coupon codes which have not expired or were not previously redeemed may be transmitted back to the POS terminal for normal validation 608 as part of a message that includes the retailer's identification and location and the identification of the POS terminal. For any coupon which is redeemed, the POS terminal may send back a network message to the coupon processing server centralized database indicating which coupons were successfully redeemed. The coupon processing server centralized database may update the customer record, accordingly. As shown in FIG. 6, the coupon processing server may send the first several (e.g., eleven) digits/alphanumeric characters of the available coupon codes to the POS terminal via the retail server and network 610. The POS terminal may validate the coupons 612 and send the redeemed coupon code to the coupon processing server 614 as a second several digits/alphanumeric characters and also, as additional digits and alphanumeric characters, other GS1 coupon code information (e.g., by triggering the Uniform Product Code (UPC) of the barcode information from a scanned product corresponding to the coupon being redeemed), to the coupon processing server via the network 616. The coupon processing server may then deactivate the redeemed coupons 618. The coupon processing server may also retrieve the remainder of the GS1 code corresponding to each of the redeemed coupons and send this information and information regarding the unique coupon card number and retailer information (e.g., location, POS terminal identification, time of purchase) to the corresponding CPG manufacturer.

The method of distributing, redeeming, and clearing Manufacturer Coupons may benefit all three groups involved in the transaction—consumers, retailers, and manufacturers. The benefit to consumers is the ease of use because clipping and/or organizing coupons is no longer needed. The benefits to the retailer are reducing the labor associated with processing paper coupons and substantially reducing the time it takes to receive reimbursement for the promotions from the manufacturer. The benefits to the manufacturer potentially include a better product for the consumer resulting in increase response rates, real time promotion tracking, faster and more reliable accounting, and a reduction in fraud associated with paper coupons.

Thus, embodiments disclosed provide a system and method that may be used for electronically distributing and clearing a variety of coupons. Each coupon may have a code. Each coupon code may include a base portion and an extended portion. For example, the embodiments may be used with GS1 coupons, such as the formerly designated Uniform Code Council (UCC) system five and system ninety nine manufacturer coupons. GS1 format standards are maintained by the GS1 standards organization, formerly known as the Uniform Code Council. In an embodiment, similar to debit, credit and Electronic Benefit Transactions (EBT), the POS terminal reads a unique code from a coupon code and transmits this unique code to a centralized database, such as the centralized database of a coupon processing server via a network.

An example of an implementation of the coupon processing method of the invention is provided. A coupon card with unique coupon card account number 12345678 may have a coupon for 0.50 off a 2 liter beverage drink assigned to it; for example, 54900011050x, where x is the check digit. The check digit may be useful for paper coupons with barcodes being scanned by a scanner. On the ICN centralized database, the full coupon code assigned to card 12345678 may include a string of digits or alphanumeric characters such as 54900011050×8101 0 88062 0306. The consumer may purchase a 2 liter beverage drink with, for example, UPC code 0:49000:06390 and may swipe his or her coupon card. The POS terminal may transmit the coupon card account number, 12345678, to the ICN server. The ICN server may then send back a corresponding coupon code, e.g. 54900011050, to the POS terminal. The POS terminal then may determine if the coupon code is valid through a validation process, such as standard coupon validation routines. The POS terminal may send back to ICN a redeemed coupon code, e.g., 54900011050, and a triggering UPC product code, e.g., 04900006390. The ICN server may also provide in real time to the beverage drink manufacturer the fully redeemed coupon code, the location of the redemption transaction, and the product that triggered the redemption.

FIG. 7 shows an example of coupon format as the GS1 US format (formerly known as the Uniform Code Council System 5 coupon). A first portion of the coupon code may be GS1 US code, formerly known as the Universal Product Code (UPC), shown, in FIG. 7, to include a Number System Code, a manufacturer number, a family code, a value code, and a check digit. A second portion of the coupon code may be the 'Extended Portion,' which includes information such as Manufacturer Offer Code (MOC), Expiration Dates, Household Identifier, and associated application codes, and may correspond to the GS1, or European Article Numbering (EAN-128), format. The Extended Portion, as shown in FIG.

7, may include an application identifier, a product number system code (NSC), a manufacturer offer code (MOC), an expiration date, another application identifier, and a household identifier. While this information may be necessary to the manufacturer, it is not currently captured and the extended portion of the code may not even be read when scanned by the POS terminal in which case the manufacturer may have to wait weeks until the redeemed coupon has completed the long journey through the manual coupon clearing process. In contrast, with a coupon redeemed through a coupon card of the invention, this information is available immediately upon receiving the network message that a particular coupon has been redeemed. Other coupon code formats are contemplated by the invention.

The method for processing coupons may include reading first coupon related information from a coupon card at a Point-of-Sale (POS) terminal. The first coupon related information may be householder identifier information, account identification, or the like. The first coupon related information may be transmitted through a network to coupon processing server. If the coupon processing server validates the first coupon related information, second coupon related information may be transmitted from the coupon processing server through the network to the POS terminal. The second coupon related information may be one or more system 5 or system 99 coupon codes available to the identified consumer and may include the NSC (Number System Code), Manufacturer Number, Family Code, and Value Code.

Figure 8B:
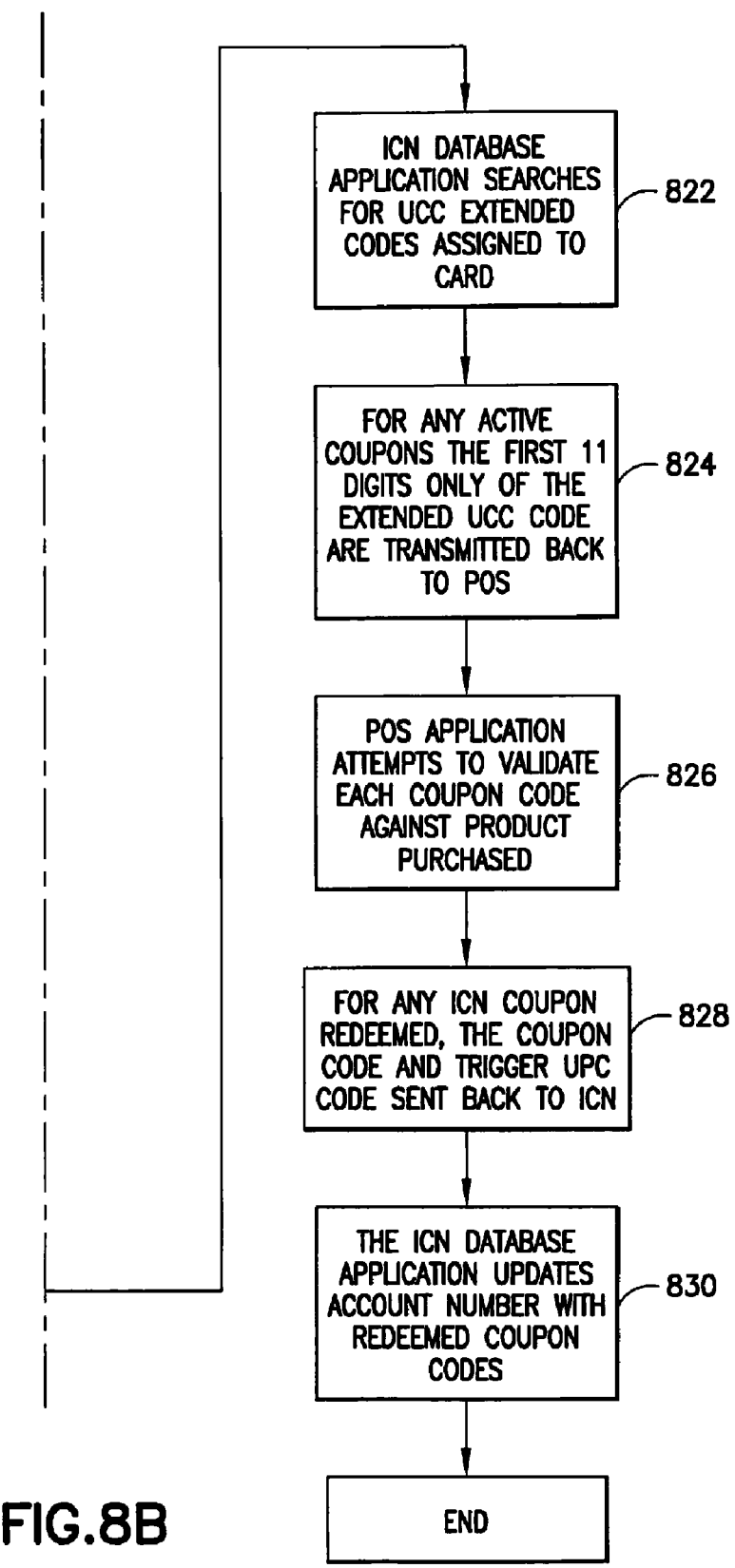
FIG. 8 (FIGS. 8A and 8B) illustrates an embodiment, in detail, of the process of generating and redeeming a coupon card.

FIG. 8 shows a flowchart of an embodiment of a method of the invention. A unique card account number, such as a unique coupon card account number, may be assigned to a coupon card 802. The unique card account number may be a randomly generated number, a household number, the first portion of the coupon code of FIG. 7, or the like. Coupon codes may be then assigned to the coupon card 804. For example, GS1 system codes may be assigned to the coupon card. The unique card account number and coupon codes may be loaded into the coupon processing server database 806. The unique card account number may be loaded onto the MICR strip of the coupon card 808 through a magstripe writer. The coupon card and promotion may be sent to the consumer 810. The consumer may present the coupon card during checkout 812 to purchase a product that corresponds to a coupon associated with the coupon card. The cashier may select the coupon card function key on the POS terminal keyboard 814. Alternatively, the coupon card redemption process may be initiated automatically through the reading of the coupon information on the card. The consumer thereupon may slide the coupon card through the card reader for a magnetic swipe card or wave the card in proximity to a RFID reader 816 which reads the unique coupon card account number. A software application of the POS terminal may transmit the unique coupon card account number (as first coupon related information) to the coupon processing server database application 818 as part of a message package that includes identification of the retailer and identification of the POS terminal, either directly or via a retailer server. The coupon processing server database application may validate the unique coupon card account number 820 or send back an error message to the POS terminal. The coupon processing server database application may search for the coupon code (e.g., GS1 code) assigned to the coupon card 822. For active coupons, in an embodiment, the first eleven or twelve digits/ alphanumeric characters of the coupon code consisting of the NSC (Number System Code), Manufacturer Number, Family Code, and Value Code may be transmitted back to the POS terminal 824 in a message package that identifies the retailer and the POS terminal (second coupon related information). In other embodiments, a different number of digits/alphanumeric characters may be used. The software application at the POS terminal initiates a validation process of each coupon code received against the product(s) purchased 826. For any coupon redeemed, the corresponding coupon code may be sent back to the coupon processing server 828 along with the triggering UPC code of the corresponding product purchased as well as identification of the retailer and POS terminal and time of purchase (third coupon related information). The coupon processing server database application updates the unique coupon card account number with the redeemed coupon codes 830. Furthermore, the coupon processing server may then retrieve the remainder of the GS1 code (i.e., the GS1 code that was not transmitted to the POS terminal) of each redeemed coupon and report this information as part of a report to the corresponding CPG manufacturer. The invention is useful for providing market intelligence quickly to a manufacturer, a benefit not known to be provided by current technologies.

Figure 9B:
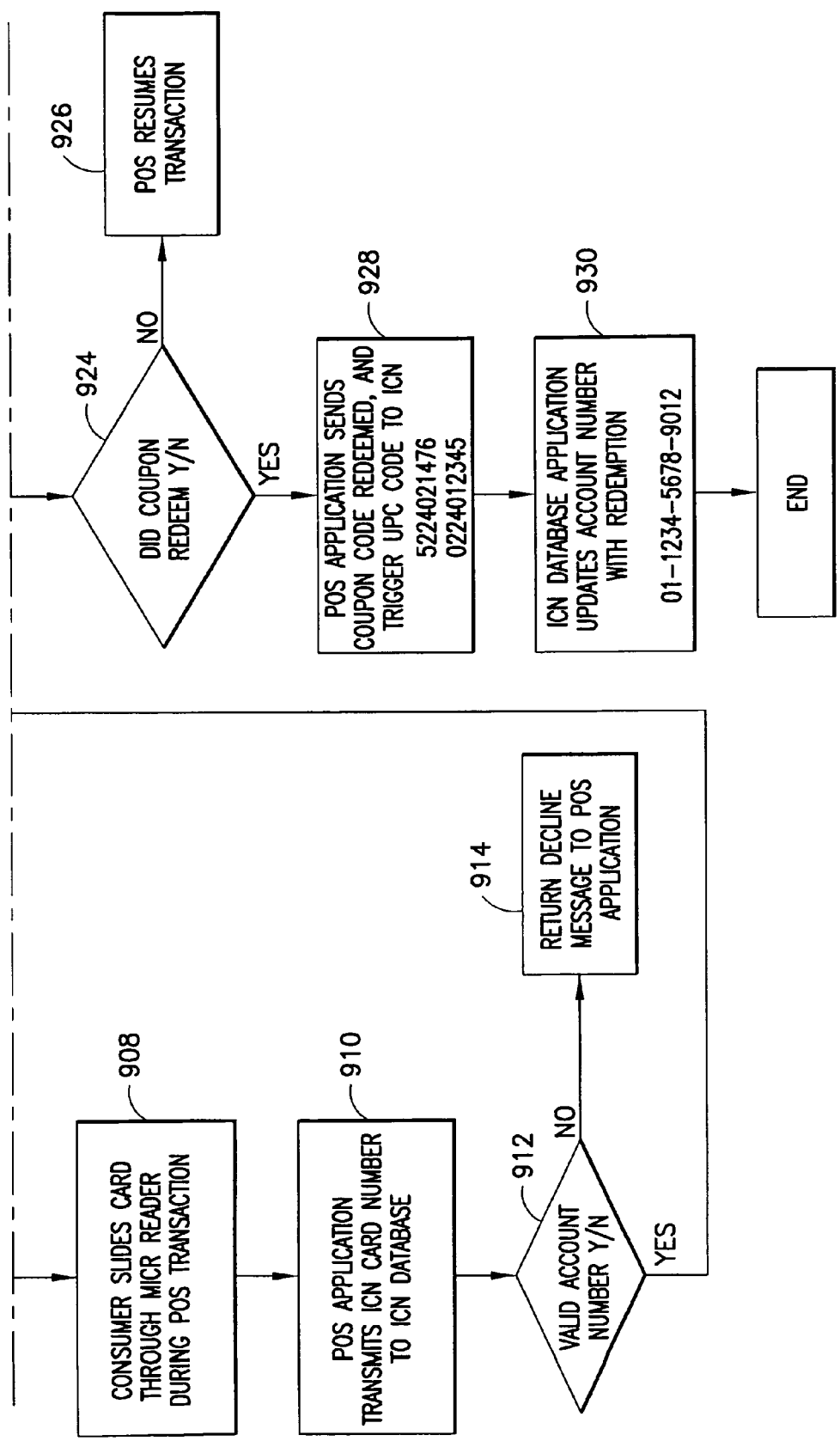
FIG. 9 (FIGS. 9A and 9B) illustrates an alternate embodiment, in detail, of the process of generating and redeeming a coupon card.

An alternative embodiment is provided in FIG. 9. The unique coupon card account number may be written to an MICR strip on the coupon card 902. The magnetic strip side of a coupon card is shown 904. The coupon code may be assigned to the card on the coupon processing server centralized database 906. A consumer may slide the coupon card through the MICR reader during a POS transaction 908. The POS software application may transmit the read unique coupon card account number to the coupon processing server 910 as part of a message package that identifies the retailer and the POS terminal (first coupon related information). The coupon processing server may check to determine if the unique coupon card account number is valid 902. If the account number is not valid, the coupon processing server may return a decline message to the POS software application 914. If the account number is validated, the coupon processing server database application may search for coupon codes assigned to the coupon card 916. A determination may be made as to whether there are active coupons available on the coupon card 918. If not, the coupon processing server may return a no coupons available message to the POS software application 920. If the coupon code is validated, active coupon codes (e.g., system 5 or 99 codes) assigned to the card may be transmitted back to the POS for validation against purchases 922 as part of a message package that identifies the retailer and POS terminal (second coupon related information). For example, the first 11 digits of the coupon code may be transmitted to the POS terminal for validation 922. A determination may be made as to redemption of the coupon(s) 924. If there has been no redemption of the coupon(s), the POS may resume the transaction 926. For coupons which are redeemed, the POS may send back the redeemed coupon code of the product which triggered the coupon redemption to the coupon processing server centralized database 928 along with the original redeemed coupon code information, the location of the retailer, identification of the POS terminal, and time of purchase (third coupon related information). The coupon processing server centralized database application may update the unique coupon card account number with the time, date, amount, location, and other information relating to the redemption activity 930. The coupon processing server may generate a report to the manufacturer regarding the coupon redemption transaction as requested or periodically to provide quick market intelligence to a CPG manufacturer.

Embodiments of the method of the invention may be implemented through instructions, stored on a computer-readable medium on a data storage device, which when executed by a computing device, cause the computing device to perform the designated operations. The instructions may be stored in computer-readable medium in a distributed fashion across two or more computing devices or as a single computing device. The computing devices may be one or more of the above mentioned servers. In an embodiment, the computer readable medium may be a small flash drive that connects to a Universal Serial Bus (USB) port of a POS terminal, a retailer server, or the like. For example, a small flash drive may measure less than about 10 cm×3 cm×3 cm or may have pen-sized dimensions, such as 71 mm×20 mm×8 mm.

In an embodiment, a computer readable medium storing computer code for processing coupons across a network in response to the non-optical reading of a coupon card, includes computer code for reading identification code from a coupon card that is non-optically read at a Point of Sale terminal; computer code for processing and formatting the read identification code; computer code for transmitting the formatted identification code across the network; computer code for receiving, interpreting, and validating the identification code at coupon processing server; if the identification code is validated, computer code for retrieving coupon codes corresponding to the identification code from a centralized database; computer code for transmitting the retrieved coupon codes to the Point of Sale terminal via the network; and computer code for redeeming the coupon codes.

The coupon processing server coupon distribution and processing system and method offers advantages including 1) being easy to use, 2) saving time and money, 3) providing better validation, 4) expanding promotion tracking, 5) increasing response rates, and 6) reducing fraud. The coupon processing server coupon distribution and processing system and method are easy to use because there is no clipping or organizing of coupons and the coupon card may be discarded after the coupons are redeemed. The coupon processing server coupon distribution and processing system and method saves time and money because it avoids the manual counting and clearing of paper for both retailers and manufacturers. Coupon processing server coupon distribution and processing system and method coupons clear electronically so that financial settlements may be completed in a short period of time, such as hours, rather than weeks or months. Coupon coding errors may be corrected immediately as manufacturers avoid the handling of misprinted coupons that may circulate for months at a time. The coupon processing server coupon distribution and processing system and method provides better validation because the expiration dates are enforced by the coupon processing server. Expired coupons are recognized as such and are not sent to the POS for validation. Paper coupons may not be redeemed at a POS because of a faulty barcode or improper coding or printing. With the coupon processing server coupon distribution and processing system and method described herein, the use of a magnetic ink character recognition strip or RFID eliminates the problem of poorly printed barcodes. Invalid coupon codes may be corrected immediately in the centralized database. The coupon processing server coupon distribution and processing system and method expands promotion tracking with the real time reporting of coupon redemptions. Manufacturers are provided with the product information for the product the consumer purchased to trigger the coupon redemption. Manufacturers may track results at the individual household level by assigning unique numbers to the extended portion of the coupon code's application identifier.

Embodiments of the coupon processing server coupon distribution and processing system and method described herein also increases response rates by making the process of collecting and redeeming coupons easier and more in line with today's technology. The coupon processing server coupon distribution and processing system and method further reduces fraud as each coupon may be redeemed only once. Advantageously, the coupon processing server coupon distribution and processing system and method centralized database, in accordance with embodiments, does not transmit to the POS a coupon which has already been redeemed. The coupon processing server coupled to the centralized database may also track in real time redemptions by store. Alternatively the centralized database may have one or more coupon processing processors built into it. Each redemption transaction has a date and time stamp. Abnormal transaction volumes from a particular store may be identified to prevent store personnel and/or others from fraudulently redeeming coupons for personal gain, to meet or exceed sales goals, and the like. The coupon processing server coupon distribution and processing system and method may prevent the assembling of a large volume of newspaper inserts to redeem coupons without selling the corresponding product. In another example, if someone were to determine how account numbers are generated on the coupon cards, the coupon processing serve may monitor in real time the volume and traffic of redeemed coupons and identify abnormalities to prevent coupon counterfeiting.

A further advantage is that embodiments may be implemented to provide a direct competitor to various marketing services by distributing coupon cards through Direct Mail, In-Store, and FSI or implemented as a service provider to marketing services. For example, marketing services companies may be charged for the distribution of coupons on the coupon processing server in which case the business model may be executed with less expense.

If a coupon is determined to be valid, but the retailer is temporarily out of stock, provisions may be made to issue a rain check electronically. The electronic rain check may be stored in the centralized database. Alternatively, in lieu of a rain check, the coupon processing server may offer a different product of the manufacturer at a special rate to the consumer.

As part of the system and method of the invention, in an embodiment, in-store scanners may also be provided to allow a consumer to reveal unexpired and unused coupons available through his or her coupon card.

In an embodiment, Consumer Package Good's (CPG) manufacturers may create and maintain their own shopper card program. For example, CPG manufacturer A may offer consumers a program in which each consumer or consumer household may sign up for a permanent card number. A consumer using such a coupon card may supply sufficient identification at the Point of Sale. This identification may include a driver's license, a passport, or other identification means, such as entry of a special code or biometrics scanning. The consumer, upon enrolling in a CPG manufacturer's program and being assigned a permanent coupon card, may then select discounts from CPG manufacturer A's web site in which the discounts would then be assigned to that permanent coupon card through a registration process using a centralized database of CPG manufacturer A.

Although some embodiments have been described with the use of a coupon card, embodiments of the invention may be practiced without a coupon card. Embodiments of the invention realized without a coupon card may be found in FIGS. 10-17 and 21. The embodiments described in FIGS. 1-9, in which a coupon card can be employed may also be adapted to not use a coupon card and instead to either permit a consumer to opt-in to coupons, promotions or incentives or permit a consumer to receive a discount on a product having a target UPC when the target product and/or a trigger product are purchased. A coupon as used herein is generally a paper, plastic, or other sufficiently physically durable incentive or discount having a manufacturer's UPC bar code to identify the product being discounted. It may generally be delivered via an FSI or direct mail where paper is the delivery vehicle. An incentive may be a non-paper (e.g., purely electronic) discount (e.g., a discount not embodied on a physical medium) provided via an in-store, web or mobile device delivery. Both coupons and incentives may provide a vehicle for delivering discounts that the ICN technology captures when the UPC bar code of a product being purchased is scanned at the POS terminal. A promotion may be the event that delivers coupons and/or incentives. An FSI paper coupon is an example of a promotion. An in-store tag incentive offering a discount for buying two of an item is another example of a promotion.

In addition to the embodiments referenced above in which media companies which produce media products may be provided with multiple coupon offers like FSI's, (Free Standing Inserts) a control number to avoid multiple redemptions of the same coupons, and the ability to track redemptions based on circulation, embodiments of the invention also can allow for activation of coupons based on or only on the contents of the consumer's basket, or allowing the consumer to opt into promotions via the internet or mobile device. This can allow for consumers to participate in in-store media promotions based on or only on the occurrence of the promoted products being present in the consumer's transaction at the POS.

Figure 14:
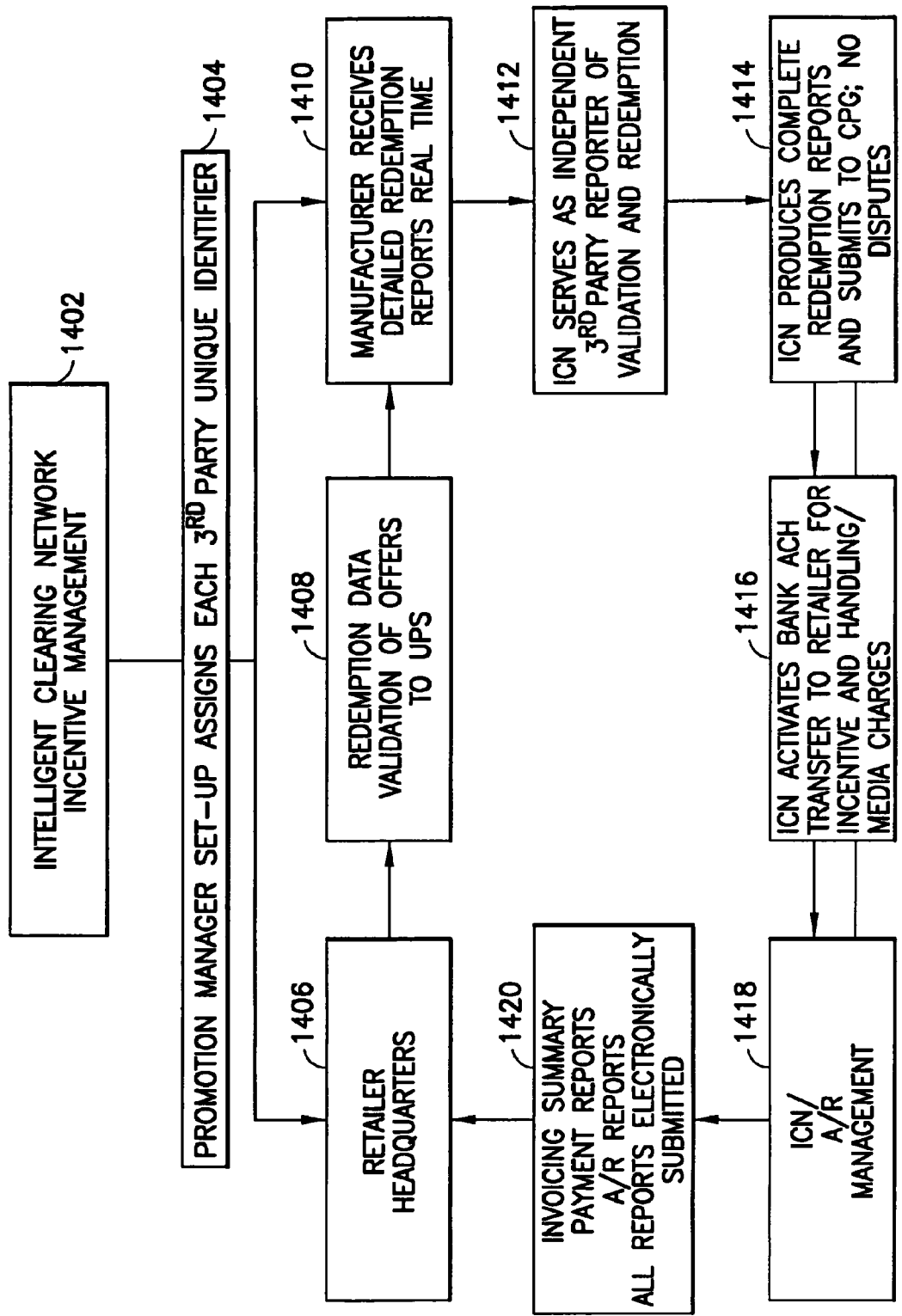
FIG. 14 shows an embodiment of ICN incentive management.

The ICN system can facilitate incentive management 1402. As an embodiment of a method of incentive management, FIG. 14 shows that ICN may assign each third party (e.g., a retailer, a media company, or a manufacturer) a unique identifier 1404 to securely log into the ICN promotion manager, a web application used for incentive management and real time reporting. A retailer headquarters 1406 may send redemption data validation of offers corresponding to the UPC 1408. A manufacturer may receive detailed redemption reports in real time 1410. The ICN may receive redemption information as an independent third party reporter of validation and redemption 1412. The ICN may generate complete redemption reports and submit these to the CPG manufacturer or distributor if there are no disputes 1414. The ICN may activate a bank automated clearing house (ACH) transfer to a retailer for incentive and handling/media charges 1416. Information regarding the automated clearing house (ACH) transfer may be sent to the ICN accounts receivable (A/R) management 1418 which may then generate invoicing summaries and accounts/receivables reports that may then be electronically submitted 1420 to retailer headquarters 1406.

The ICN promotion manager may be a secure portal that enables complete promotion set-up and control and serves as a user interface for defining retailer identity, promotion composition, and promotion availability. The promotion manager may be implemented as a web application, and be available on any computer with a web browser, such as Microsoft Internet Explorer, and an Internet connection. Access to the promotion manager may be controlled by ICN through managed user ID and passwords.

Figure 15:
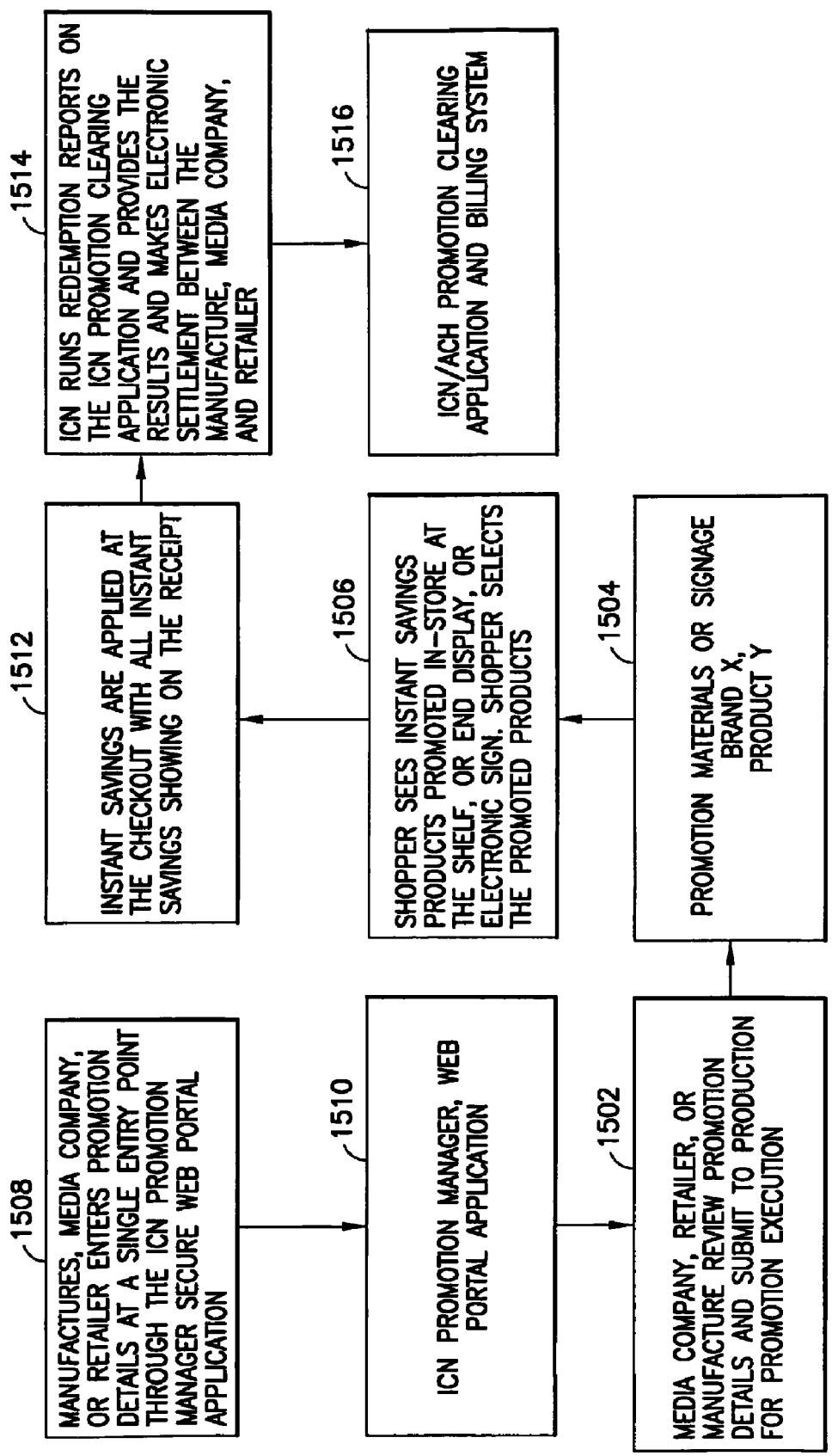
FIG. 15 shows an embodiment of a retail environment that uses ICN.

FIG. 15 illustrates an embodiment of a method of invention. Manufacturers, media companies, or retailers may enter weekly promotion details at a single entry point through the ICN promotion manager secure web site 1508. This may be done through an online through a program or portal on the world wide web 1510. For example, a representative for a manufacturer, media company, or retailer using the ICN promotion manager may establish start and stop dates of the promotion, the products affected, whether there is a trigger product and target product relationship, etc. A media company, manufacturer, or retailer may review the promotion data and submit to production for promotion execution 1502. Promotion execution may involve in-store signage, online coupons, in-store kiosks, mobile devices, PDAs, etc. in which, e.g., a Brand X, Product Y is offered 1504. A shopper who sees instant savings products in-store and on the shelf may select such products 1506. Instant savings can be applied at checkout with all instant savings showing on the receipt 1512. The ICN POS bridge software installed on the retailer's POS system (e.g., POS controller) or other device provides transaction information to the ICN. Then, the ICN can run redemption reports on the ICN promotion clearing application and provide the results, and can make any needed settlement, e.g. billing and payment, between the manufacturer and the retailer 1516.

Consumers may opt into Internet based promotions or mobile device promotions by identifying themselves and purchasing the qualified products in which the consumer might not have a physical card to present. During the checkout process the consumer may identify himself or herself uniquely by entering their unique ID entered when he/she opts into the promotion on the retailer, manufacturer, or media company web site. The unique ID may be included in the transaction information along with the UPCs or products purchased and transmitted in real time to the ICN server. Or, the consumer may opt into the promotion anonymously. When the consumer opts in, he or she may use their phone or other number as the account number which the coupon(s) would be assigned to. For example, he or she may provide his or her phone number to the cashier or type it in on the keypad during checkout, or the consumer's mobile device or cell phone may have an image containing the consumer's cell phone number which may be scanned by the cashier. He or she may also opt in using the particular retailers frequent shopper card number, the coupon(s) would be tied to the presence of that card number or phone number in the POS transaction.

Figures 12, 12A, 12B:
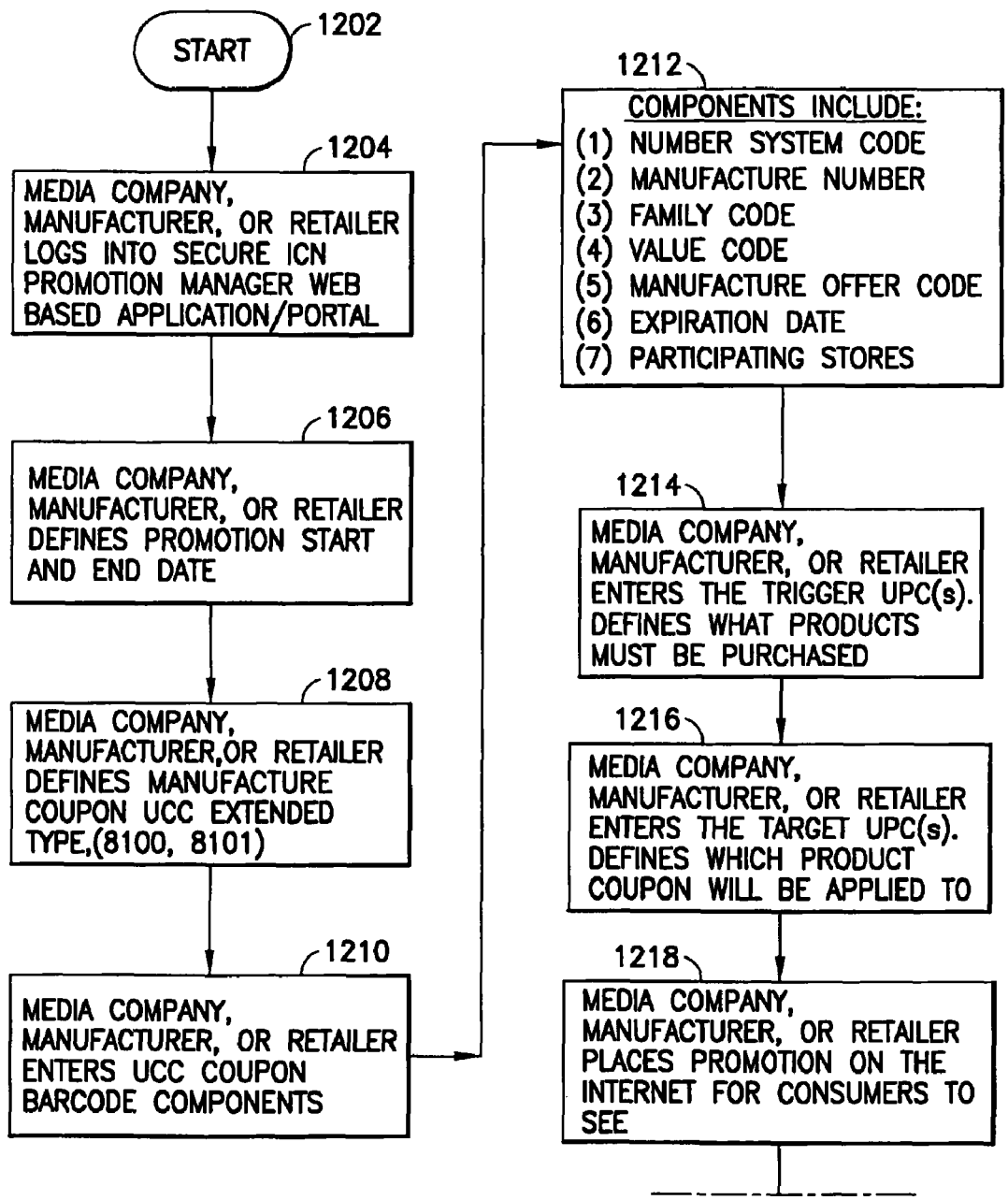
FIG. 12 (FIGS. 12A and 12B) shows an example of a process for assigning and display promotions and purchasing products advertised through the promotions.
Figure 12B:
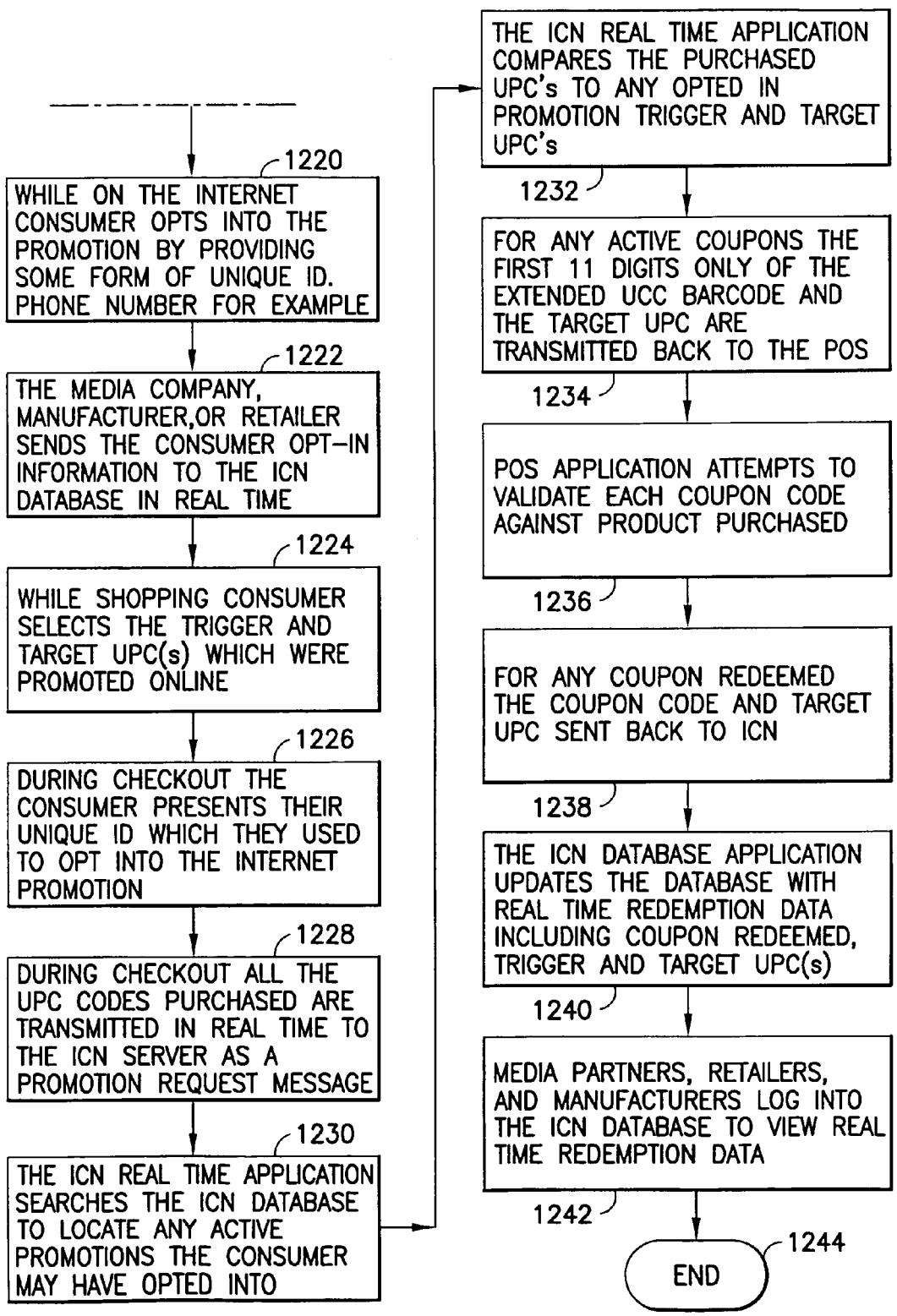

FIG. 12, as FIGS. 12A and 12B, shows an embodiment of a process for setting up and using trigger and target UPCs to qualify a coupon or promotion during a transaction. In the method of setting up trigger and target UPC promotions 1202, shown in FIG. 12A, the media company, manufacturer, or retailer logs into the secure ICN web based promotion manager application to create a promotion 1204. The media company, manufacturer, or retailer may define a promotion start and end date 1206, may define the manufacturer coupon by information such as UCC extended type (e.g., 8100 or 8101) 1208, and may provide UCC coupon barcode component information 1210, such as number system code, manufacturer number, family code, value code, manufacturer offer code, and expiration date 1212. The media company, manufacturer, retailer or other party may enter each of the trigger UPCs and defines the product that must be purchased corresponding to each individual trigger UPC 1214. The media company, manufacturer, retailer or other party can also enter the target UPCs and can define the produce that must be purchased corresponding to each individual trigger UPC 1214. The media company, manufacturer, retailer or other party can also enter the target UPCs and define to which product a specified coupon may be applied 1216. The media company, manufacturer, retailer or other party can advertise the sale arrangement of the trigger UPC and target UPC by various techniques, such as signage in a store such as a display (e.g., in-store shelf ads), printed materials, electronic sign (e.g., floor graphics), or through an in-store kiosk or through advertisements on a web site 1218.

Coupons may have trigger UPCs and target UPCs that are the same. That is, the UPCs which trigger the coupon are also the same UPCs which the coupon is applied to. For example, buy two of product C, save $1.00. In more complex coupons and promotions, the trigger and target UPCs may be different. For example, buy product C and save $1.00 on product D.

FIG. 12B shows an embodiment of a method for using trigger and target UPCs that may be used in conjunction or separately from the method shown in FIG. 12A. Here, at a retail site, the consumer may place products which correspond to defined and advertised promotions created using the ICN promotion manager application with trigger and target UPCs in a shopping cart, perhaps as a result of promotional signage at the retail site 1220. The media company, manufacturer, or retailer may send the consumer opt-in information to the ICN database in real time 1222. While shopping, a consumer may select the trigger and target UPCs which are promoted online or otherwise 1224. During checkout, the consumer may present their unique ID which they used to opt into the Internet promotion 1226. Then, all the UPC codes of the products then in the shopping cart may be transmitted in real time using the ICN POS bridge software installed on the retailer's POS controller and POS terminal to the ICN promotion redemption real time service running on the ICN server in a promotion request message 1228. The ICN real time application may search the ICN database to locate any active promotions the consumer may have opted into 1230. The ICN promotion redemption real time application can compare the purchased UPCs to all active promotion trigger and target UPCs in the ICN database to determine any tie in or bundling relations, for example, ones in which the purchase of a product with a trigger UPC would provide a discounted price for the purchase of the product with a corresponding target UPC 1232. In an example, for any active coupon or incentive, the first 11 digits only of the extended UCC coupon code, the target UPC, and target UPC price may be transmitted back to the point-of-sale terminal 1234. The point-of-sale application attempts to validate each coupon code against the corresponding product purchased 1236. For any coupon or incentive redeemed, the coupon code and target UPC may be sent back to the ICN promotion redemption real time application in the form of a promotion confirmation message 1238. The ICN promotion redemption application may update the ICN database with real time redemption data including the coupon redeemed and trigger and target UPCs 1240. At some point, media partners, retailers, and manufacturers may log into the ICN database to view real time redemption data 1242, 1244.

The retail POS controller, the POS terminal, and the ICN server may each include a processor, as discussed previously, and may have one or more associated memories as well as interfaces for communication with other devices.

In an embodiment, if the ICN promotion redemption real time application or the ICN database server is experiencing down time, the ICN POS bridge software installed on the retailer's POS controller may automatically fail to a backup ICN promotion redemption real time application and a mirror database maintained by the ICN.

In accordance with yet another aspect of the invention, the ICN can be used to deliver coupons and promotions to a consumer who has opted into a coupon or promotion by visiting the retailer, manufacturer, or media company web site. In this embodiment of the invention, the retailer, manufacturer, or media company can transmit in real time or batch the consumer opt-in information to the ICN database. The consumer opt-in information may include, but is not limited, to a customer identification number which may be but is not limited to the consumer's phone number or frequency shopper identification number, the coupons, incentives, or promotions the consumer opted into and the details of the coupon, promotion, or incentive. The coupons, incentives, or promotions may be retrieved by the ICN promotion manager web application and sent over a network or directly communicated to CPG or CPG media partner which may then provide the coupons, incentives, or promotions as the in-store promotion display or advertisement. Opt-in permits the consumer to participate in promotions without the requirement of printing the coupon at home and bringing it into the store to redeem.

Figure 11:
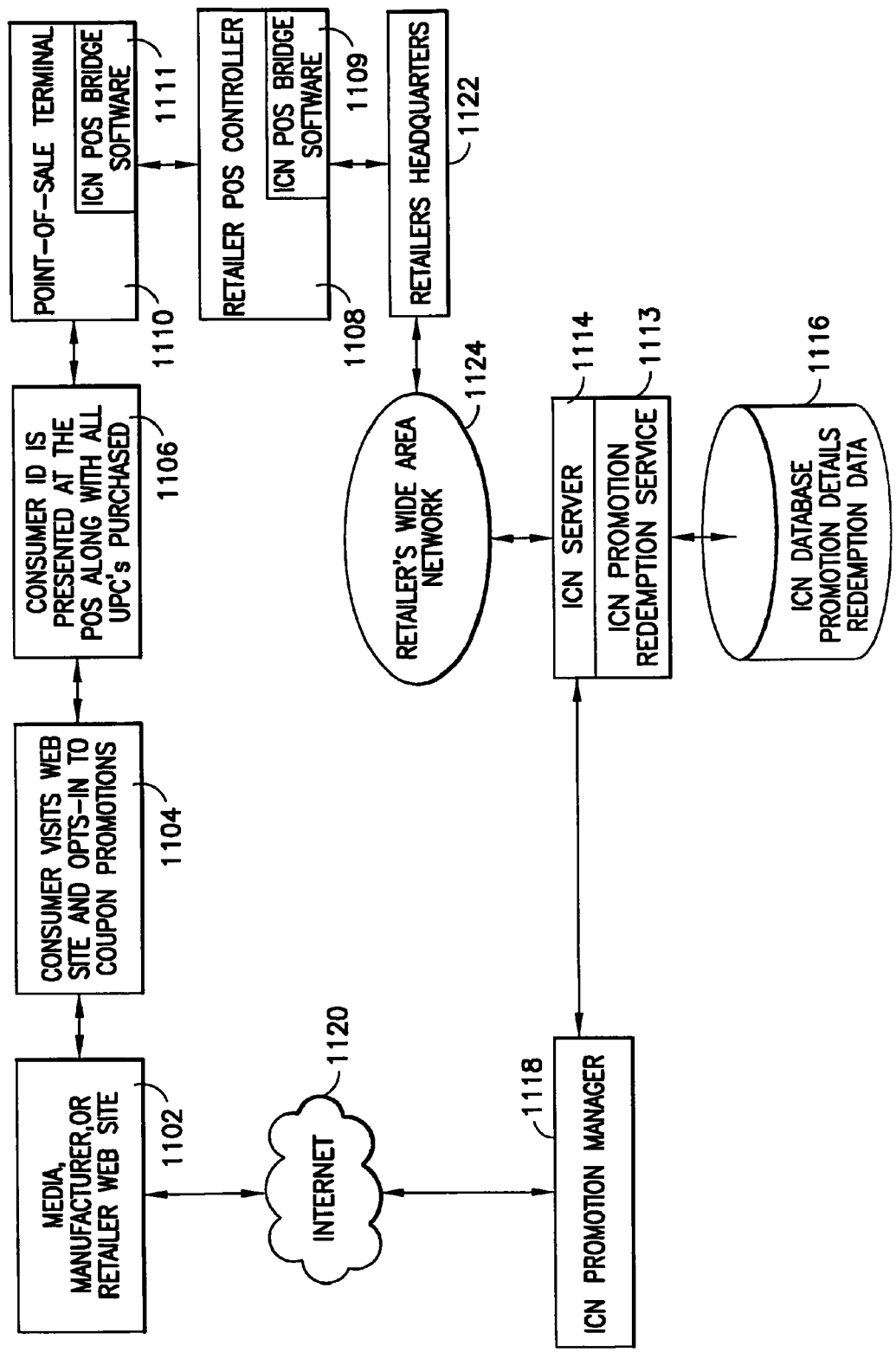
FIG. 11 shows an embodiment of a system permitting a consumer to opt-in to coupons, promotions, or incentives.

An embodiment where a consumer may opt-in to retrieve a coupon is shown in FIG. 11. Here, a media, manufacturer, or retailer web site 1102 or other party may display one or more selectable coupons for downloading or other retrieval, such as fax to a consumer at a terminal. The media, manufacturer, retailer or other party may be provide promotion or coupon details to the ICN either by manually entering the information into the web based ICN promotion manager application 1118, or by transmitting the information via a web service or batch mode to the ICN promotion manager application 1118, including coupon codes, expiration dates, store location, and trigger and target UPCs. When the consumer visits 1104 the media, manufacturer, or retailer web site 1102 and presents his or her identification, coupons with control numbers selected by the consumer may be printed out or downloaded to the ICN promotion manager 1118 and the ICN database 1116. When the consumer visits the retailer's store and has been provided with knowledge as to available coupons, upon checking out a transaction at a point-of-sale terminal 1110 or other terminal, such as when shopping from home, the point-of-sale terminal or other terminal may provide transactional information, such as UPCs or other product information through the ICN POS bridge software 1111 installed on the retailer POS terminal 1110 to the ICN POS bridge software 1109 installed on the retailer's POS controller 1108. At this point, the ICN POS bridge software 1109 installed on the retailer's store controller 1108 may format a promotion request message and send the promotion request message in real time from the retailer's headquarters 1122 to the ICN promotion redemption real time service 1113, via a network, such as a retailer's wide area network 1124, which is running as a real time service on the ICN server 1114. The ICN promotion redemption service 1113 may compare the UPCs contained in the promotion request message to all active promotions defined by the manufacturer or its representative on the ICN database 1116. For an active promotion where the UPCs contained within the promotion request message satisfy the requirements of that promotion, the ICN promotion redemption service may format a promotion request response message which may include portions of the manufacturer coupon code as shown in FIG. 6 plus the target UPC number of the product the manufacturer coupon may be applied to. The promotion request response message may then be sent back to the ICN POS bridge software 1109 installed on the retailer's store controller 1108 via the retailer's wide area network 1124 (or, other network) and the retailer's headquarters 1122. The ICN POS bridge software 1109 installed on the retailer's store controller 1108 may be located at one or more or each of the retailer's stores and may then transmit the message to the ICN POS bridge software 1111 installed on the retailer's POS terminal 1110. The retailer's POS terminal 1110 may attempt to redeem the manufacturer coupon against the target UPC contained in the promotion request message.

Upon completion of the checkout transaction 1106 the ICN POS bridge software 1111 may generate a redemption confirmation message which may contain information regarding the success for the coupon redemption process. The redemption confirmation message may be transmitted to the ICN POS bridge software 1109 installed on the retailer's store controller 1108 which can transmit the redemption confirmation message to the ICN promotion real time redemption service 1113 running on the ICN server 1114, completing a communication loop. In an embodiment, access to the ICN database 1116 is provided only through the ICN server 1114.

The details of the coupon, promotion, or incentive may include NSC Number, Manufacturer Number, Family Code, Value Code, Application Identifier, Product NSC, MOC Code, Expiration Date, Application Identifier, Household Number, Trigger UPCs, Target UPCs, and participating store information may be stored in the ICN Database 1116 and used to validate the purchases in real time by the ICN Network Server 1114. Portions of the Manufacturer coupon, promotion, or incentive may be sent down by the ICN promotion redemption service 1113 to the ICN POS bridge software 1109 installed on the retailer's POS controller 1108 and passed to the ICN POS bridge software 1111 installed on the POS terminal 1110, and then delivered to the active checkout transaction 1106. An ICN promotion manager 1118 may set up coupons and/or promotions over a network 1120 at a media, manufacturer, or retailer web site 1102 using the ICN database 1116.

In accordance with another aspect of the invention, coupons or incentives may be delivered to the consumer based on or entirely on the presence of specific UPCs or products contained in the consumer's transaction at the POS during checkout. An example of this embodiment is a media company advertising a savings, incentive in-store, on the web or via a mobile device which would only require the consumer to purchase the required UPCs or products to activate and receive the coupon or savings.

Figure 10:
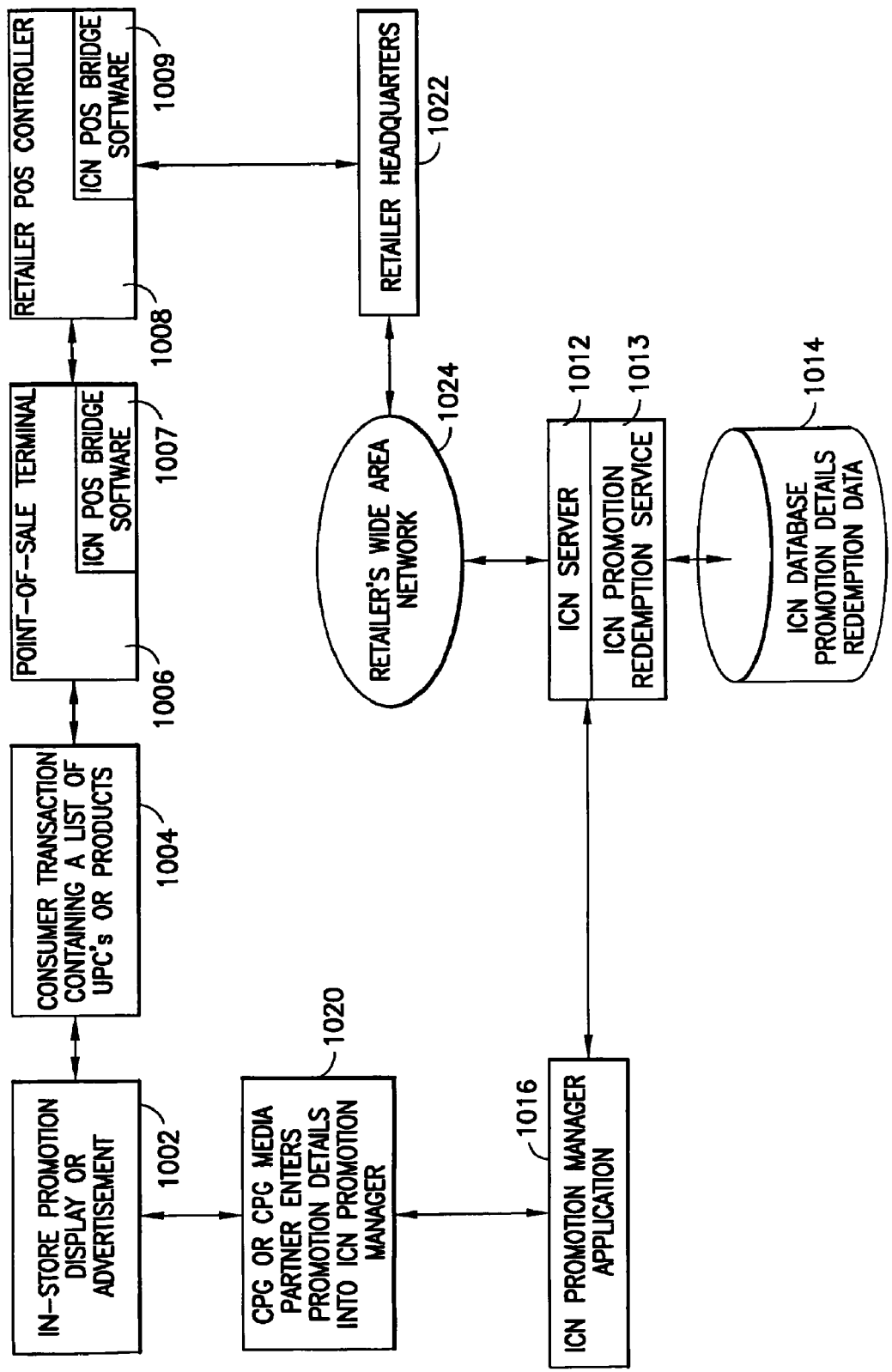
FIG. 10 shows an embodiment of a system using trigger and target UPCs over a network.

FIG. 10 shows an embodiment in which coupons are delivered based on the presence of specific UPCs or products in the consumer's transaction 1004. An in-store or online or mobile device promotion may display or advertise products on promotion or at a discounted price 1002. The promotional information may come from a manufacturer or its representative which sets up sale or discount information and interacts with the ICN promotion manager 1016 (e.g., web application) to store this sale or discount information and other promotion details in the ICN database 1014. Upon the start of a checkout transaction 1004 at the POS terminal 1006 the consumer can present a collection of products with UPCs 1004 to be purchased for scanning by the POS scanner or by manual entry through the keyboard by the cashier. In further accordance with the embodiment, the basket of UPCs or products 1004 is communicated by the POS terminal 1006 by means of the ICN POS bridge software 1007 installed on the POS terminal 1006 to the retailer's store controller 1008 which also may contain ICN POS bridge software 1009. The ICN POS bridge software 1009 installed on the retailer's store controller 1008 may be located at one or more or each of the retailer's stores and may format a promotion request message and send the promotion request message in real time via the retailer's headquarters 1022 and the retailer's wide area network 1024 from the retailer's headquarters 1022 to the ICN promotion redemption real time service 1013, which is running as a real time service on the ICN server 1012, via a network, such as a retailer's wide area network 1024. The ICN promotion redemption service 1013 may compare the UPCs contained in the promotion request message to all active promotions defined by the manufacturer or its representative on the ICN database 1014. For any active promotion where the UPCs contained within the promotion request message satisfy the requirements of that promotion, the ICN promotion redemption service may format a promotion request response message which includes portions of the manufacturer coupon code FIG. 6 plus the target UPC number of the product the manufacturer coupon is to be applied to. The promotion request response message may then be sent back to the ICN POS bridge software 1009 installed on the retailer's store controller 1008. The ICN POS bridge software 1009 installed on retailer's store controller 1008 may transmit the message to the ICN POS bridge software 1007 installed on the retailer's POS terminal 1006. The retailers POS terminal 1006 may then attempt to redeem the manufacturer coupon against the target UPC contained in the promotion request message. Upon completion of the checkout transaction 1004 the ICN POS bridge software 1007 may generate a redemption confirmation message which may contain information regarding the success of the coupon redemption process. The redemption confirmation message is transmitted to the ICN POS bridge software 1009 installed on the retailer's store controller 1008 which may transmit the redemption confirmation message to the ICN promotion redemption service 1013 running on the ICN server 1012 which then may complete the communication loop. In an embodiment, access to the ICN database is provided only through the ICN server 1012.

The POS data bridge may be implemented as at least one device with software that may be a configurable software suite that is physically installed on the POS environment (controller, and/or terminals, etc). The ICN Data Bridge may control various POS behavior based on information sent and received to and from the ICN server(s). The POS data bridge software, in an embodiment, may have two distinct parts: one installed on the POS controller in a store and the other installed on each POS terminal in a store. Versions of the POS data bridge software may be adapted as needed or desired for each unique POS vendor (e.g., retailer). In a specific example, a POS data bridge software may be provided for IBM 4690 POS systems in a grocery retail setting or other POS solutions for retail, supply chain, and/or distribution operations of enterprises. This may include but is not limited to:

- Transaction & basket information needed for promotion qualification being sent to ICN server(s) via a Promotion Request. This information may include (but is not limited to) data such as store, lane/terminal, transaction number, cashier, datetime, loyalty card(s), and all scanned data, including for normal, void, etc. scenarios.
- Coupon & promotion information being received from ICN server(s) via a Promotion Response. The data bridge software may receive promotional coupon and/or incentive information back from the ICN servers to the POS terminals via the POS controller(s) and the retailer's HQ, where the promotional coupon and/or incentive information includes but is not limited to the coupon code/number, ICN promotion number, value of the coupon, target item(s) which the coupon should be applied to, and text to display on the receipt describing each coupon, both for normal and void scenarios.
- Coupon & promotional information being sent to the ICN server(s) via a Redemption Confirmation. This may include but is not limited to information such as the coupon's value (for hard to handle coupons such as buy x, get x free), the ICN promotion number, the coupon code/number, the tlog datetime (the datetime logged to the tlog's transaction header record is typically the time of the last activity of the transaction), the gross transaction total, etc. both for redeemed promotions or coupons and also for voided promotions or coupons.

Receiving from the ICN server(s) a Redemption Confirmation Acknowledgement that all redeemed coupons were received and passed validation, or that the redemptions were invalid for a noted reason.

Voided Transaction notification being sent to the ICN server(s) via a Voided Transaction message. In the POS world this indicates the entire transaction is over and everything within is considered null and void.

Voided Transaction Acknowledgement being received from the ICN server(s) indicating ICN has considered all activity from that transaction null and void.

POS status information being sent to the ICN server(s) via a Client Status Update message. As part of regular network diagnostic updates, the ICN Data Bridge updates ICN with information such as but not limited to the number of lanes attached to a controller, the average response time the POS is experiencing for message round trips, the number of erroneous or dropped message scenarios, the store number, the POS version and vendor, the ICN Data Bridge and ICN API versions, the current datetime, the datetime the ICN service started, etc.

Receiving from ICN server(s) a Client Status Update Acknowledgement.

Sending and Receiving message faults to and/or from the ICN server(s) when erroneous or unexpected scenarios are encountered.

The ICN Application Programming Interface (API) may be a piece of ICN code built into the data bridge which controls 1) the encoding/decoding of ICN messages in either XML or ICN's binary format. The XML message encoding protocol capability enables 3rd party integrators leveraging devices that do not send as many messages as a POS does, and greater ease of integration. The binary message encoding protocol is compact, designed for speed and lower bandwidth requirements, which lends well to retailers with many stores that each have many lanes.

The communications between the retailer's POS controller 1008 and the retailer's headquarters 1022 may be any transmission control protocol/interne protocol (TCP/IP) communication network. For example, the TCP/IP communication network may be the retailer's wide area network 1024. Other examples of TCP/IP communication networks that may be used include digital subscriber line (DSL), T1, integrated services digital network (ISDN), multiprotocol label switching (MPLS), etc. The retailer's headquarters 1022 itself may be a centralized point within the retailer's wide area network to which the ICN bridges via ICN bridge software for all network connectivity. It may be the ICN's entry point into the retailer's network (e.g., WAN). The retailer's headquarters 1022 may be the data center (e.g., single node) that facilitates communications with the ICN server or may be a multi-node such as for major tier 1 retailers widely distributed geographically. The communications network between the POS controller 1008 and retailer's headquarters 1022 may also be used between the POS controller 1108 and retailer's headquarters 1122. The retailer's headquarters 1122 may be the same kind of retailer's headquarters as retailer's headquarters 1022.

Figure 21:
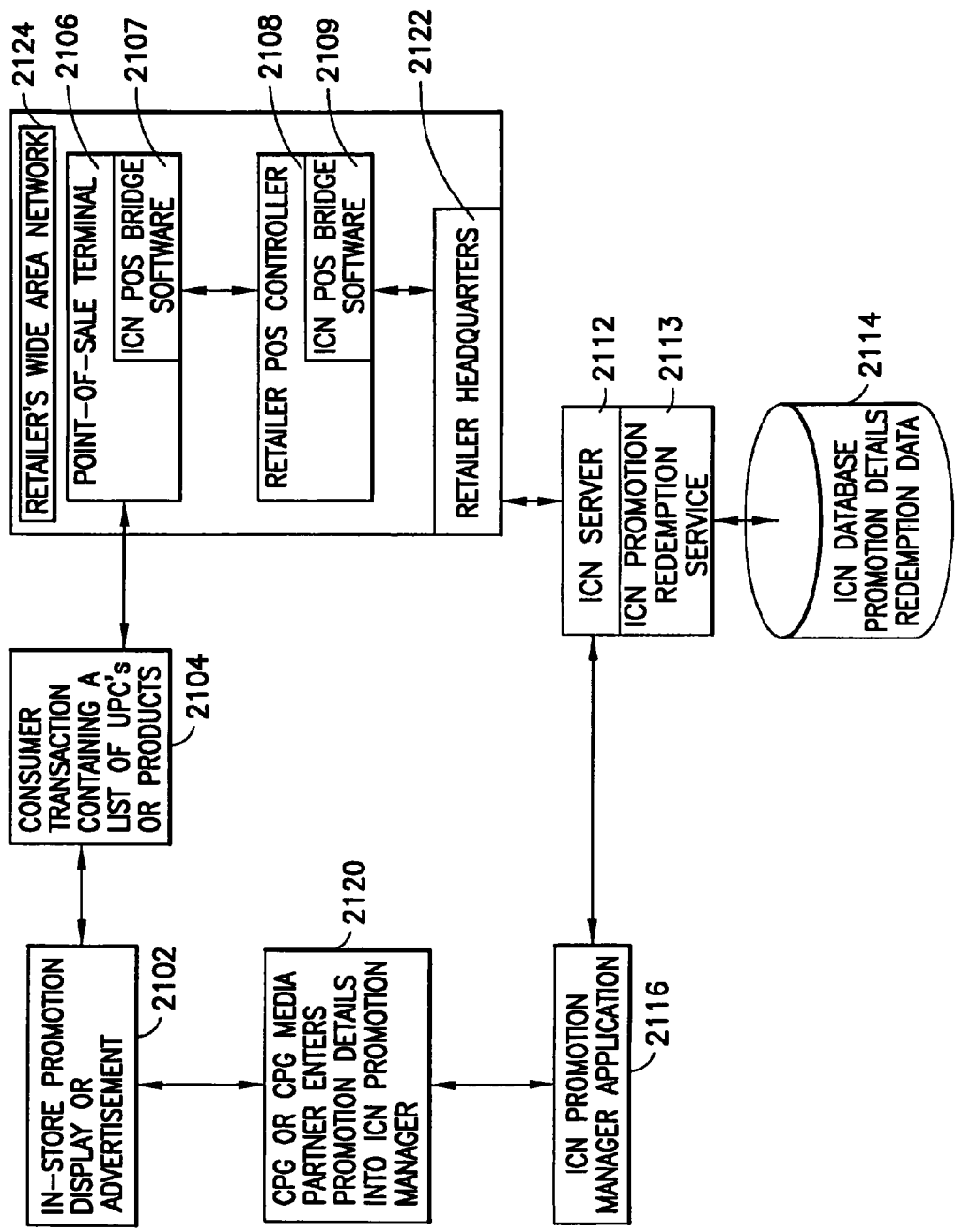
FIG. 21 shows an embodiment of a system that may operate as the system illustrated by FIG. 10 or 11.

In another embodiment, FIG. 21 shows that the ICN server 2112 communicates with the retailer headquarters 2122 of a retailer's WAN 2124. Within the retailer's WAN 2124, the retailer POS controller 2108 communicates with the retailer headquarters 2122 via the ICN POS bridge software installed on the POS controller 2108. The POS terminal 2106 may communicate with the retailer POS controller 2108 via the ICN POS bridge software installed on the POS terminal. Operations of analogous system components are otherwise similar to those disclosed in FIGS. 10 and 11. The local store network comprises the interconnections between POS controller 2108 and POS terminal 2106 which permit communications between the POS controller ICN POS bridge software 2109 and the POS terminal ICN POS bridge software 2107 and any other communications between the POS controller 2108 and the POS terminal 2106. These interconnections may be cable, radio frequency, optical, and/or the like. The ICN POS bridge software 2109 may communicate also with the Promotion Redemption Service of the ICN server. The local store network may also be referred to as the store loop and may comprise the cabling within a single retail store that connects all the POS terminals to the POS controller of the store. The in-store promotion display or advertisement 2102 (1002, 1102) may be physical signage, displays or end caps without an electronic hardware or may be an electronic display that may receive communications from a CPG or CPG media partner.

In an example of an embodiment of communications between a POS terminal and the ICN server, a promotion request message may be sent by the POS terminal to the ICN server and a promotion response message may be sent in reply by the ICN server to the POS terminal. The POS terminal and the POS controller may communicate through the retailer's WAN through their respective data bridge software in a sequential flow of information where the POS terminal does not communicate directly with the retailer headquarters. In this example of an embodiment, the exchange of messages may follow the following routing. In transmitting the POS terminal may send the promotion request message to the POS controller through the local store network (the local store network may correspond to the retailer's WAN), and the POS controller may send the promotion request message to the retailer headquarter (or, hub or switch) via the retailer's WAN to the ICN promotion redemption real time service (PRS) of the ICN server whereupon the ICN PRS may access the ICN database via the ICN network (e.g., internal ICN network). In reply, the ICN PRS, having accessed the ICN database through the ICN PRS, may send the promotion response message to the retailer headquarters via the retailer's WAN, the retailer headquarters may send the promotion response message to the POS controller via the retailer's WAN (in this and similar embodiments, neither the POS controller nor the POS terminal communicates directly with the ICN server), the POS controller may receive the promotion response message via the retailer's WAN, and may send the promotion response message via the local store network to the POS terminal.

Figure 17:
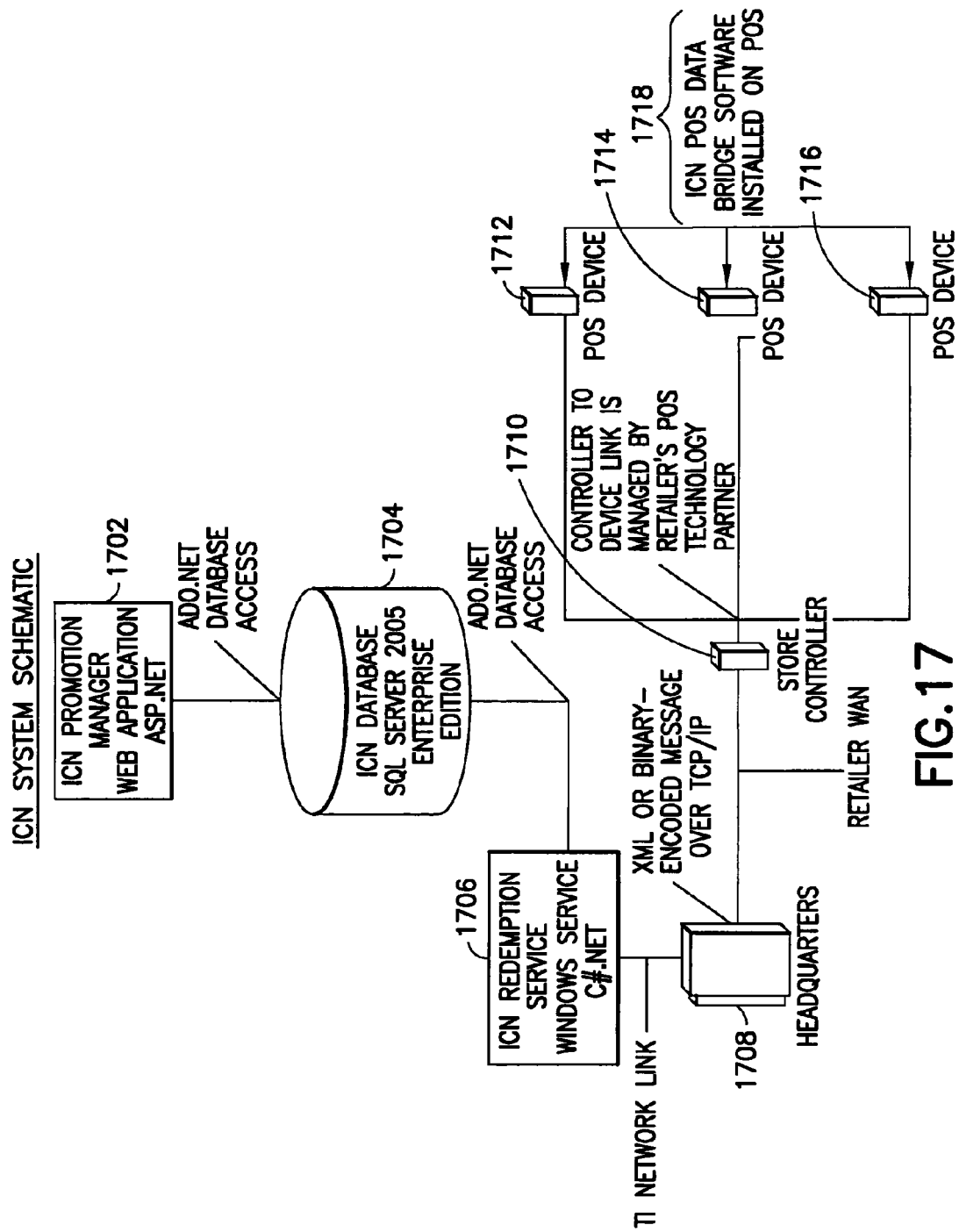
FIG. 17 shows an embodiment of an ICN.

An embodiment of an ICN system of the invention is shown in FIG. 17. An ICN promotion manager web application ASP.NET 1702 may access an ICN database 1702, such as an SQL server. An example of such a manager web application is a promotion manager. Point-of-sale terminals 1712, 1714, 1716 or similar devices may, during validation and redemption, access an enterprise's computer system 1708 through a retailer controller 1710. In each point-of-sale terminal 1712, 1714, 1716 or in a memory accessed by the retailer controller 1710 may be installed an ICN point-of-sale data bridge software that may be installed on the retailer's system which enables communications between the ICN server and the retailer's point-of-sale system. The enterprise's computer system 1708 may use the ICN redemption service 1706 (e.g., through a Windows service C#.NET) to access the ICN database 1704.

Various embodiments are contemplated by the invention. In one embodiment, a single ICN server may serve one or more retailers (different business entities). The number of retailers assigned to a single ICN server may depend on the size and number of divisions of the retailer. In another embodiment, multiple ICN servers (e.g., virtual servers) may be hosted on the same single ICN server such as be leveraging technology such as VMWare or logical partitions. In other embodiments, a single ICN server may be dedicated to a retailer. Other embodiments are contemplated by the invention.

In FIG. 17, embodiments may include various underlying retailer WAN configurations and T1 network line (e.g., VPN tunnel, T1, frame, ISDN, DSL, Fiber). The retailer POS terminal may have its own addressable IP and not leverage a POS controller such that the POS terminal can communicate directly with the retailer's HQ. The retailer headquarters (HQ) may be a central network connectivity point, such as a hub or gateway, of the retailer which interfaces with the ICN server. At least one of geographical telephony/communications, company capabilities, bandwidth requirements, and preference may factor into the selection of network connectivity between the ICN server and the retailer. The configuration and type of the ICN server may vary in accordance with the size of the retailer and the compatibility and performance of available technology.

Figure 16:
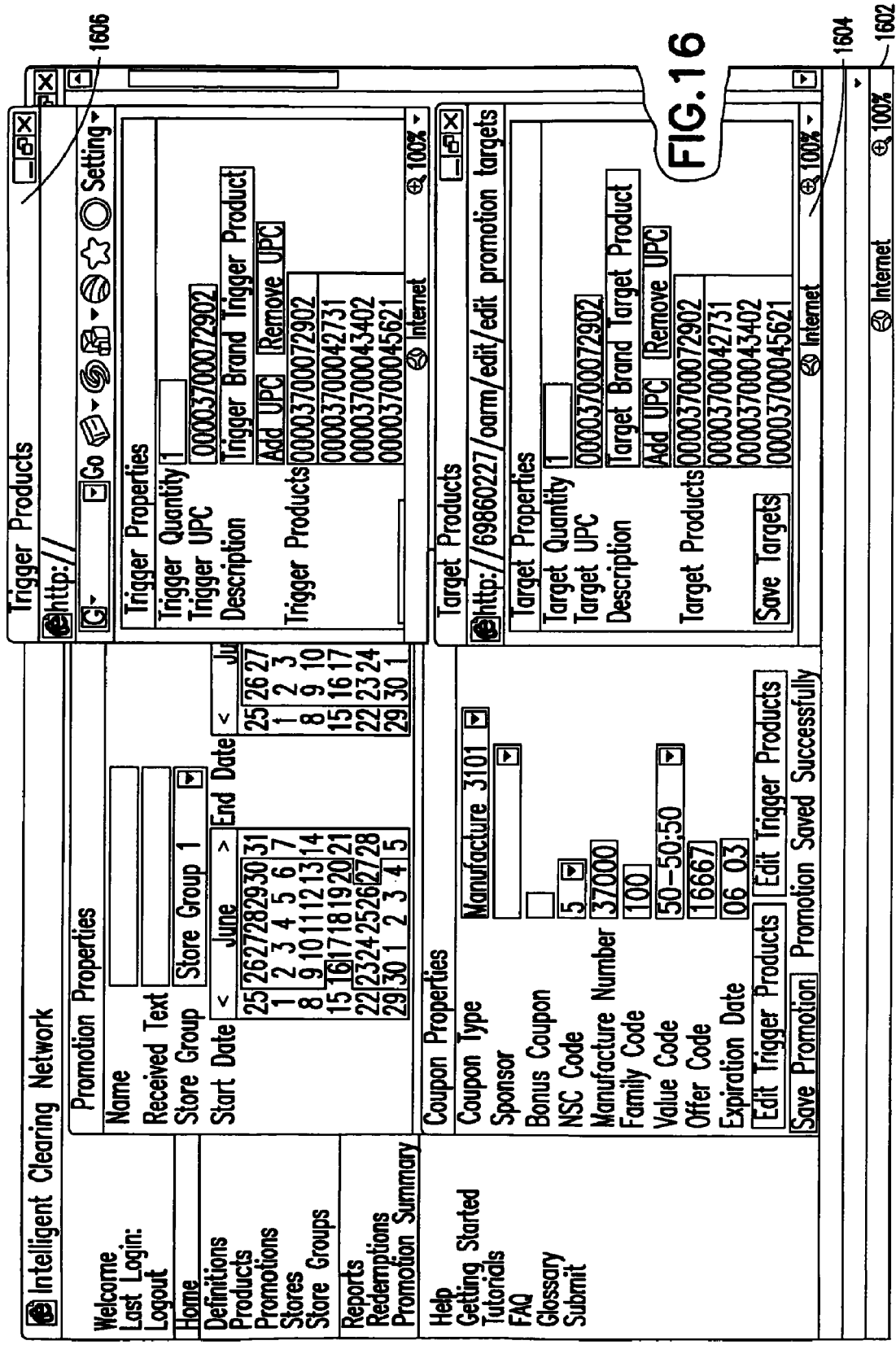
FIG. 16 shows an embodiment of a method for entering trigger and target UPCs through a browser.

FIG. 16 illustrates an embodiment in which promotion data entry personnel may set up trigger products and target products through a trigger product window 1606 and a target product window 1604. Other embodiments may provide data entry through a single window such that a relationship may be established between a trigger product and one or more target products. The relation of trigger-to-target products may be one in which a discount is offered on the trigger product which is treated as a target product when a certain condition is met, such as buy 2, get the third free. Or, the relation of trigger-to-target products may require the purchase of a Brand A Product Y to receive a discount on a Brand A Product Z or even a discount on Brand B Product W. Various trigger-to-target product relationships are contemplated including bundling.

With embodiments of the invention, coupons may be provided for multiple promotions; for example, dental floss may be discounted with the purchase of toothpaste and a toothbrush. Multi-tiered offers involving price are also contemplated; for example, if brand X product is $2, a retailer card holder may receive the brand X product for $1.50 and, if the customer is in the top 20% of the retailer's customer base, may receive the brand X product for $1, among other types of offers. In an example, a CPG company may partner with a retailer or a non-competitive CPG company to offer a discount when the consumer buys both products of both. For example, a consumer may buy Brand C cereal and obtain a pound of Brand D bananas at no extra charge or may buy a jar of Brand P peanut butter and receive a $1 discount on Brand J jelly.

Figure 13:
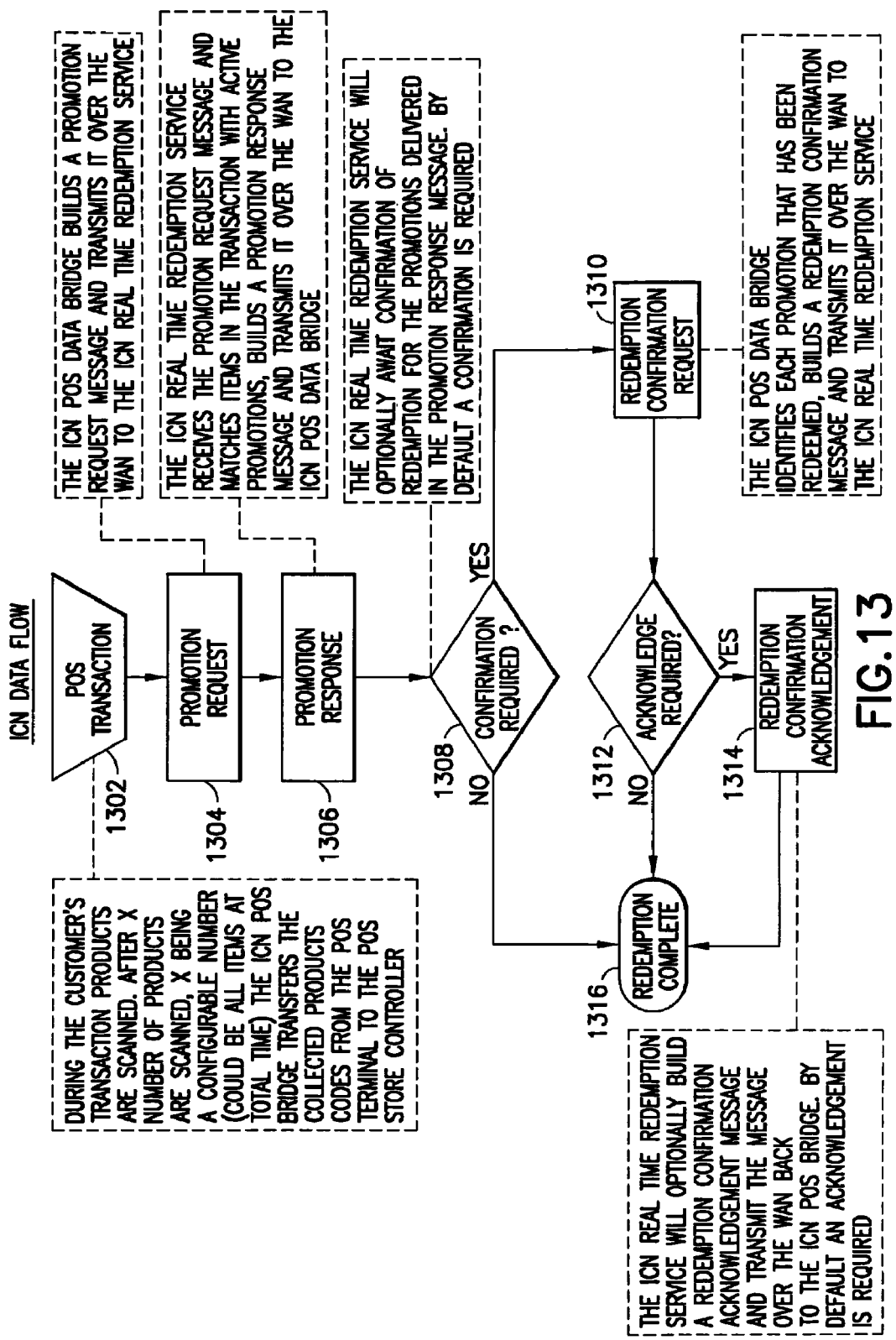
FIG. 13 shows an embodiment of ICN data flow.

FIG. 13 illustrates an embodiment of ICD data flow. In this particular example, when a point-of-sale transaction is complete and the total key has been pressed 1302 at checkout, or after X number of items have been scanned, X being a configurable whole number with a value of, for example, 5 to 9, the ICN point-of-sale data bridge software may collect information about the items in the customer's transaction and transmit this information to the ICN POS bridge software installed on the POS controller. The ICN POS bridge software on the POS controller may build a promotion request message and transmit it over a network, such as a wide area network, to the ICN real time promotion redemption service 1304. In response, the ICN real time promotion redemption service may receive the promotion request and may match items in the transaction with prospective promotions defined in the ICN database, may build a promotion response message, and transmits it over the network to the ICN POS bridge software on the POS controller which sends the promotion response message to the POS terminal which originated the promotion request via the ICN POS bridge software 1306. The ICN promotion redemption service may be configured to optionally await confirmation of redemption for the promotions to be delivered in the promotion response message 1308. If no confirmation is required, the redemption process is complete 1316. Otherwise, the ICN point-of-sale bridge software identifies each promotion that has been redeemed, may build a redemption confirmation request message, and may transmit the redemption confirmation request message over the network to the redemption service 1310. The ICN promotion redemption service may then optionally send an acknowledgement to the point-of-sale for receipt of the redeemed promotion list 1312. If an acknowledgement is required, the ICN promotion redemption service can accept the list of redeemed promotions, build a redemption confirmation response, and transmit the redemption confirmation response over the network to the point-of-sale data bridge 1314. Redemption may then be complete 1316.

Embodiments of the invention enable third party offer providers to communicate through one entry to point of sale and identify duplicate offers (e.g., promotion collisions). The embodiments may be practiced partly (but not entirely) through or entirely through rules-based approvals.

Embodiments of the invention can offer detailed real-time redemption data that can be available 24 hours per day, 7 days per week via the secure ICN promotion manager application and summary redemption data that can allow a manufacturer, media company, or retailer to track promotion performance and budget in real time. An advantage of the embodiments of the invention is that ICN technology may not require any coupon or promotion definition data be sent ahead of time to the retailer because the ICN server in conjunction with the ICN database can maintain and update the coupon offerings of client retailers, manufacturers, and media companies.

Figure 18:
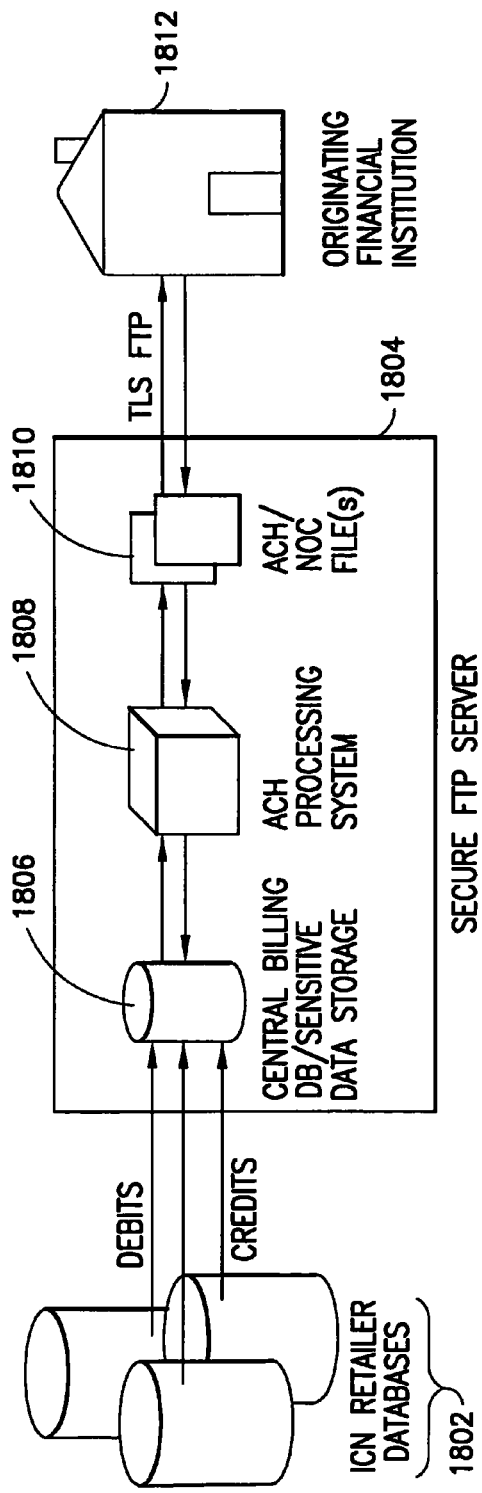
FIG. 18 shows an embodiment of the automated clearing house processing incorporated in a financial settlement system.
Figure 19:
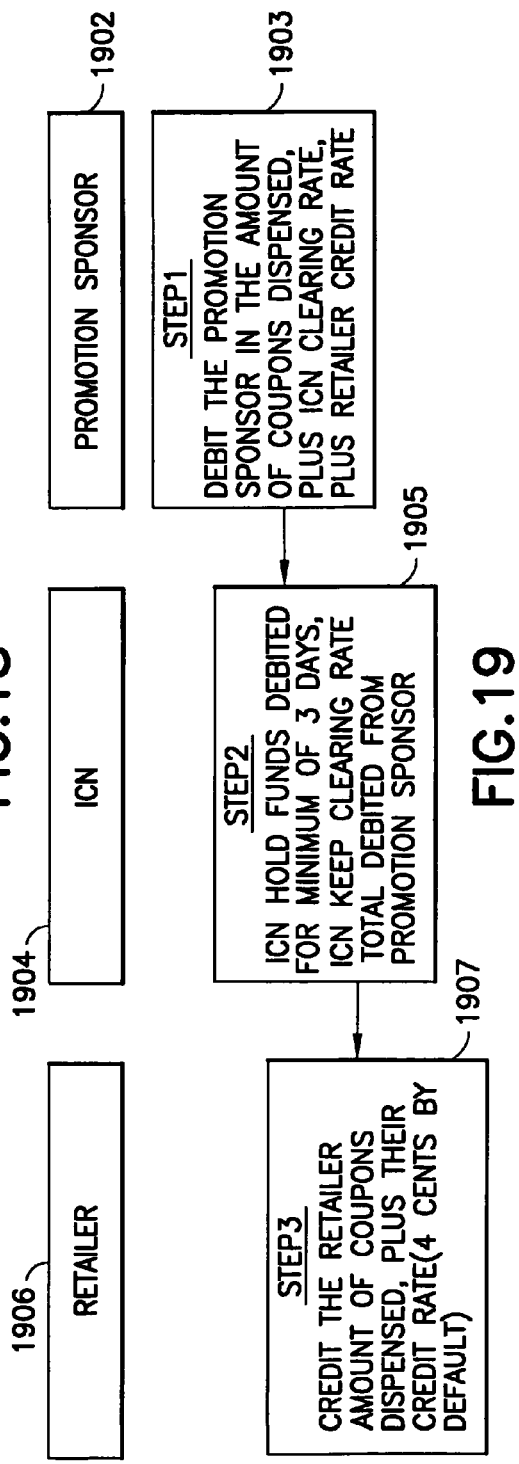
FIG. 19 shows an embodiment of a debiting and crediting process.
Figure 20:
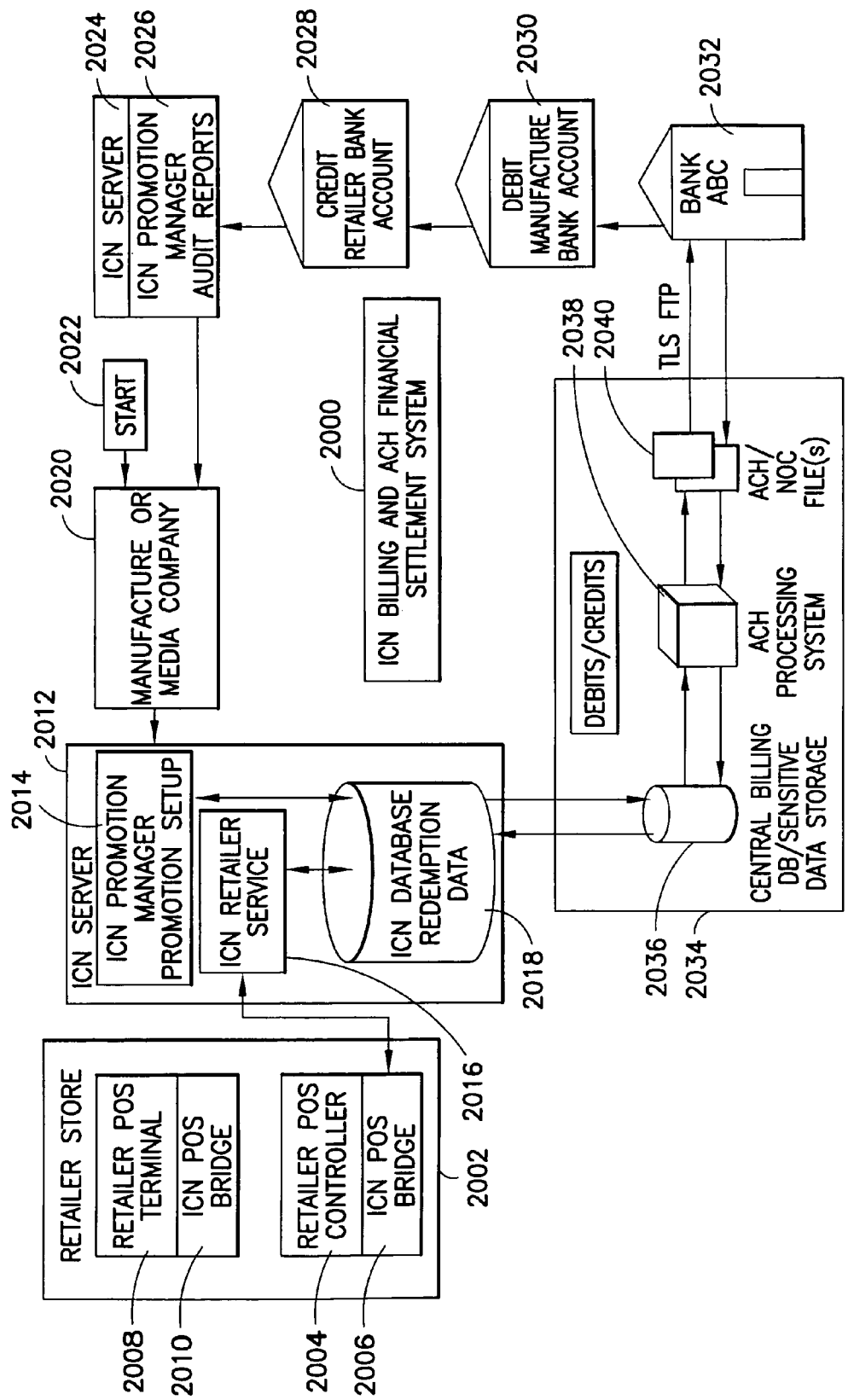
FIG. 20 shows an ICN system integrated with an ACH processing system.

Embodiments of the invention having automated clearing house processing by an originating financial institution are illustrated in FIGS. 18-20. At least one embodiment illustrated in each of FIGS. 18 and 19 may represent a separate system from the ICN coupon and/or incentive processing system. At least one other embodiment in each of FIGS. 18 and 19 may integrated with the ICN coupon and/or incentive processing system. In an embodiment, the ICN billing database may feed the ACH process with the redemption information to create the ACH financial debit or credit in which case the ACH system is subordinate to the ICN system.

In embodiments of the invention, an ICN automatic clearing house (ACH) processing system may be used with the Intelligent Clearing Network. An example of an ACH processing system (or, subsystem) is shown in FIG. 18. The automatic clearing house system may provide an automated interface between ICN's internal billing system and the ACH network provided through the Originating Financial Institution 1812. The ICN ACH processing system 1808 may create ACH files 1810 to send to the Originating Financial Institution 1812 based partly on debit/credit summary information from each ICN retailer database 1802, and partly on account/routing information stored on a secure file transfer protocol (FTP) server 1804. The ICN ACH processing system 1808 may also take care of transmitting the resulting ACH files

1810 to the Originating Financial Institution 1812 via transport layer security (TLS) FTP.

In at least one embodiment, the Promotion Manager may be the input mechanism for setting up any type of promotion, the ICN technology may then clear the promoted items electronically and capture the redemption information, and the ACH sub-system (or, financial settlement system or sub-system) may receive the captured redemption information as input and based on the captured redemption information electronically settle the financial obligations of participating parties (e.g., retailer, manufacturer, etc.). In at least one of the embodiments, the invention may be seen as providing a full circle of electronic incentive clearing through financial settlement.

An ACH processing system may be configured to have the following capabilities:
- Accumulation of transactions to process from each retailer database
- Accumulation of account/metadata information from secure FTP server
- Creation of ACH output file(s)
- Transmittal of ACH output file(s)
- Processing of return file(s) from the Originating Financial Institution
- Ability to process all unprocessed debits/credits
- Ability to process particular debits/credits
- Logging of results and debug information for troubleshooting
- Ability to schedule process(es) to run periodically The first eight ACH processing system capabilities listed above may be provided by a software program (or possibly several programs), such as a C# program. The last ACH processing system capability listed above may be provided by scheduling the software program(s) to run periodically using a scheduler program, such as the Windows Task Scheduler. In this example, the C# program(s) may accumulate unprocessed debits/credit information for inclusion in the ACH output file 1810 by connecting to a centralized billing database 1806 residing on the secure FTP server 1804. The debit/credit information in this database may originate from data stored in each ICN retailer database in a table called PROMOTIONAL BILLING. The retailer-specific PROMOTIONAL BILLING tables may be populated by stored procedures that reside within each retailer database. The stored procedures may be responsible for summarizing detailed transaction data into debit/credit entries and for enforcing applicable business logic. The individual retailer databases may then periodically synchronize their billing information into the centralized billing database by means of SQL Server database replication.

The ACH processing system 1808 may supplement the debit/credit data it reads from the central billing database with account and routing information. The account and routing information may be required to reside on the secure FTP server and not be stored within the individual retailer databases. Since the central billing database may reside on the secure FTP server, sensitive account and routing information may be stored in the same database for convenience.

In addition to account and routing information, non-sensitive metadata may also be stored in the central billing database (for example, the exact ICN company name and transaction descriptions as they are to appear on customer bank statements). The ACH processing system may read whatever additional metadata it needs to complete the ACH file from the central billing database.

The following is a (partial) list of the type of information that may be needed when producing an ACH output file 1810 (items marked with a * are mostly unchanging in contents or value, i.e., they are static values):
- Processing bank routing/transit number (i.e. routing/transit number for the Originating Financial Institution)*.
- Originator # (i.e. ICN's Taxpayer ID)*
- Processing bank name (i.e. Originating Financial Institution)*
- Origin Name (i.e. ICN)*
- Descriptions/optional data as we want it to appear on people's bank statement*
- Routing/transit number for any account that might receive a debit/credit
- Account # for any account that might receive a debit/credit
- Name for any account that might receive a debit/credit
- Entry class code*

The C# program may create an ACH output file based on the debit/credit information that has been accumulated as a result of the selected program options. In an embodiment, only a single output file may be created per processing run; however, the C# program may be extended if necessary to support creation of multiple ACH output files in a single run (for example, if the debits/credits need to be logically separated into separate transmissions for business reasons, or if there happens to be a maximum size for each ACH transmission and the current debit/credit load would result in an output file that exceeds this limitation, or if the daily debit/credit volume limit is exceeded). The ACH output file may be written to a specified directory and named using a specified naming convention (e.g., as per instructions from the Originating Financial Institution).

The ACH file format/record layout may be adapted for the Originating Financial Institution. For example, the ACH file format/record layout may comprise a form and/or functionality from one or more of the following:
- To calculate Entry Hash in the File Control record: sum the 8-digit routing numbers (excluding check digit) from all of the entry detail records, throwing out high-order digits if necessary to limit result to 10 digits.
- Blocks: A "block", within the context of an ACH file for the Originating Financial Institution, may be a collection of 10 records (the value 10, in a particular example, is derived from a Blocking Factor field in a File Header record; the Originating Financial Institution may require that this field to always contain the value 10). The blocks for the Originating Financial Institution may be specified to contain an even multiple of 10 records. If an ACH file contains a number of records that is not divisible by 10, "filler" records (consisting of 94 bytes containing the number 9 in each byte) may be added in this example until an even multiple of 10 is reached. The Block Count field in the File Control record may then contain the total number of records in the file (including filler records) divided by 10.
- The File ID Modifier in the File Header record can contain any alphanumeric character. In an embodiment, the only requirement is that File ID Modifier be unique if more than one file is sent in one day. The C# program may use "A" for the first file, and may use "B", "C", etc. if needed.
- The Standard Entry Code field in the Company Batch Header record may contain either "PPD" or "CTX" to allow addenda information to be supplied.

Once the ACH output file(s) have been created, the ACH processing system may transmit the resulting file(s) to the Originating Financial Institution via TLS FTP. The ACH processing system may utilize the free command line utility (ftp client) "wput" for initiating a secure upload of each file over TLS FTP (to a remote ftp server). The C# program may initiate calls to wput for each file it creates.

The ACH processing system 1808 may need to check periodically for return files that are created by Originating Financial Institution 1812 and stored in the "Outbound" folder on Originating Financial Institution's FTP server 1804. These files may contain information that may be of importance to ICN.

For example, Originating Financial Institution may create Notification of Change (NOC) files 1810 on a daily basis. These files may contain information like indications of debits/credits that didn't process correctly and notifications of changes in account/routing information. The NOC files may follow the same file format as the ACH output files. The ACH processing system may need to periodically connect to the Originating Financial Institution FTP server via TLS FTP, look for NOC files, pull back any files that are detected, and take appropriate action (e.g., transmittal of an e-mail alert to a designated ICN officer if at least some of the information in the NOC file were to require a manual intervention of some sort).

The ACH processing system may have a command line utility analogous to wput (e.g., wget) for initiating a secure download of available files over FTP TLS.

The C# program can be initiated manually from the command line by typing in the program name and providing the appropriate arguments. By default, the program may process all pending debits/credits. The C# program may allow a user to specify command line arguments indicating which debits/credits need to be processed, for example, in limiting processing based on a particular promotion, retailer, media partner, or individual debit/credit that has failed and needs to be re-sent. The C# program may create log entries for every run containing summary counts and debug information for troubleshooting purposes. The log file may have a specified naming convention and may be written to a specified directory on the FTP server. The C# program(s) may be scheduled to run periodically using the Windows Task Scheduler.

A billing system, as illustrated in FIG. 19, may generate auditable incremental credit & debit based upon the information stored in the ICN retailer database for a given promotion and the detail present in the Redemptions structure.

For a promotion (at least one promotion or every promotion), the following entities, as shown in FIG. 19, may exist for billing purposes and tie directly back to a promotion definition in the Promotion Manager:

1. Promotion Sponsor 1902 (who gets debited for the promotion's liability) The promotion sponsor is the party that has agreed to pay for the promotion activity. The promotion sponsor may be a retailer, a manufacturer, or another entity.
2. Retailer 1906 (who gets credited back for the promotion, plus x cents per redemption)
3. ICN 1904 (a transaction fee, clearing fee, and/or processing fee may be paid to ICN from a portion of money debited from the promotion sponsor)

Note that for each of the 3 entities above, there may be "billing rates" that dictate, by company ICN deals with, for credits and debits. The per redemption "billing rate" for debits and for credits can be separate and different for each company.

An example of a process for debiting and crediting between a retailer, the ICN, and the promotion sponsor:

Step 1—debit the promotion sponsor in the amount of coupons dispensed, plus ICN clearing rate, plus retailer credit rate 1903

Step 2—ICN hold funds debited for, e.g., minimum of 3 days, ICN keep clearing rate total debited from promotion sponsor 1905

Step 3—credit the retailer amount of coupons dispensed, plus their credit rate (4 cents by default) 1907

Thus for any promotion run by a Promotion Sponsor, assuming there are 100 redemptions of a 50 cent coupon, and assuming the Promotion Sponsor has a debit rate of 10 cents per redemption and the retailer has a credit rate of 4 cents per redemption, the following example is meant to illustrate aspects of the processing:

1. Promotion Sponsor debit=$64.00, broken down as follows:

Sponsor Liability(100 redemptions*50 cents per redemption)=$50.00

ICN clearing fees(100 redemptions*10 cents per redemption)=$10.00

Retailer clearing credits(100 redemptions*4 cents per redemption)=$4.00

2. ICN clearing fees=$10.00, broken down as follows:
    ICN clearing fees (see Sponsor debit above, left in ICN account after credits & debits settled)=$10.00
3. Retailer clearing credits=$54.00, broken down as follows:
    Sponsor Liability (see above)=$50.00
    Retailer clearing credits (see above)=$4.00

Modifications to the above billing processing example may be made in part or all of the following manner:

1. When a Retailer is running their own promotion and is the sponsor, the retailer may not receive a credit—they may get debited. A retailer may be credited for a promotion.
2. A Promotion Sponsor can be a Retailer, Media Partner, or CPG. The promotion sponsor can be the company funding the promotion and responsible for the amount they may be debited (coupon value and billing rate considered).

Other variations may be made to the billing processing such as by incorporating one or more of the following features:

1. Promotion Billing data definition language (DDL) structure. This may at the retailer level for storage of billing info and calculations leverage, and includes the full trail of billing activity and be fully auditable.
2. Promotion Billing Stored Procedure(s). The procedure(s) can be responsible for performing the background processing for billing and may be run scheduled and/or manually as needed. The procedure(s) may be responsible for identifying each active promotion, inspecting the TRANSACTIONS & REDEMPTIONS tables for that promotion, and populating the PromoBilling table structure with totals for this promotion billing cycle. The procedure(s) may also inspect the PromoBilling structure to know where it left off last time for billing for a given promotion to avoid faulty scenarios such as double billing.
3. Basic Billing Report. This report may be visible in the Promotion Manager so anyone with the appropriate permissions may view it. The report may tie back to promotion visibility rules as well, and based on what role the user has (sponsor, retailer, executor), may display appropriate data.
4. Invoice Report & transmission. This may be similar to Basic Billing report and may need to be transmitted to each company ICN issues ACH transactions to.

5. Replication of local retailer Promotion Billing structure to central ACH Billing database structure. The ACH system may be provided with a copy of each retailer's Promotion Billing structure, and may need to report updates back to the individual retailer database. This may initially be accommodated by SQL Server merge replication and may require some configuration effort.

FIG. 20 illustrates an embodiment of an ICN billing and ACH financial settlement system 2000. Initially 2022, a manufacturer or media company 2020 may set up promotions stored by the ICN server 2014 on the ICN database 2018. Promotions form a retailer site 2002 may also be stored by the ICN system 2012. Conversely, or additionally, manufacturer's and/or media company promotions stored in the ICN database 2018 may be downloaded to the retailer site 2002. At the retailer site 2002, there may be a POS controller 2004 with ICN POS bridge software 2006 and at least one retailer POS terminal 2008 with its ICN POS bridge software 2010. Redemption data may be stored in the ICN database 2018 and later retrieved via the ICN server 2014 by FTP server 2034. The FTP server may be structured as in FIG. 18 and comprise a central billing database and sensitive data storage 2036, the ACH processing system 2038, and ACH/NOC files 2040. Transaction data from the FTP server 2034 may be provided to an originating financial institution, such as bank ABC 2032. This transaction data is used to debit the manufacturer's or media company's bank account 2030 and credit the retailer's bank account 2028. Audit reports 2026 from the ICN server 2024 may be provided to the manufacturer or media company 2020. The ICN server 2024 may be part of the ICN server 2014.

In view of the foregoing, it can be seen that as alternative to a coupon, Applicant has provided for a coupon card in embodiments. In other embodiments, a coupon card is not employed. Thus, many options and advantages are offered by Applicant's embodiments. For example, although a coupon card is convenient, there may be times where a coupon card is not preferred for conducting consumer transactions with, e.g., a retailer or wholesaler.

Also, embodiments of Applicant's invention can provide a coupon and/or incentive redeemer with information as to the entire purchases made by a consumer or in a transaction. Embodiments can provide the manufacturer and retailer with information in a complete and real time manner.

Accordingly, embodiments of the invention can provide for real time coupon and/or incentive validation in which data about entire transactions are provided in real time to an Intelligent Clearing Network that can avoid multiple redemptions of the same coupons and/or incentives and can avoid redeeming a coupon and/or incentive against an unintended product. The current business model also can allow for activation of coupons and/or incentives based on or only on the contents of the consumer's basket, or allowing the consumer to opt into promotions via the internet. This can allow for consumers to participate in in-store media promotions based on or only on the occurrence of the promoted products being present in the consumer's transaction at the POS. This also can allow consumers to opt into internet based promotions by identifying themselves and purchasing the qualified products.

Not only can embodiments of the invention allow for the redemption of coupons found in Free Standing Inserts, but also can permit the validation and redemption of coupons and/or incentives found via in-store promotions or on the internet. During the checkout process at a point-of-sale terminal, a series of events may occur: sale data is transmitted via a wide area network from a retailer site to an enterprise (e.g., retailer headquarters), the enterprise forwards data via high-speed connection to the Intelligent Clearing Network servers, Intelligent Clearing Network application software determines that promotion parameters are met, and if the promotion parameters are met, the Intelligent Clearing Network returns information to the enterprise and point-of-sale terminal that the consumer has satisfied the promotion parameters and the coupon and/or incentive offer has been redeemed. It is possible that the entire coupon and/or incentive redemption process may be completed in one second or less.

In one or more embodiments of the invention, a system for redeeming coupons comprises a network through which a Point-of-Sale (POS) terminal communicates, through a POS controller, with an Intelligent Clearing Network (ICN) server. One or both of the POS terminal and POS controller are installed with POS bridge software. The ICN server is configured to run a real time software application while in communication with the POS terminal, wherein the POS terminal transmits coupon transaction information including universal product codes to the ICN server via the network. Coupons and incentives can be redeemed when the consumer purchases the products promoted by a media company, manufacturer or retailer on the internet or in-store or other promotional materials such as newspapers, magazines, and direct mail. The system may use trigger universal product codes to validate coupons and/or incentives and target universal product codes to properly redeem coupons.

Clearing GS1 Databar Paper Coupons Using the ICN Technology

GS1 Databar is a barcode standard, which provides for expanded information to be provided in a barcode. The GS1 Databar is scheduled to replace the old UPC-A type barcode on all paper coupons printed and distributed in the U.S. in January 2010. A Retailer may upgrade its POS Software and Scanner Software and even replace physical equipment, such as scanners, to read the GS1 Databar. After January 2010, it is possible that only the new GS1 Databar will be printed on a paper coupon and retailers may be required to update their systems or, otherwise, have their cashiers manually enter the coupon value through the POS Terminal Keyboard.

The new GS1 Databar contains detailed new data elements that can be read by the ICN Data bridge system, including software or code, when installed on the POS Terminal scanning the paper coupons. The new detailed information need not be captured by the POS system or passed onto the Coupon distributors to facilitate electronic clearing of the paper coupon with the new GS1 Databar. Advantageously, embodiments of the invention, can read these new data elements in Real Time and electronically clear the paper coupon.

Electronic Clearing of GS1 Databar 8110 Coupons

There are methodologies for electronically clearing paper GS1 databar paper coupons, specifically 8110 Application Identifier coded coupons, which differ in form and function from the historic 8100, 8101, and 8102 coded coupons.

The GS1 Databar 8110 Coupon Background

GS1 Databar 8110 coupon expands common existing 8100, 8101, and 8102 coupon fields and introduces additional optional fields. Fields for GS1 databar paper coupons include, which may be required: 1) the Application Identifier, 2) Primary Company Prefix, 3) Offer Code, 4) Save Value, 5) Primary Purchase Requirement, 6) Primary Purchase Requirement Code, and lastly 7) Primary Purchase Family Code. These fields coupled with several additional optional fields make fraud proof redemptions possible. Those optional fields of interest include primarily the Optional Data Field 5, the Serial Number, coupled with Optional Data Fields 3 and 4, Expiration Date and Start Date respectively.

Fraud Proof Redemptions of 8110 Coupons

The 8110 Coupon fields coupled with a uniquely assigned serial number yield a unique physical existence of a coupon. Coupon printers may be set up to adhere to ranges of serial numbers, both for uniqueness and also for tracking printed coupon quantities. A physically unique coupon (8110 required fields+option serial number) may then be validated against a central host system to determine if it's been redeemed yet or not. If it has not yet been redeemed, the central host system can indicate that the coupon is unredeemed and log a redemption to ensure the uniquely identified coupon cannot be redeemed again. The cashier may then dispose of the coupon, no other validation or method for counting being required. The optional fields of Expiration Date and Start Date may also be inspected by the host system to ensure redemption falls within the designated active period of the coupon, to eliminate human cashier error and also fraud.

Different processes, which ICN may deploy to clear paper coupons with the new GS1 Databar, include.
1. The GS1 Databar on the paper coupon does not have a unique serial number as described in the GS1 8110 application code (i.e., a non-serialization embodiment).
2. The GS1 Databar on the paper coupon does have a unique serial number as described in the GS1 8110 application code (i.e., a serialization embodiment).

In accordance with an aspect of the invention, a system is provided that comprises an Intelligent Clearing Network (ICN) network; a point-of-sale (POS) terminal; a POS controller; an ICN server, wherein the POS terminal transmits first data elements of the GS1 barcode printed on the paper coupon along with other transaction information to the POS controller or directly to the ICN server via the ICN network for real time paper coupon validation and or the recording of the GS1 barcode data elements along with transaction details in the ICN database.

In accordance with another aspect of the invention, a paper coupon with a GS1 barcode and an 8110 application identifier may be scanned at the POS terminal and the data elements contained within the GS1 barcode may then be transmitted to the ICN Server via the ICN Network. The GS1 barcode data elements may include but are not limited to the Manufacture number, Manufacture offer code, Coupon value, Coupon expiration date, Coupon family code, Coupon serial number and Universal Product Codes of required product purchases. Also, transaction details including but not limited to Current date and time, Store number, Transaction number, Lane number, Cashier number, Universal Product Codes of all items purchased in the transaction, and the Consumer loyalty ID number if present, may be transmitted to the ICN server via the ICN network. All of these data elements can be written to the ICN database.

In accordance with a further aspect of the invention, a paper coupon coded with a GS1 barcode and 8110 application identifier which is scanned at the POS terminal and does not contain a unique serial number may be validated in real time by the ICN server via the ICN network before the paper coupon can be redeemed. The ICN server may validate the expiration date included in the GS1 barcode data elements transmitted to the ICN server with the current date and send a message via the ICN network to the POS terminal as to whether the paper coupon is valid. If the current date is less than or equal to the coupon expiration date, the message from the ICN server to the POS terminal may instruct the POS terminal to redeem the paper coupon. If the current date is greater than the expiration date of the paper coupon the message from the ICN server to the POS terminal may instruct the POS terminal to not redeem the paper coupon. A paper coupon which is determined to be valid and which is redeemed by the POS terminal data elements from the GS1 barcode and other detailed transaction information may be recorded in the ICN database. Those data elements may include, but are not limited to Manufacture number from the GS1 barcode, Manufacture offer code from the GS1 barcode, Expiration date from the GS1 barcode, Coupon value from the GS1 barcode, Family code from the GS1 barcode, Coupon type from the GS1 barcode, UPC product codes of required purchases from the GS1 barcode along with transaction detail information including but not limited to Current Date and Time, Store number, Transaction number, Lane, Cashier number, Customer loyalty card number, and all UPC product codes purchased in the transaction.

In accordance with a further aspect of the invention, a paper coupon with a GS1 barcode and 8110 application identifier which is scanned at the POS terminal and which does not contain a unique serial number may be validated in real time by the ICN server via the ICN network before the paper coupon can be redeemed. The ICN server may validate the family code included in the GS1 barcode data elements transmitted to the ICN server against the family codes assigned to the universal product codes purchased during the transaction and the master family code table in the ICN Database and send a message via the ICN network to the POS terminal as to whether the paper coupon purchase requirements have been met. If the family code contained within the GS1 barcode matches the family code of any of the purchased products in the transaction when compared to the master family code table in the ICN Database the message from the ICN server to the POS terminal may instruct the POS terminal to redeem the paper coupon. If the family code contained within the GS1 barcode does not match the family code of any of the purchased products in the transaction when compared to the master family code table in the ICN Database the message from the ICN server to the POS terminal may instruct the POS terminal to not redeem the paper coupon. For a paper coupon which is valid and redeemed by the POS terminal data elements from the GS1 barcode and other detailed transaction information will be recorded in the ICN database. Those data elements include but are not limited to Manufacture number from the GS1 barcode, Manufacture offer code from the GS1 barcode, Expiration date from the GS1 barcode, Coupon value from the GS1 barcode, Family code from the GS1 barcode, Coupon type from the GS1 barcode, UPC product codes of required purchases from the GS1 barcode along with transaction detail information including but not limited to Current Date and Time, Store number, Transaction number, Lane, Cashier number, Customer loyalty card number, and all UPC product codes purchased in the transaction.

In accordance with a further aspect of the invention, a paper coupon with a GS1 barcode and 8110 application identifier which is scanned at the POS terminal and which does not contain a unique serial number may be validated in real time by the ICN server via the ICN network before the paper coupon may be redeemed. The ICN server may validate the coupon value included in the GS1 barcode data elements transmitted to the ICN server against the master coupon table on the ICN Database and send a message via the ICN network to the POS terminal as to whether the paper coupon is valid. If the value contained within the GS1 barcode matches the value assigned to the coupon in master coupon table in the ICN Database the message from the ICN server to the POS terminal may instruct the POS terminal to redeem the paper coupon. If the value contained within the GS1 barcode does not match the value assigned to the coupon in master coupon table in the ICN Database the message from the ICN server to the POS terminal may instruct the POS terminal to not redeem the paper coupon. For a paper coupon which is valid and redeemed by the POS terminal data elements from the GS1 barcode and other detailed transaction information may be recorded in the ICN database. Those data elements may include but are not limited to Manufacture number from the GS1 barcode, Manufacture offer code from the GS1 barcode, Expiration date from the GS1 barcode, Coupon value from the GS1 barcode, Family code from the GS1 barcode, Coupon type from the GS1 barcode, UPC product codes of required purchases from the GS1 barcode along with transaction detail information including but not limited to Current Date and Time, Store number, Transaction number, Lane, Cashier number, Customer loyalty card number, and all UPC product codes purchased in the transaction.

In accordance with a further aspect of the invention, a paper coupon with a GS1 barcode and 8110 application identifier which is scanned at the POS terminal and which does not contain a unique serial number may be validated in real time by the ICN server via the ICN network before the paper coupon can be redeemed. The ICN server may validate the coupon Manufacture Offer Code included in the GS1 barcode data elements transmitted to the ICN server against the master coupon table on the ICN Database and send a message via the ICN network to the POS terminal as to whether the paper coupon is valid. The master coupon table, in a non-limiting embodiment, may list coupon identification information, required purchase information, start and expiration dates, and other pertinent information. If the Manufacture Offer Code contained within the GS1 barcode matches a valid Manufacture Offer Code in the master coupon table in the ICN Database the message from the ICN server to the POS terminal may instruct the POS terminal to redeem the paper coupon. If the Manufacture Offer Code contained within the GS1 barcode does not match the a valid Manufacture Offer Code in master coupon table in the ICN Database the message from the ICN server to the POS terminal may instruct the POS terminal to not redeem the paper coupon. For a paper coupon which is valid and redeemed by the POS terminal data elements from the GS1 barcode and other detailed transaction information may be recorded in the ICN database. Those data elements may include but are not limited to Manufacture number from the GS1 barcode, Manufacture offer code from the GS1 barcode, Expiration date from the GS1 barcode, Coupon value from the GS1 barcode, Family code from the GS1 barcode, Coupon type from the GS1 barcode, UPC product codes of required purchases from the GS1 barcode along with transaction detail information including but not limited to Current Date and Time, Store number, Transaction number, Lane, Cashier number, Customer loyalty card number, and all UPC product codes purchased in the transaction.

In accordance with a further aspect of the invention, a paper coupon with a GS1 barcode and 8110 application identifier which is scanned at the POS terminal and which does not contain a unique serial number may be validated in real time by the ICN server via the ICN network before the paper coupon can be redeemed. The ICN server may validate the correct products were purchased by the consumer as defined in the GS1 barcode 8110 application identifier or as defined in the master coupon table on the ICN Database and send a message via the ICN network to the POS terminal as to whether the required purchases have been met by the consumer. If the purchase requirements have been met by the consumer as compared to the GS1 barcode 8110 application identifier or the ICN master coupon table the message from the ICN server to the POS terminal may instruct the POS terminal to redeem the paper coupon. If the purchase requirements have not been met by the consumer as compared to the GS1 barcode 8110 application identifier or the ICN master coupon table the message from the ICN server to the POS terminal may instruct the POS terminal to not redeem the paper coupon. For a paper coupon which is valid and redeemed by the POS terminal data elements from the GS1 barcode and other detailed transaction information may be recorded in the ICN database. Those data elements may include but are not limited to Manufacture number from the GS1 barcode, Manufacture offer code from the GS1 barcode, Expiration date from the GS1 barcode, Coupon value from the GS1 barcode, Family code from the GS1 barcode, Coupon type from the GS1 barcode, UPC product codes of required purchases from the GS1 barcode along with transaction detail information including but not limited to Current Date and Time, Store number, Transaction number, Lane, Cashier number, Customer loyalty card number, and all UPC product codes purchased in the transaction.

In accordance with a further aspect of the invention, a paper coupon with a GS1 barcode and 8110 application identifier which is scanned at the POS terminal and which contains a unique serial number may be validated in real time by the ICN server via the ICN network before the paper coupon can be redeemed. The ICN server may validate the unique serial number contained in the GS1 barcode against the ICN Master Coupon Database which may contain a table of all unique serial numbers assigned to and printed on all paper coupons. If the unique serial number contained within the GS1 barcode of the coupon matches a valid serial number in the master coupon table of the ICN Database and the coupon has not been redeemed previously the message from the ICN server to the POS terminal may instruct the POS terminal to redeem the paper coupon. If the unique serial number contained within the GS1 barcode of the coupon does not match a valid serial number in the master coupon table of the ICN Database or the coupon has been redeemed previously, the message from the ICN server to the POS terminal may instruct the POS terminal to not redeem the paper coupon. For a paper coupon which is valid and redeemed by the POS terminal data elements from the GS1 barcode and other detailed transaction information may be recorded in the ICN database. Those data elements may include but are not limited to manufacture number from the GS1 barcode, Manufacture offer code from the GS1 barcode, Expiration date from the GS1 barcode, Coupon value from the GS1 barcode, Family code from the GS1 barcode, Coupon type from the GS1 barcode, UPC product codes of required purchases from the GS1 barcode along with transaction detail information including but not limited to Date, Time, Store number, Transaction number, Lane, Cashier number, Customer loyalty card number, and all UPC product codes purchased in the transaction.

In accordance with a further aspect of the invention, Consumer Package Goods companies who distribute paper coupons, media companies who distribute paper coupons, paper coupon distributors, and paper coupon printers may transmit via the ICN Web service or a batch file in a predefined format all coupon details coded in the GS1 barcode along with individual coupon distribution counts and circulation information which may be written to the ICN Master coupon table in the ICN Database. These coupon details may be used to validate coupons when they are scanned in real time at the POS terminal via the ICN POS Data bridge, the ICN network, the ICN server, and the ICN real time service.

In accordance with a further aspect of the invention, paper coupons which have been redeemed via the ICN network may be cleared electronically and financial settlement may occur via the afore-referenced ICN ACH billing system. When an expiration date of a coupon defined in the ICN master coupon table in the ICN Database is greater than the current system date an automated billing process on the ICN server may be executed. This process may query the ICN Database and identify all paper coupons which match the paper coupon defined in the ICN Master coupon table in which the promotional period has ended and were redeemed during the coupon promotion period. Invoices may be generated which will contain detailed transaction level information of all paper coupon redemptions. The detailed invoices may include but are not limited to the following data elements, Invoice date, Invoice number, Billing address information, quantity of paper coupons redeemed, value of paper coupon redeemed, products purchased with redeemed paper coupons, retailer, date, time, store, lane, and any processing fees. On a predetermined schedule agreed upon by the Manufacture and ICN, for each paper coupon promotion which has concluded and detailed invoices have been created and approved by the Manufacture the ICN ACH billing system may debit the appropriate Manufacture bank account the total face value of all paper coupons included in the invoice along with any processing or handling fees. On a predetermined schedule agreed upon by the Manufacture, the Retailer, and ICN for each paper coupon promotion which has concluded, detailed invoices may be created and approved by the Manufacture. The ICN ACH billing system may credit the appropriate Retailer's bank account the total face value of all paper coupons redeemed at the Retailer's store locations included in the invoice along with any processing or handling fees.

Embodiments of the invention offer improvements over prior scenarios where, for example, the following actions occur: 1) A cashier begins to scan any paper coupons the consumer presents. 2) For each paper coupon scanned GS1 information is captured including:
   Manufacture or CPG number
   Family Code
   Value or Value Code
   MOC Code (Manufacture Offer Code—This number ties to the CPG budget for the coupon redeemed)
   Serial number (Unique identifier)
   Application identifier (8100, 8101, 8110)
   Target UPCs.
   Expiration Date
   Start Date
3) Captured GS1 Coupon information is sent to ICN in real time. 4) At the end of the cashier's shift, the terminal and till containing cash, debit, credit, food stamps, and paper coupons are settled by the bookkeeper. The POS system can keep track of all the financial transactions including paper coupons. If the system says the cashier scanned, e.g., $10.00 in paper coupons then the bookkeeper validate by counting the value of the paper coupons. Once all totals are in order the terminal, cashier, and till are considered reconciled or settled. 5) At the end of each day ALL paper coupons are bundled together and shipped from the store to the retailer's HQ. 6) At the retailer's HQ the coupons from all stores are counted and bundled together and shipped to the Retailer's Clearing Agent. 7) The clearing agent counts every coupon and bundles then together by CPG and MOC creating a dollar total for each coupon promotion which is billed to the CPG on behalf of the Retailer. 8) The CPG can request a second count which would be done by the CPG's clearing agent. 9) Sooner or later an invoice is sent to the CPG and eventually the Retailer is reimbursed for the value of the coupon plus a handling fee.

According to an advantageous embodiment of the invention, steps 5 to 8 of the above process may be replaced or augmented by the following steps. 1) ICN would capture in real time the paper coupon information when it is scanned. 2) At the end of the cashier's shift, the terminal and till containing cash, debit, credit, food stamps, and paper coupons are settled by the bookkeeper. The POS system keeps track of all the financial transactions including paper coupons. If the system indicates that the cashier scanned, for example, $10.00 in paper coupons then the bookkeeper can validate by counting the value of the paper coupons. Once all totals are in order the terminal, cashier, and till are considered reconciled or settled. 3) All paper coupons reconciled for a particular day may be removed from circulation or destroyed by the bookkeeper or at the Retailer's HQ (TBD). 4) On a daily basis ICN would reconcile the paper coupons with the information captured and process them through the afore-described ACH settlement system, which can be used for settling ICN digital promotions. This would eliminate the need to have the paper coupons physically counted by multiple clearing agents and turn a paper financial transaction taking weeks or months into a electronic transaction which can be settled in days.

Figure 22B:
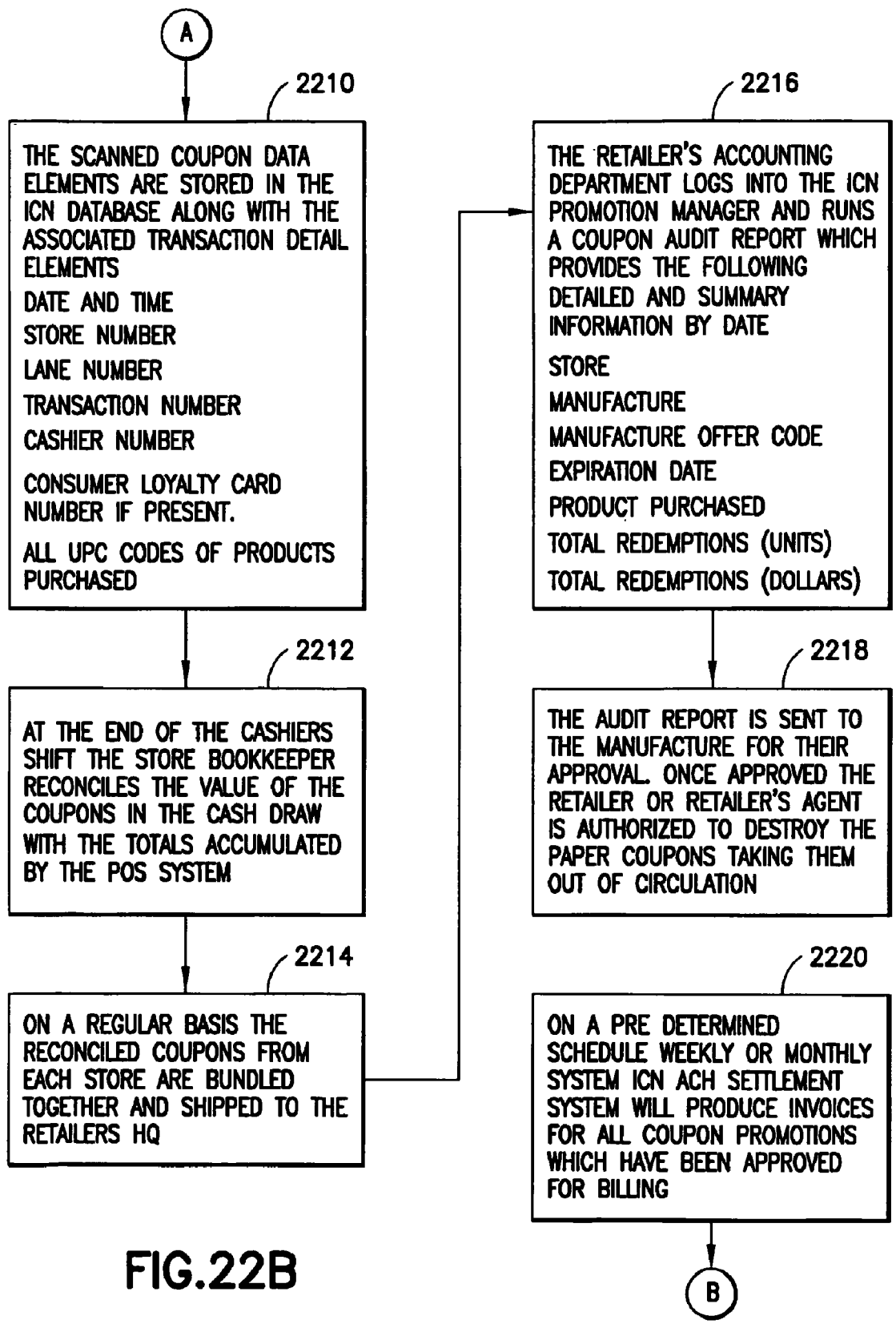
FIG. 22 (22A, 22B, and 22C) shows an embodiment of a system for processing a paper coupon.
Figure 22C:
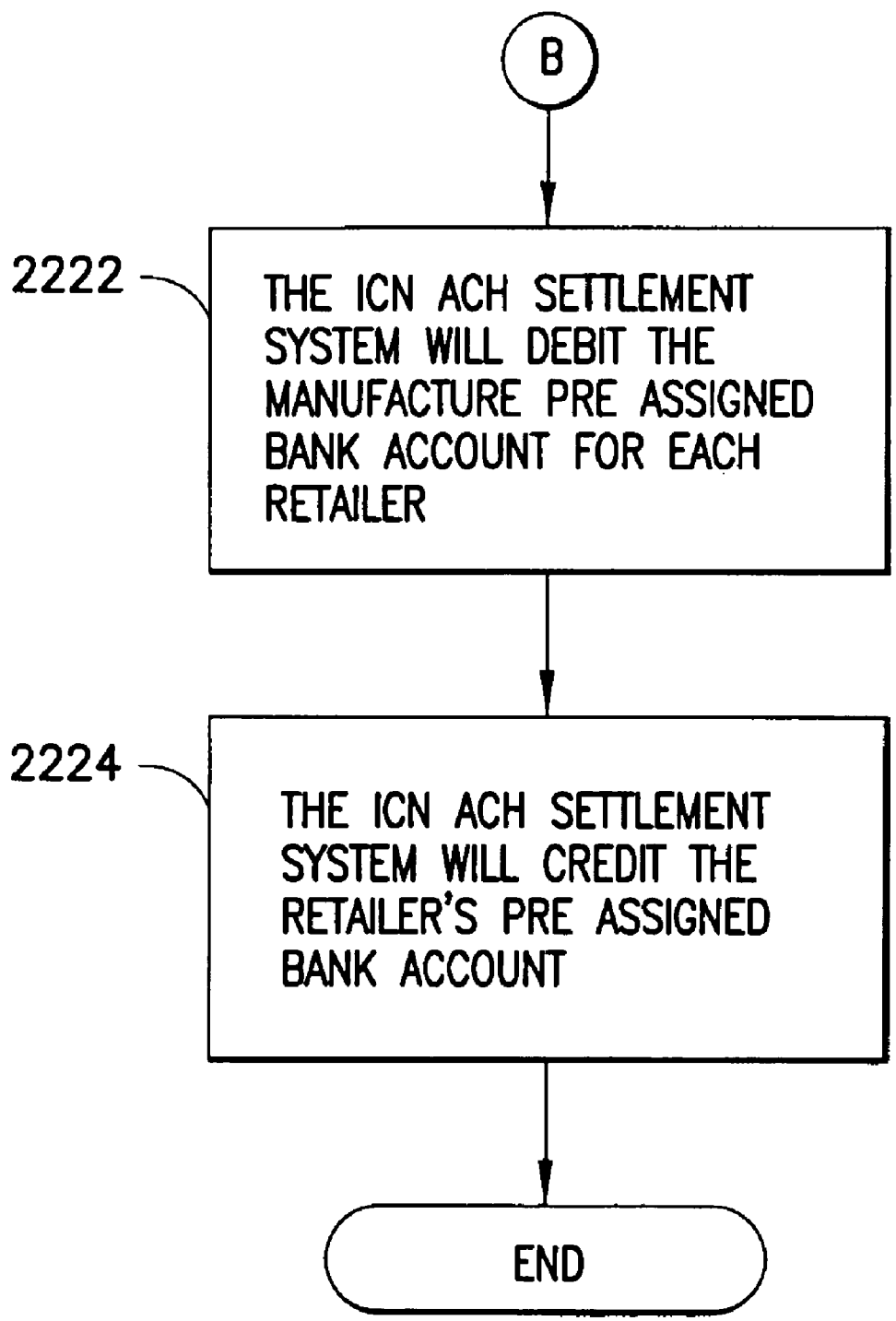

FIG. 22 illustrates embodiments of the invention in which a paper coupon is processed. In an example of this embodiment, the ICN is capturing the GS1 data elements, not validating them against an ICN database. In step 2202, a consumer may obtain a paper coupon coded with GS1 databar. In step 2204, during checkout, the consumer may provide the paper coupon to the cashier who scans them in or the consumer scans in the coupons himself or herself. In step 2206, a determination is made as to whether the GS1 databar includes a unique serial number. In step 2208, once the coupon is validated and redeemed by the POS, the ICN POS data bridge may transmit specified data elements from each paper coupon to the ICN database. In step 2210, the scanned coupon data elements may be stored in the ICN database along with associated transaction detail elements. In step 2212, at the end of the cashier's shift, the store bookkeeper may reconcile the value of the coupons in the cash drawer with the totals accumulated with the POS system. In step 2214, on a regular basis, the reconciled coupons from each store may be bundled together and shipped to the retailer's HQ. In step 2216, the retailer's accounting department may log into the ICN promotion manager and run a coupon audit report which provides the following detailed and summary information by date. In step 2218, the audit report may be sent to the manufacture for their approval. Once approved, the retailer or retailer's agent may be authorized to destroy the paper coupons taking them out of circulation. In step 2220, on a predetermined schedule, such as on a weekly or monthly basis, the ICN ACH settlement system may produce invoices for all coupon promotions which have been approved for billing. In step 2222, the ICN ACH settlement system may debit the manufacture pre-assigned bank account for each retailer. In step 2224, the ICN ACH settlement system may credit the retailer's pre-assigned bank account.

Figure 23B:
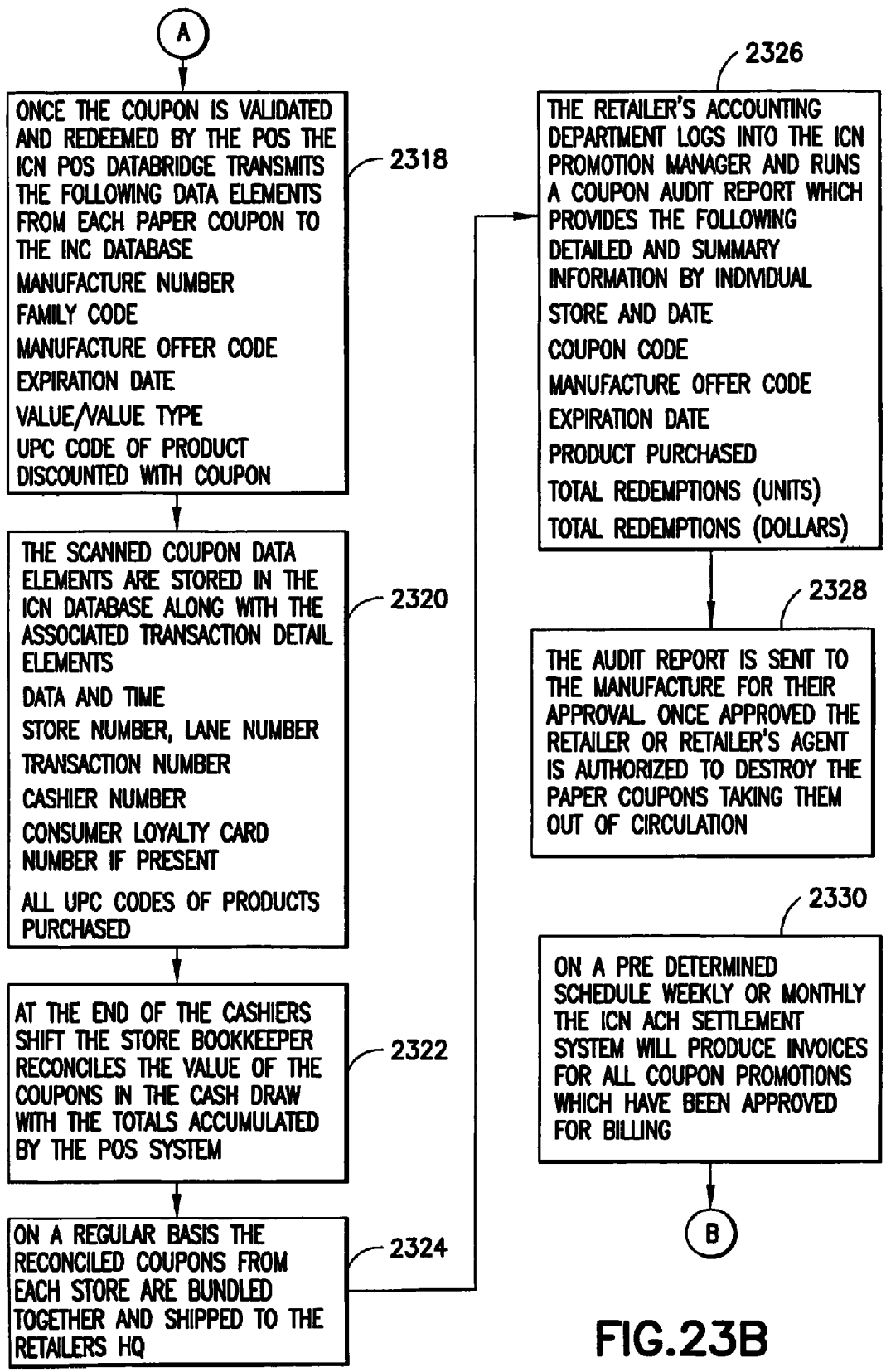
FIG. 23 (23A, 23B, and 23C) shows another embodiment of a system for processing a paper coupon.
Figure 23C:
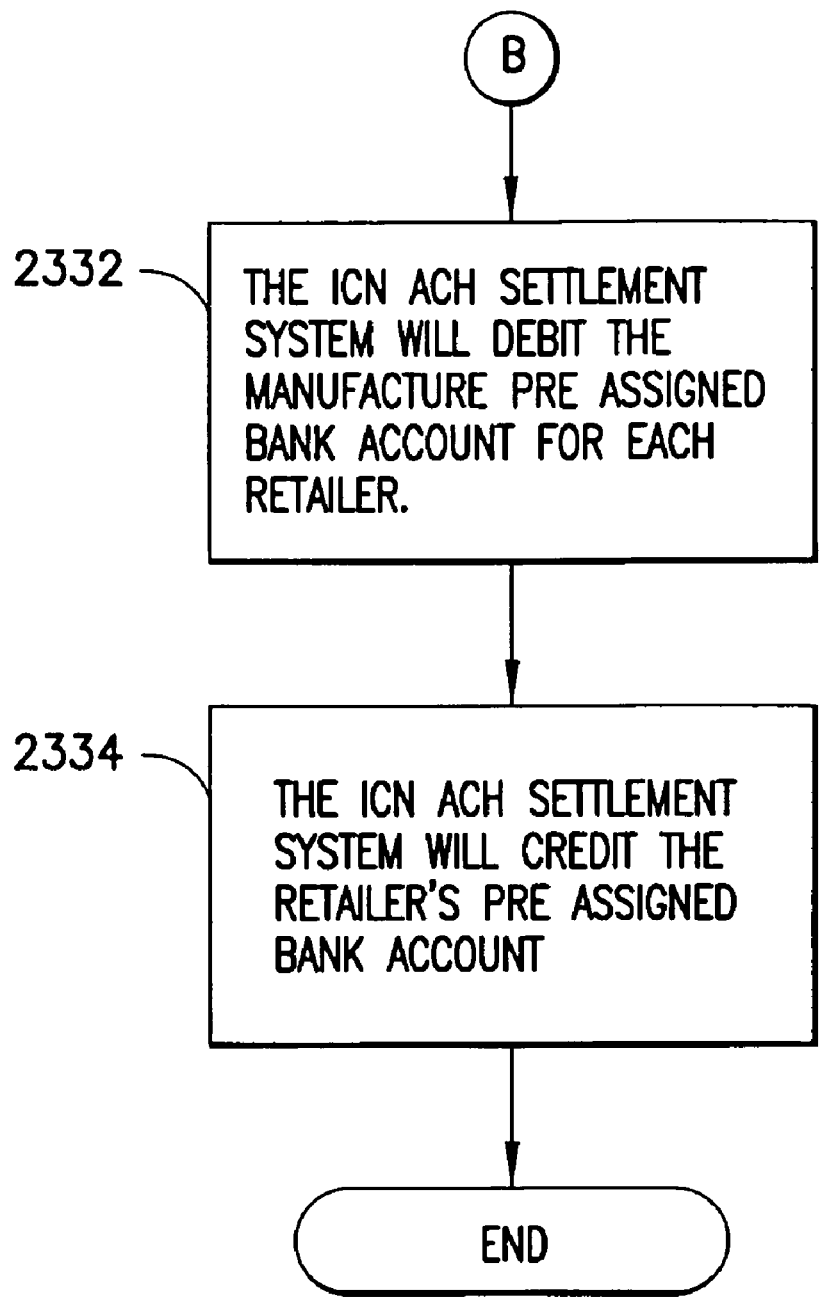

FIG. 23 illustrates an embodiment of the invention in which a paper coupon is processed. In an example of this embodiment, the ICN is validating the GS1 data elements for a paper coupon without a unique serial number printed on it. In step 2302, a consumer may obtain a paper coupon coded with GS1 databar. In step 2304, during checkout, the consumer may provide the paper coupon to the cashier who scans them in or the consumer scans in the coupons himself or herself. In step 2306, a determination is made as to whether the GS1 databar includes a unique serial number. In step 2308, a description of examples of data elements to be validated in real time may be provided. In step 2310, a determination is made as to whether the coupon is valid. In step 2320, the scanned coupon data elements may be stored in the ICN database along with associated transaction detail elements. In step 2312, if the coupon is determined not to be valid, the ICN real time application may send a message to the POS terminal via the ICN network and ICN data bridge to reject an invalid coupon. Then, in step 2314, the ICN real time application may write invalid coupon redemption attempt and transaction detail data to the ICN database. In step 2316, the ICN real time application may send a message to POS terminal via the ICN network and ICN data bridge to redeem a valid coupon. In step 2318, once the coupon is validated and redeemed by the POS, the ICN POS data bridge software may transmit specified data elements from each paper coupon to the ICN database. In step 2320, the scanned coupon data elements may be stored in the ICN database along with the associated transaction detail elements. In step 2322, at the end of the cashier's shift, the store bookkeeper may reconcile the value of the coupons in the cash draw with the totals accumulated by the POS system. In step 2324, on a regular basis, the reconciled coupons from each store may be bundled together and shipped to the retailer's headquarters. In step 2326, the retailer's accounting department may log into the ICN promotion manager and run a coupon audit report which provides detailed and summary information by individual store and date. In step 2328, an audit report may be sent to the manufacturer for approval. Once approved, the retailer or retailer's agent may authorize the destruction of the paper coupons, thereby removing them from circulation. In step 2330, on a predetermined schedule, the ICN ACH settlement system may produce invoices for all coupon promotions which have been approved for billing. In step 2332, the ICN ACH settlement system may debit the manufacturer's pre-assigned bank account for each retailer. In step 2334, the ICN ACH settlement system may credit the retailer's pre-assigned bank account.

Figure 24B:
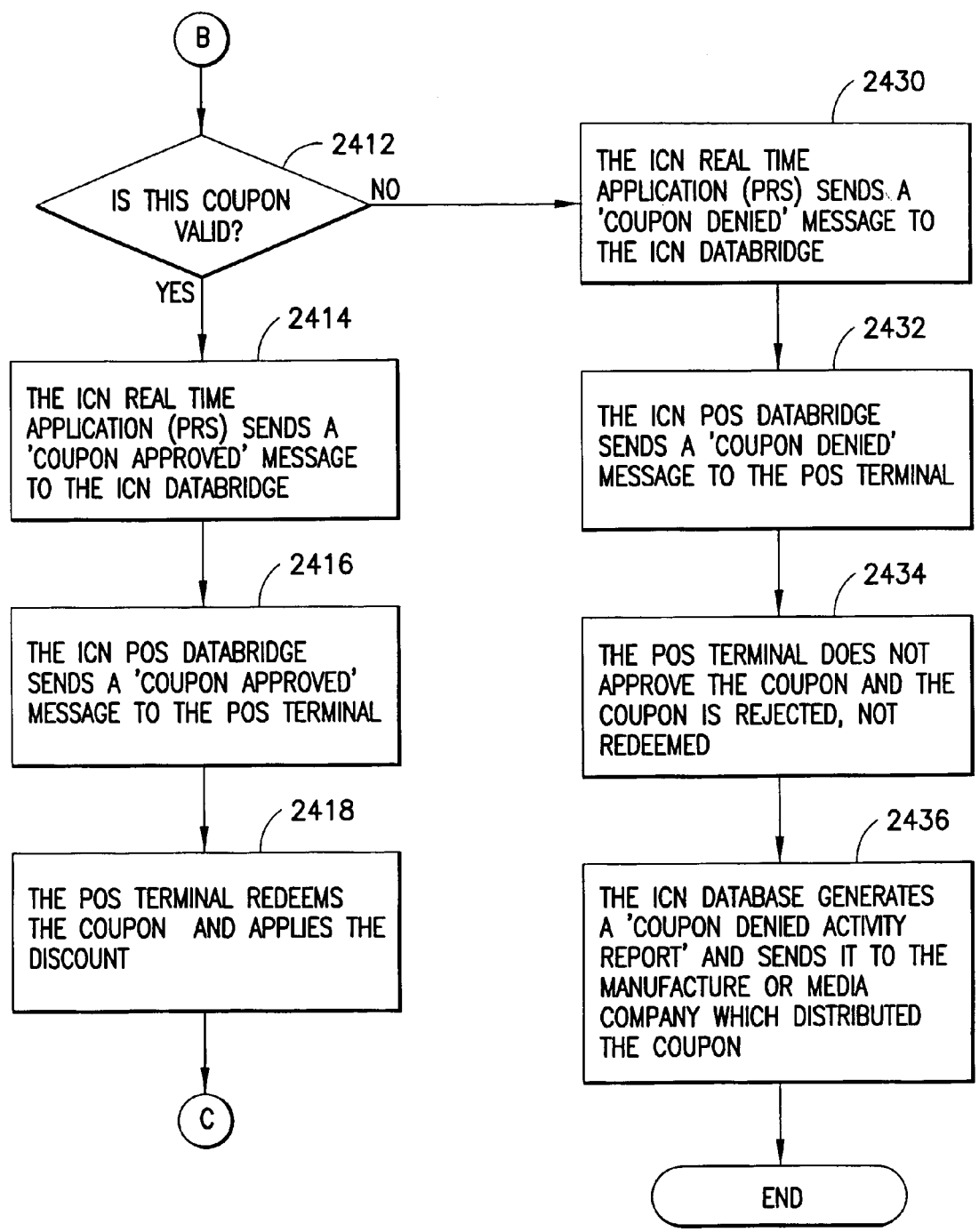
FIG. 24 (24A, 24B, and 24C) shows yet another embodiment of a system for processing a paper coupon.
Figure 24C:
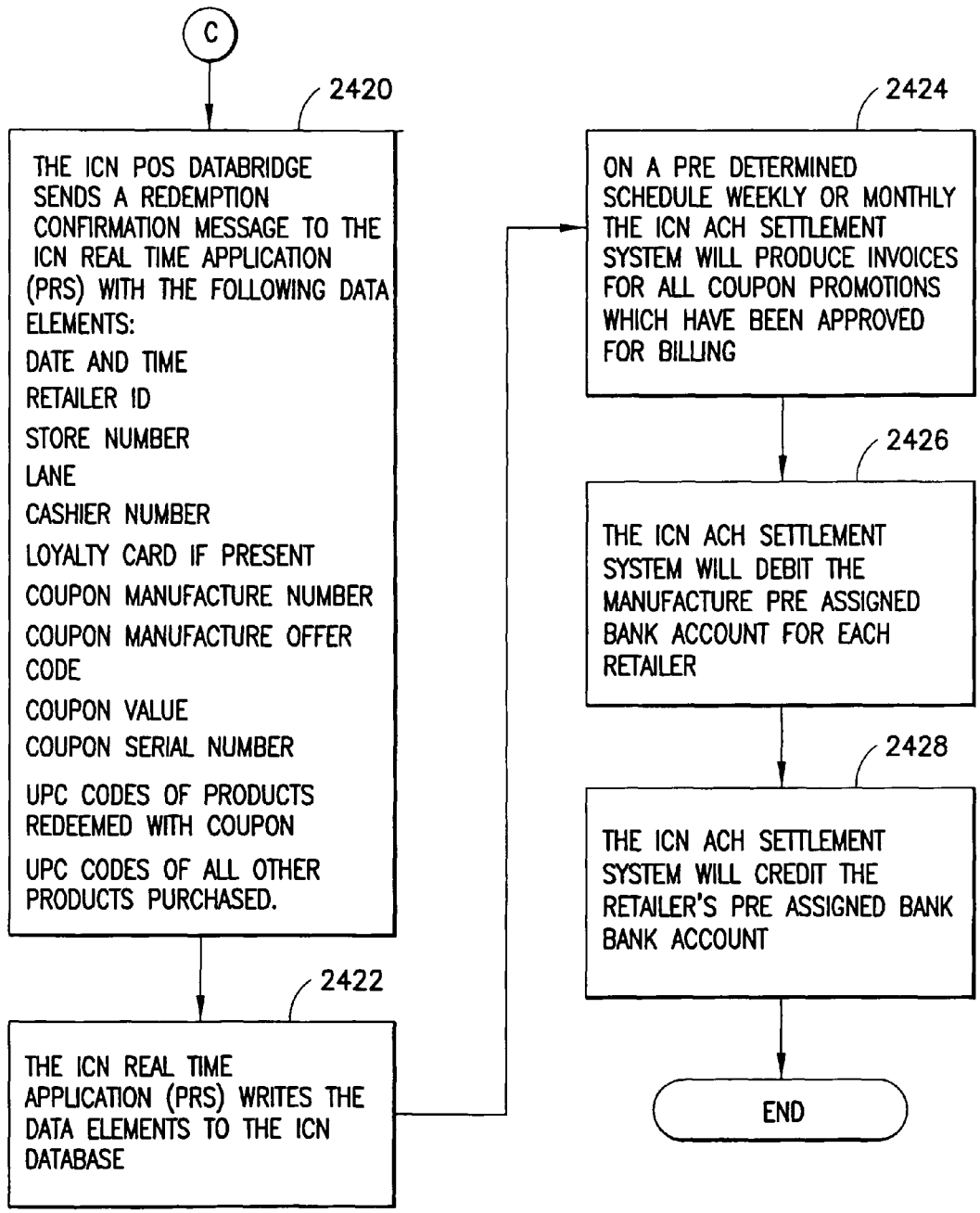

FIG. 24 illustrates an embodiment of the invention in which a paper coupon is processed. In an example of this embodiment, the ICN validates the unique serial number of a paper coupon which includes a unique serial number. In step 2402, a consumer may obtain a paper coupon coded with GS1 databar. In step 2404, during checkout, the consumer may provide the paper coupon to the cashier who scans them in or the consumer scans in the coupons himself or herself. In step 2406, a determination is made as to whether the GS1 databar includes a unique serial number. In step 2408, the unique serial number may be transmitted by the ICN POS data bridge to the ICN real time application (PRS). In step 2410, the ICN real time application (PRS) may query the coupon master table in the ICN database to determine if the coupon associated with this unique serial number is valid and had not been redeemed previously. In step 2412, a determination is made as to whether the coupon is valid. If it is determined that the coupon is not valid, the ICN real time application (PRS) may send a coupon denied message to the ICN data bridge as in step 2430. Then, in step 2432, the ICN POS data bridge may send a coupon denied message to the POS terminal. In step 2434, the POS terminal may not approve the coupon, thereby rejecting the coupon so no redemption occurs. In step 2436, the ICN database may generate a coupon denied activity report that it may send to the manufacturer or media company which distributed the coupon. If the coupon is determined to be valid, the ICN real time application (PRS) may send a coupon approved message to the ICN data bridge, as in step 2414. In step 2416, the ICN POS data bridge may send a coupon approved message to the POS terminal. In step 2418, the POS terminal may redeem the coupon and apply the discount. In step 2420, the ICN POS data bridge may send a redemption confirmation message to the ICN real time application (PRS) with specified data elements. In step 2422, the ICN real time application (PRS) may write the data elements to the ICN database. In step 2424, on a predetermined schedule, such as weekly or monthly, the ICN ACH settlement system may produce invoices for all coupon promotions which have been approved for billing. In step 2426, the ICN ACH settlement system may debit the manufacturer's pre-assigned bank account for each retailer. In step 2428, the ICN ACH settlement system may credit the retailer's pre-assigned bank account.

Figure 25:
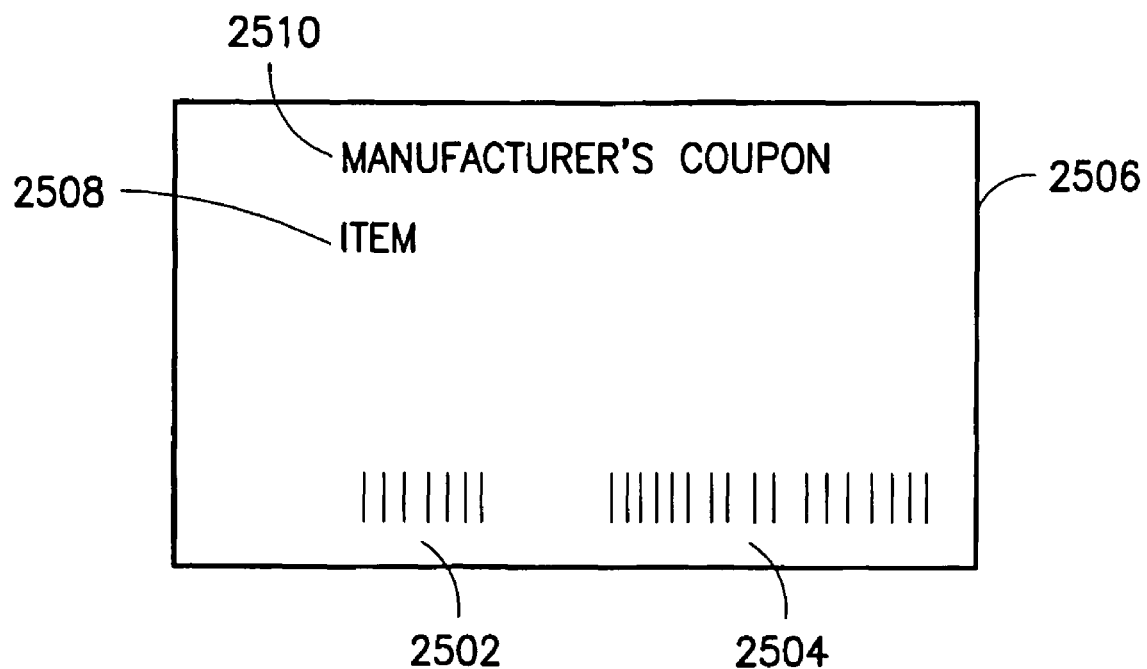
FIG. 25 shows an embodiment of a paper coupon in accordance with this invention.

FIG. 25 shows an embodiment of a paper coupon, in accordance with an embodiment of the invention. On paper coupon 2506 is shown a label of the coupon as a manufacturer's coupon 2510 and a description of the one or more items 2506 the coupon may be redeemed against. An earlier version of a bar code 2501 may be marked on the coupon alongside a current or newer version of a bar code 2504, such as GS1 databar.

In an aspect of the invention, the GS1 format may require the actual value of the coupon rather than a value code. For example, a $1.00 coupon value may be represented by an actual value of 100 which may be coded directly in the barcode. The GS1 barcode allows for coding of the Target UPC's within the barcode to better validate the coupon. The GS1 barcode allows for serialization of each coupon, meaning every coupon printed may be given a unique number by the CPG company thus making it unique and potentially eliminating some fraud.

When a paper coupon is scanned using some prior techniques, very little information is captured by the POS scanner, not enough information to allow for the clearing of paper electronically, which meant after the paper coupon was scanned by the cashier it was 'money' and went into the till. At the end of the shift, the cashier would remove the till and give it to the store accountant or bookkeeper who would then settle the till. Settling the till involves counting the value of the paper coupons as well as the cash, debit, and credits and verifying that the totals in the till match the total provided by the POS system. Then the paper coupons would be bundled together and sent on a truck to the retailer's HQ. From there all the coupons from all the stores would be bundled together and sent to the retailer's clearing agent where they would be hand counted and separated by CPG and MOC within each CPG. With the GS1 barcode there is the opportunity to capture enough details of the paper coupon to allow for an electronic clearing of the paper coupon. This would be an advantageous opportunity, after the store bookkeeper settles the paper coupons by cashier the coupon could be removed out of circulation by destroying the coupon and the coupon would be cleared electronically by ICN.

Although the embodiments of FIGS. 22 to 25 and related descriptions have been described in terms of a paper coupon, other physically durable substrate coupons and/or incentives are encompassed within these embodiments of the invention. For example, coupons may be formed through plastic or composite materials.

It is believed that embodiments of the invention and the attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof.

It is the intention of the following claims to encompass and include such changes. Moreover, while GS1 barcode 8110 application identifiers are referenced herein, the embodiments described herein also can apply to other barcode identifiers.

What is claimed is:

1. A method for processing coupons, comprising:
scanning, at a point-of-sale (POS) terminal located at a retail store, coupon information of a coupon;
determining data elements comprising product code information of an item to be purchased and the coupon information of the coupon;
transmitting the data elements through a network to an intelligent clearing network (ICN) server for validation and redemption, where the ICN server is at a location that is remote from the retail store;
validating, at the ICN server, the coupon information based at least in part on the product code information;
in response to validating the data elements at the ICN server, transmitting first coupon related information through the network to the POS terminal,
in response to successful redemption of the coupon, transmitting redeemed coupon related information to the ICN server through the network,
wherein the redeemed coupon related information comprises identification information from the product purchased, an application identifier, and retailer identification information;
in response to receiving the redeemed coupon related information, storing, by the ICN server, the redeemed coupon related information in a redeemed coupon database;
generating a coupon audit report based on the redeemed coupon database;
transmitting the coupon audit report to a manufacturer; and
in response to receiving approval for at least a portion of the coupon audit report, debiting a bank account assigned to the manufacturer based on the portion of the coupon audit report that was approved and crediting a bank account assigned to the retailer based on the portion of the coupon audit report that was approved.

2. The method as in claim 1, whereby the coupon comprises a GS1 barcode.

3. The method as in claim 1, whereby the coupon is a paper coupon and the data elements of a GS1 databar printed on the paper coupon include a manufacturer offer code (MOC) which ties to a budget for electronically clearing and financially settling before the paper coupon is removed from circulation.

4. A method as in claim 1, further comprising validating, at the ICN server, an expiration date of the coupon information.

5. The method as in claim 1, wherein the coupon comprises an 8110 application identifier.

6. The method as in claim 1, where validating the coupon information comprises validating at least one of: a family code, a value, a manufacture offer code, purchase requirements, an expiration date, and a unique serial number of the coupon in real time.

7. The method as in claim 1, where the coupon audit report provides detailed and summary information by individual store and date.

8. The method as in claim 1, wherein the redeemed coupon related information comprises information regarding a consumer's transaction at the POS terminal including at least one of date, time, store, lane, total dollar amount spent, customer ID and universal product codes.

9. The method as in claim 1, where the ICN server is configured to communicate with a plurality of POS terminals.

10. The method as in claim 1, where the redeemed coupon database comprises redeemed coupon related information from a plurality of retailer stores.

11. The method as in claim 1, where validating the coupon information comprises:
determining whether a current date exceeds an expiration date assigned to the coupon in a master coupon table,
determining whether a family code indicated in the coupon information does not match a family code of the product code information,
determining whether a value indicated in the coupon information does not match a value assigned to the coupon in the master coupon table,
determining whether a manufacture offer code (MOC) indicated in the coupon information does not match a MOC assigned to the coupon in the master coupon table, and
determining whether the coupon has been previously redeemed,
where the coupon information is determined to be not valid in response to at least one of:
determining that the current date exceeds the expiration date assigned to the coupon in the master coupon table,
determining that the value indicated in the coupon information does not match the value assigned to the coupon in the master coupon table,
determining that the manufacture offer code (MOC) indicated in the coupon information does not match the MOC assigned to the coupon in the master coupon table, and
determining that the coupon has been previously redeemed.

12. The method as in claim 1, further comprising, in response to determining that the coupon information is not valid, sending, from the ICN server to the POS terminal, a message instructing the POS terminal to reject the invalid coupon.

13. The method as in claim 1, further comprising, in response to determining that the coupon information is not valid, writing an invalid coupon redemption attempt and transaction detail data to a database.

14. The method as in claim 1, further comprising:
monitoring volume and traffic of redeemed coupons; and
identifying abnormalities indicative of attempted fraudulent coupon redemption based on the monitored volume and traffic.

15. The method of claim 1, where validating the coupon information comprises:
comparing the coupon information to coupon information defined in a master coupon table; and
in response to determining that the coupon information is not valid based on the comparison, instructing the POS terminal to not redeem the coupon.

16. The method of claim 1, further comprising:
determining, at the ICN server, whether the item to be purchased meets purchase requirements of the coupon based at least in part on the product code information of the item to be purchased; and
informing the POS terminal whether the paper coupon purchase requirements have been met.

17. An intelligent clearing network (ICN) server for processing coupons, comprising a processor and a computer readable memory storing computer code, where execution of the computer code by the processor causes the ICN server to perform actions comprising:
receiving data elements through a network from a point-of-sale (POS) terminal of a retailer for validation and redemption, the data elements including product code information of an item to be purchased at the POS terminal and coupon information of a coupon, where the coupon is scanned at the POS terminal located at a retail store, where the ICN server is at a location that is remote from the retail store;

validating, at the ICN server, the coupon information based at least in part on the product code information;

in response to validating the data elements at the ICN server, transmitting first coupon related information through the network to the POS terminal, in response to successful redemption of the coupon, receiving redeemed coupon related information, wherein the redeemed coupon related information comprises identification information from the product purchased, an application identifier, and retailer identification information;

in response to receiving the redeemed coupon related information, storing, by the ICN server, the redeemed coupon related information in a redeemed coupon database;

generating a coupon audit report based on the redeemed coupon database;

transmitting the coupon audit report to a manufacturer; and in response to receiving approval for at least a portion of the coupon audit report, debiting a bank account assigned to the manufacturer based on the portion of the coupon audit report that was approved and crediting a bank account assigned to the retailer based on the portion of the coupon audit report that was approved.

18. The ICN server as in claim 17, whereby the coupon comprises a GS1 barcode.

19. The ICN server as in claim 17, whereby the coupon is a paper coupon and the data elements of a GS1 databar printed on the paper coupon include a manufacturer offer code (MOC) which ties to a budget for electronically clearing and financially settling before the paper coupon is removed from circulation.

20. A ICN server as in claim 17, where the actions further comprise validating, at the ICN server, an expiration date of the coupon information.

21. The ICN server as in claim 17, wherein the coupon comprises an 8110 application identifier.

22. The ICN server as in claim 17, where validating the coupon information comprises validating at least one of: a family code, a value, a manufacture offer code, purchase requirements, an expiration date, and a unique serial number of the coupon in real time.

23. The ICN server as in claim 17, where the coupon audit report provides detailed and summary information by individual store and date.

24. The ICN server as in claim 17, wherein the redeemed coupon related information comprises information regarding a consumer's transaction at the POS terminal including at least one of date, time, store, lane, total dollar amount spent, customer ID and universal product codes.

25. The ICN server as in claim 17, where the ICN server is configured to communicate with a plurality of POS terminals.

26. The ICN server as in claim 17, where the redeemed coupon database comprises redeemed coupon related information from a plurality of retailer stores.

27. A non-transitory computer readable medium storing computer code for processing coupons, where execution of the computer code by a processor causes the processor to perform action comprising:

receiving data elements through a network from a point-of-sale (POS) terminal of a retailer for validation and redemption, the data elements including product code information of an item to be purchased at the POS terminal and coupon information of a coupon, where the coupon is scanned at the POS terminal located at a retail store, where the ICN server is at a location that is remote from the retail store;

validating, at the ICN server, the coupon information based at least in part on the product code information;

in response to validating the data elements at the ICN server, transmitting first coupon related information through the network to the POS terminal, in response to successful redemption of the coupon, receiving redeemed coupon related information, wherein the redeemed coupon related information comprises identification information from the product purchased, an application identifier, and retailer identification information;

in response to receiving the redeemed coupon related information, storing, by the ICN server, the redeemed coupon related information in a redeemed coupon database;

generating a coupon audit report based on the redeemed coupon database;

transmitting the coupon audit report to a manufacturer; and in response to receiving approval for at least a portion of the coupon audit report, debiting a bank account assigned to the manufacturer based on the portion of the coupon audit report that was approved and crediting a bank account assigned to the retailer based on the portion of the coupon audit report that was approved.

28. The computer readable medium as in claim 27, whereby the coupon comprises a GS1 barcode.

29. The computer readable medium as in claim 27, whereby the coupon is a paper coupon and the data elements of a GS1 databar printed on the paper coupon include a manufacturer offer code (MOC) which ties to a budget for electronically clearing and financially settling before the paper coupon is removed from circulation.

30. A computer readable medium as in claim 27, where the actions further comprise validating, at the ICN server, an expiration date of the coupon information.

31. The computer readable medium as in claim 27, wherein the coupon comprises an 8110 application identifier.

32. The computer readable medium as in claim 27, where validating the coupon information comprises validating at least one of a family code, a value, a manufacture offer code, purchase requirements, an expiration date, and a unique serial number of the coupon in real time.

33. The computer readable medium as in claim 27, where the coupon audit report provides detailed and summary information by individual store and date.

34. The computer readable medium as in claim 27, wherein the redeemed coupon related information comprises information regarding a consumer's transaction at the POS terminal including at least one of date, time, store, lane, total dollar amount spent, customer ID and universal product codes.

35. The computer readable medium as in claim 27, where the ICN server is configured to communicate with a plurality of POS terminals.

36. The computer readable medium as in claim 27, where the redeemed coupon database comprises redeemed coupon related information from a plurality of retailer stores.

37. A method for processing coupons, comprising:

scanning, at a point-of-sale (POS) terminal located at a retail store, data elements, the data elements comprising product code information of an item to be purchased and coupon information of a coupon, where the coupon comprises a GS1 barcode comprising a manufacturer offer code (MOC), the MOC ties to a budget for financially settling the coupon;

transmitting the data elements through a network from the POS terminal to an intelligent clearing network (ICN) server for validation and redemption, where the ICN server is at a location that is remote from the retail store;

validating, at the ICN server, the coupon information based at least in part on the product code information;

in response to validating the data elements at the ICN server, transmitting first coupon related information through the network to the POS terminal, in response to successful redemption of the coupon, transmitting redeemed coupon related information to the ICN server through the network, wherein the redeemed coupon related information comprises identification information from the product purchased, an application identifier, and retailer identification information;

in response to receiving the redeemed coupon related information, storing, by the ICN server, the redeemed coupon related information in a redeemed coupon database;

generating a coupon audit report based on the redeemed coupon database;

transmitting the coupon audit report to a manufacturer; and in response to receiving approval for at least a portion of the coupon audit report, debiting a budget assigned to the manufacturer and identified by the MOC based on the portion of the coupon audit report that was approved and crediting a bank account assigned to the retailer based on the portion of the coupon audit report that was approved.

38. The method as in claim 37, where the GS1 barcode further comprises a family code, a value, purchase requirements, an expiration date and a unique serial number of the coupon.

39. The method as in claim 37, where the ICN server is configured to communicate with a plurality of POS terminals.

* * * * *